US012644385B2

(12) United States Patent
Willaman et al.

(10) Patent No.: US 12,644,385 B2
(45) Date of Patent: Jun. 2, 2026

(54) BOLTER

(71) Applicant: Joy Global Underground Mining LLC, Warrendale, PA (US)

(72) Inventors: Patrick Ross Willaman, Stump Creek, PA (US); Michael Georgiou, Moss Vale (AU); Greg Broad, Mt Pleasant (AU); Kevin Saeler, Stoneboro, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 78 days.

(21) Appl. No.: 18/464,071

(22) Filed: Sep. 8, 2023

(65) Prior Publication Data

US 2023/0417141 A1 Dec. 28, 2023

Related U.S. Application Data

(63) Continuation of application No. 17/492,519, filed on Oct. 1, 2021, now Pat. No. 11,781,430.

(Continued)

(51) Int. Cl.
| | |
|---|---|
| *E21D 20/00* | (2006.01) |
| *E21B 7/02* | (2006.01) |

(Continued)

(52) U.S. Cl.
CPC ......... E21D 20/006 (2013.01); E21D 20/003 (2013.01); *E21B 7/022* (2013.01); *E21B 19/08* (2013.01); *E21D 20/02* (2013.01); *E21D 20/026* (2013.01); *E21D 21/0006* (2013.01); *G01D 5/142* (2013.01)

(58) Field of Classification Search
CPC ... E21D 20/003; E21D 20/006; E21D 20/023; E21D 20/026; E21D 20/02
See application file for complete search history.

(56) References Cited

U.S. PATENT DOCUMENTS 3,768,574 A * 10/1973 Long .................... E21D 20/003
                                                       175/219
3,902,561 A      9/1975  Friberg
(Continued)

FOREIGN PATENT DOCUMENTS

| CA | 3080919 A1 | 5/2019 |
|----|------------|--------|
| CN | 103619637 A | 3/2014 |

(Continued)

OTHER PUBLICATIONS

Supplementary Extended European Search Report for Application No. 21887159.8 dated Sep. 11, 2024, 7 pages.

(Continued)

*Primary Examiner* — Benjamin F Fiorello
(74) *Attorney, Agent, or Firm* — Husch Blackwell LLP

(57) ABSTRACT

A drilling and bolting rig for performing drilling and bolting operations. The drilling and bolting rig includes a magazine for storing a consumable, a feed supporting a drill head for movement relative to a work surface, and a loader configured to retrieve the consumable from the magazine and load the consumable into the drill head. The loader includes an arm operable to engage the consumable. The arm is supported for both rotational and translational movement.

13 Claims, 44 Drawing Sheets

Related U.S. Application Data

(60) Provisional application No. 63/086,392, filed on Oct. 1, 2020.

(51) Int. Cl.

| | |
|---|---|
| *E21B 19/08* | (2006.01) |
| *E21D 20/02* | (2006.01) |
| *E21D 21/00* | (2006.01) |
| *G01D 5/14* | (2006.01) |

(56) References Cited

U.S. PATENT DOCUMENTS

| | | | |
|---|---|---|---|
| 4,398,850 | A | 8/1983 | Talvensaari |
| 4,420,277 | A | 12/1983 | Hibbard |
| 4,473,325 | A | 9/1984 | Beney et al. |
| 5,114,279 | A | 5/1992 | Bjerngren |
| 5,174,389 | A | 12/1992 | Hansen |
| 5,720,582 | A | 2/1998 | Morrison |
| 6,135,674 | A | 10/2000 | Neilson |
| 6,293,359 | B1 * | 9/2001 | Dobran ................. E21B 19/086 |
| | | | 173/147 |
| 6,302,623 | B1 | 10/2001 | Neilson |
| 6,413,019 | B1 | 7/2002 | Coombs et al. |
| 6,598,309 | B1 | 7/2003 | Coombs |
| 6,994,496 | B2 | 2/2006 | Mills |
| 7,350,593 | B1 * | 4/2008 | Brookover .............. E21B 44/02 |
| | | | 173/4 |
| 7,428,936 | B2 | 9/2008 | Hinshaw et al. |
| 7,438,141 | B2 | 10/2008 | Hinshaw et al. |
| 7,607,866 | B2 | 10/2009 | Eddowes |
| 9,957,797 | B2 * | 5/2018 | Pettersson ............. E21D 20/028 |
| 10,641,624 | B2 | 5/2020 | Wolff et al. |
| 11,078,790 | B2 | 8/2021 | Holdsworth |
| 11,274,506 | B2 | 3/2022 | Willaman |
| 11,725,514 | B2 | 8/2023 | Fourie et al. |
| 2001/0050186 | A1 * | 12/2001 | Wilson ................. B23Q 15/013 |
| | | | 175/38 |
| 2003/0210967 | A1 | 11/2003 | Mills |
| 2004/0118578 | A1 | 6/2004 | O'Meley |
| 2004/0177979 | A1 | 9/2004 | Rubie |
| 2007/0003383 | A1 | 1/2007 | Hinshaw et al. |
| 2007/0286707 | A1 | 12/2007 | Eddowes et al. |
| 2014/0338973 | A1 | 11/2014 | Taylor et al. |
| 2014/0366955 | A1 * | 12/2014 | Looney ................... E21B 44/04 |
| | | | 137/102 |
| 2016/0305243 | A1 | 10/2016 | Nelson |
| 2017/0114594 | A1 * | 4/2017 | Anttonen .................. E21B 6/00 |
| 2017/0159434 | A1 | 6/2017 | Pettersson |
| 2017/0204666 | A1 * | 7/2017 | Galler ..................... E21B 19/08 |
| 2018/0010454 | A1 | 1/2018 | Holdsworth et al. |
| 2018/0016899 | A1 | 1/2018 | Galler |
| 2019/0063964 | A1 | 2/2019 | Wolff et al. |
| 2020/0263499 | A1 * | 8/2020 | Koskinen ................ E21B 7/027 |
| 2020/0308917 | A1 | 10/2020 | Diekmann et al. |
| 2021/0207479 | A1 | 7/2021 | Ekefalk |

FOREIGN PATENT DOCUMENTS

| | | | |
|---|---|---|---|
| CN | 104816149 | A | 8/2015 |
| CN | 105637180 | A | 6/2016 |
| CN | 107109939 | A | 8/2017 |
| CN | 206419015 | U | 8/2017 |
| CN | 206987752 | U | 2/2018 |
| CN | 108756782 | A | 11/2018 |
| CN | 109404022 | A | 3/2019 |
| CN | 110566251 | A | 12/2019 |
| CN | 111458743 | A | 7/2020 |
| CN | 111608210 | A | 9/2020 |
| CN | 111706370 | A | 9/2020 |
| EP | 2851503 | A1 | 3/2015 |
| EP | 3247867 | B1 | 3/2019 |
| JP | 2009128060 | A | 6/2009 |
| WO | 2019231383 | A1 | 12/2019 |

OTHER PUBLICATIONS

Supplementary Extended European Search Report for Application No. 21876642.6 dated Sep. 11, 2024, 7 pages.

Examination Report for Application No. 21876642.6-1002, dated Aug. 22, 2025 (23 pages).

International Search Report and Written Opinion for Application No. PCT/US2021/053263 dated Jul. 20, 2022 (27 pages).

International Search Report and Written Opinion for Application No. PCT/US2021/053267 dated Feb. 23, 2022 (15 pages).

Chinese Office Action and Search Report for Application No. 202180075715.1 dated Nov. 25, 2025 (10 pages with Statement of Relevance).

Chinese Office Action and Search Report for Application No. 2021800756939 dated Dec. 31, 2025 (10 pages with Statement of Relevance).

* cited by examiner

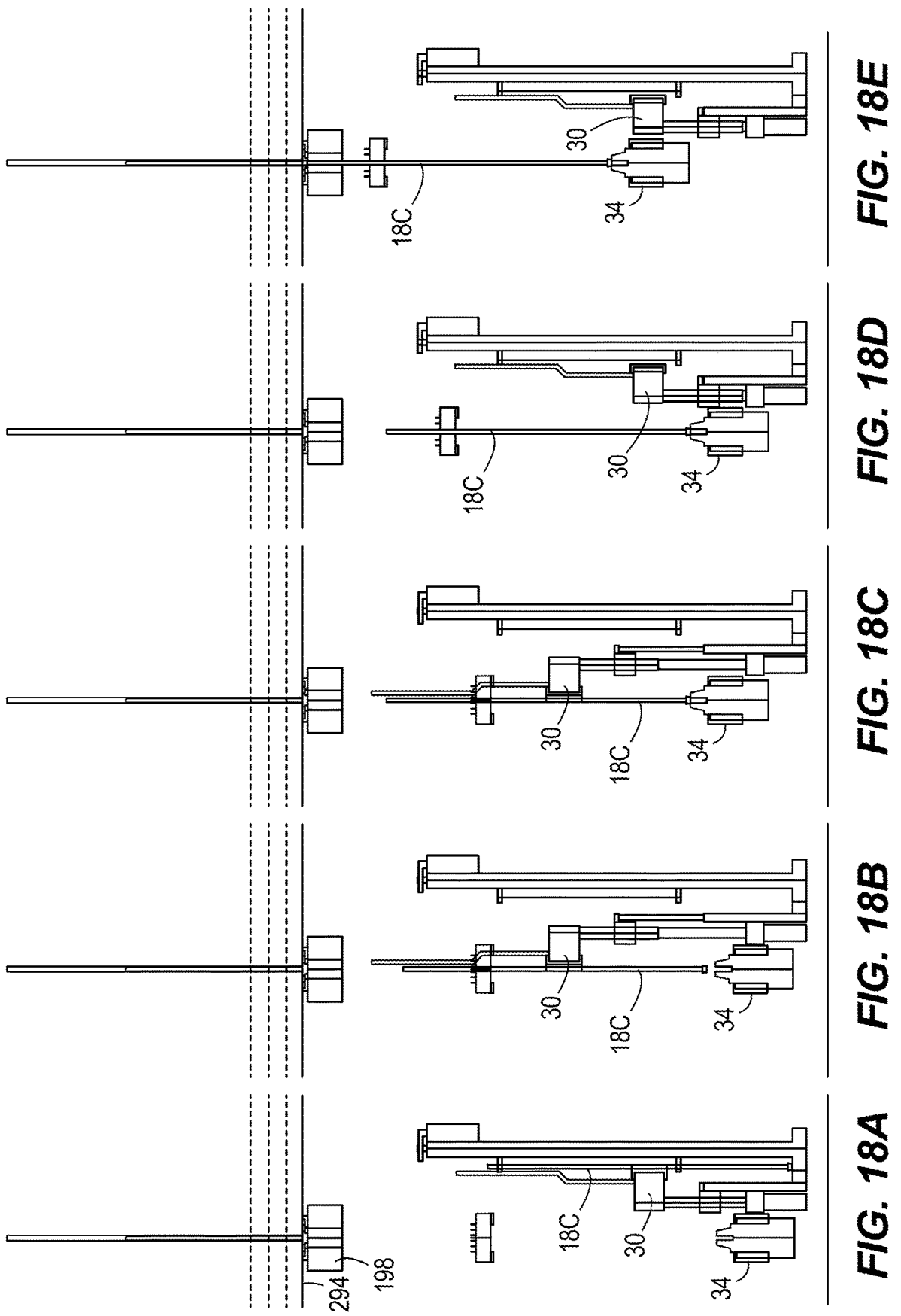
*FIG. 18E*      *FIG. 18D*      *FIG. 18C*      *FIG. 18B*      *FIG. 18A*

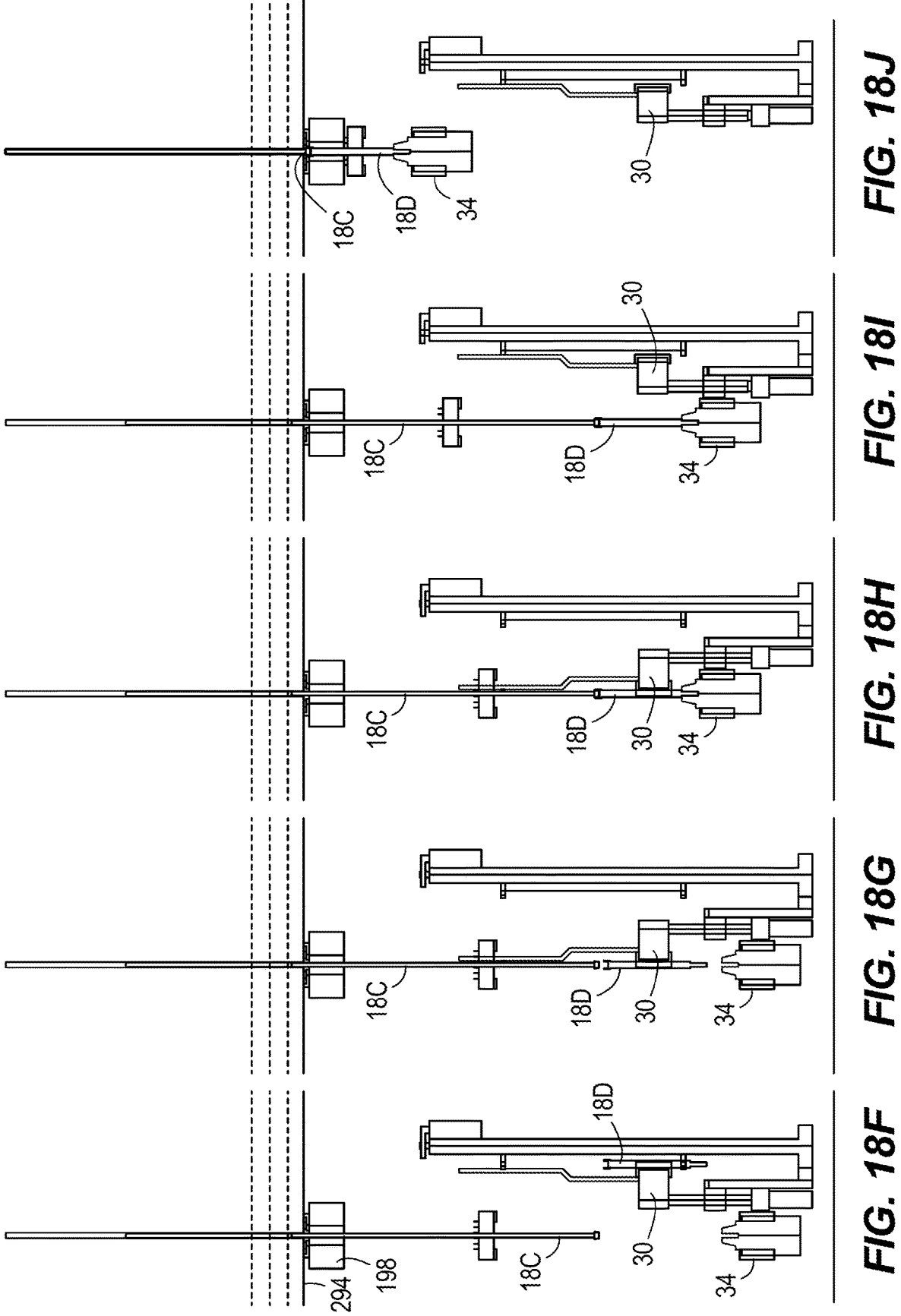
*FIG. 18J*   *FIG. 18I*   *FIG. 18H*   *FIG. 18G*   *FIG. 18F*

600

| RECEIVE FULL AUTOMATION MODE REQUEST | 606 |
| CALIBRATE SENSORS | 608 |
| PERFORM DRILLING | 610 |
| INJECT RESIN | 612 |
| INSERT BOLT | 614 |

800

ROTATE CAROUSEL TO DRILL LOADING POSITION — 802

SECURE DRILL BIT TO LOADING ARM FOR LOADING — 804

LOAD WASHER ON DRILL BIT — 806

LOAD DRILL BIT IN DRILL HEAD — 808

DRILL THE DRILL BIT INTO WORKING SURFACE — 810

SECURE DRILL BIT TO LOADING ARM FOR UNLOADING — 812

UNLOAD DRILL BIT TO CAROUSEL — 814

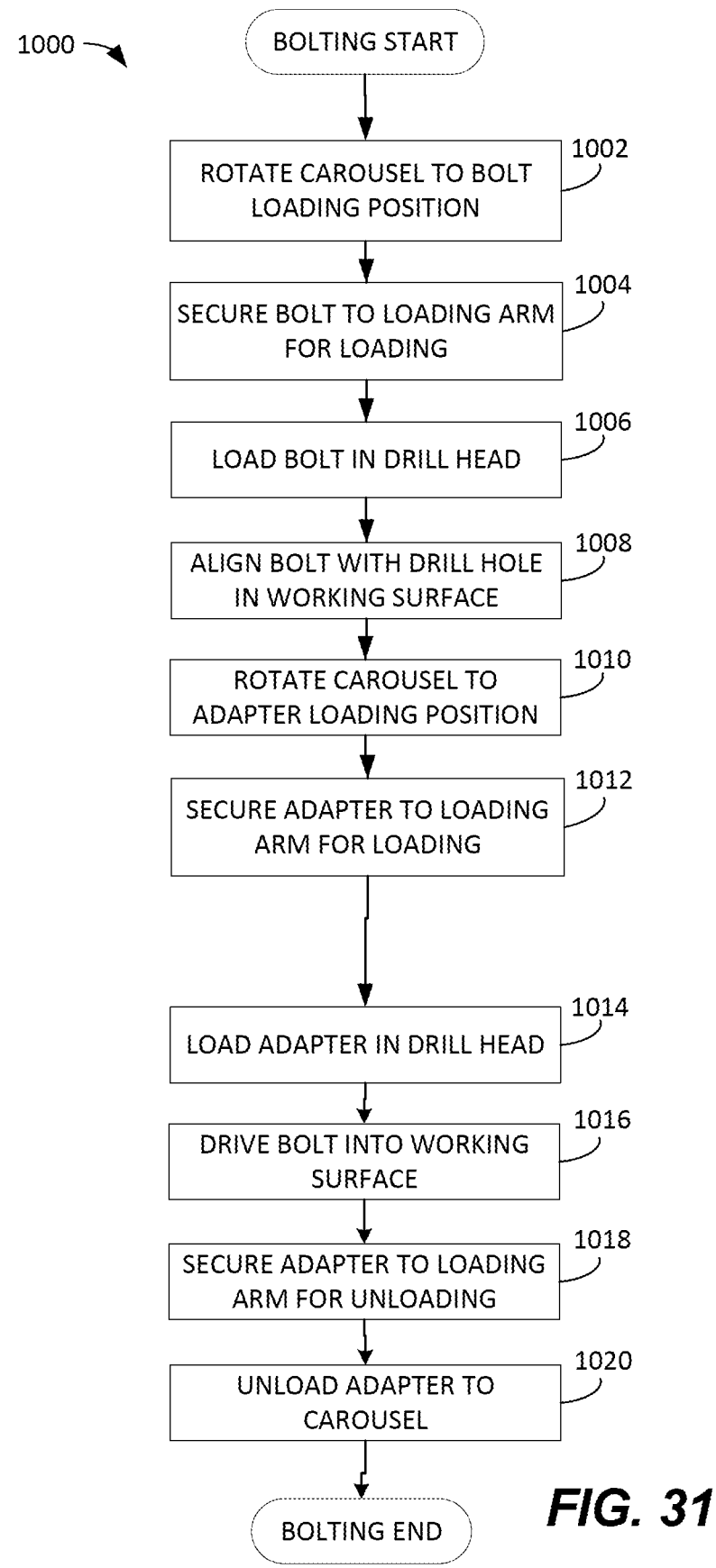

1000

BOLTING START

ROTATE CAROUSEL TO BOLT LOADING POSITION — 1002

SECURE BOLT TO LOADING ARM FOR LOADING — 1004

LOAD BOLT IN DRILL HEAD — 1006

ALIGN BOLT WITH DRILL HOLE IN WORKING SURFACE — 1008

ROTATE CAROUSEL TO ADAPTER LOADING POSITION — 1010

SECURE ADAPTER TO LOADING ARM FOR LOADING — 1012

LOAD ADAPTER IN DRILL HEAD — 1014

DRIVE BOLT INTO WORKING SURFACE — 1016

SECURE ADAPTER TO LOADING ARM FOR UNLOADING — 1018

UNLOAD ADAPTER TO CAROUSEL — 1020

BOLTING END

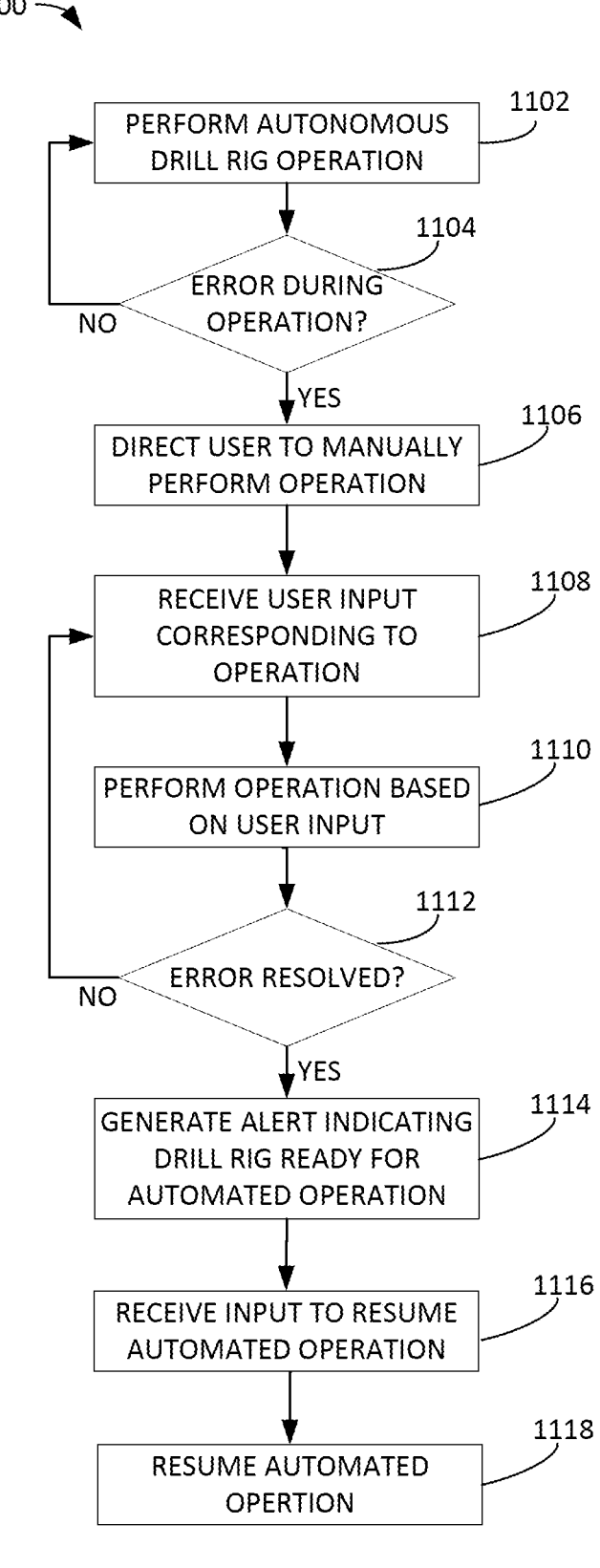

PERFORM AUTONOMOUS DRILL RIG OPERATION    1102

ERROR DURING OPERATION?    1104

NO

YES

DIRECT USER TO MANUALLY PERFORM OPERATION    1106

RECEIVE USER INPUT CORRESPONDING TO OPERATION    1108

PERFORM OPERATION BASED ON USER INPUT    1110

ERROR RESOLVED?    1112

NO

YES

GENERATE ALERT INDICATING DRILL RIG READY FOR AUTOMATED OPERATION    1114

RECEIVE INPUT TO RESUME AUTOMATED OPERATION    1116

RESUME AUTOMATED OPERTION    1118

*FIG. 32*

BOLTER

CROSS REFERENCE TO RELATED APPLICATIONS

This application is a continuation of co-pending U.S. patent application Ser. No. 17/492,519, filed Oct. 1, 2021, which claims the benefit of U.S. Provisional Patent Application No. 63/086,392, filed Oct. 1, 2020. The entire contents of these applications are incorporated herein by reference.

FIELD

The present disclosure relates to a drill rig, and more particularly to an underground drill rig.

In underground mining and construction, drill rigs perform drilling and bolting operations. One common use for a drill rig is to reinforce a roof or wall section with a reinforcement member (e.g., a rebar bolt). In order to perform drilling operations, the drill rig requires a supply of consumables.

SUMMARY

The disclosure provides, in one aspect, a drilling and bolting rig for performing drilling and bolting operations. The drilling and bolting rig includes a magazine for storing a consumable, a feed supporting a drill head for movement relative to a work surface, and a loader configured to retrieve the consumable from the magazine and load the consumable into the drill head. The loader includes an arm operable to engage the consumable. The arm is supported for both rotational and translational movement.

In some aspects, the consumable is at least one of a plurality of consumables, and the plurality of consumables includes at least two of a drill bit, a resin cartridge, a resin injector, a first bolt, a second bolt, an adaptor, and an extension rod.

In some aspects, the magazine includes a carousel rotatable about a first axis to selectively place the consumable into a loading position in which the consumable can be retrieved by the loader, and the carousel is rotatable about the first axis in response to a first actuator.

In some aspects, the loader includes a loading arm rotatable about a second axis that is offset relative the first axis, and the loading arm is configured to remove the consumable from the loading position on the carousel and move the consumable to position an end of the consumable in the drill head.

In some aspects, the feed is extendable along a drill axis oriented parallel relative to at least one of the first axis and the second axis.

In some aspects, the drive unit is operable to apply the desired consumable to the work surface, and the loading arm is rotatable about the second axis to retrieve the consumable from the drill head.

In some aspects, the magazine includes a carousel rotatable about an axis, and a distance between the drill head and an axis of rotation of the loading arm is equal to a distance between the axis of rotation of the loading arm and the axis about which the carousel rotates.

In some aspects, rotation of the carousel is automated by a controller to define at least a portion of a drill cycle in which the consumable retrieved from the loading position on the carousel is replaced with another consumable by rotating the other consumable into the loading position.

In some aspects, rotation of the loading arm is automated by the controller and selectively replaces the one consumable with the other consumable.

In some aspects, the one consumable includes a drill bit and the other consumable includes a resin cartridge.

In some aspects, another consumable includes a bolt, and the loading arm is automated by the controller to transfer the bolt to the drive unit, the drive unit inserting the bolt into resin in the work surface in a bolt cycle.

In some aspects, the drill cycle, the resin cycle, and the bolt cycle are automated by the controller such that the manual interaction of a human operator is unnecessary for operation of the underground mining and construction rig.

In some aspects, the carousel supports each of the plurality of consumables at a predetermined position, and the carousel includes a feature aligned with one of the plurality of consumables, the feature engaging a bypass actuator when the one of the plurality of consumables is aligned with the loading arm to modify a path of movement of the loading arm In some aspects, the feature is a protrusion positioned on a portion of the carousel and the bypass actuator is coupled to a valve, actuation of the valve causing fluid flow to bypass a hydraulic circuit associated with an extension of the loading arm.

In some aspects, the loader includes a support member, a loading arm supported for rotation relative to the support member, and a gripper supported on the loading arm, the support member including a first port, the loading arm including a second port in fluid communication with the first port while the loading arm rotates to provide pressurized fluid to an actuator, the actuator operating at least one of the loading arm and the gripper.

In some aspects, the loader includes a support member, a loading arm supported for rotation relative to the support member, and a gripper supported on the loading arm, the support member including a mast, a sleeve slidably supported on the mast, a key extending through the sleeve and engaging the mast to guide sliding movement of the loader, the support member further including a retainer for maintaining the key in engagement with the mast, the retainer including a first portion extending around a first peripheral portion of the sleeve and a second portion extending around a second peripheral portion of the sleeve.

The disclosure provides, in another aspect, a drilling and bolting rig for performing automated drilling and bolting operations. The drilling and bolting rig includes a magazine supporting a consumable, a feed moveably supporting a driver relative to a work surface, a loader including an arm configured to transfer the consumable from the magazine to the driver, and a washer loader configured to transfer a washer from a washer store to be positioned adjacent the consumable. The washer includes an aperture configured to receive the consumable therethrough.

In some aspects, the washer store is arranged in a refillable stack.

In some aspects, the washer loader includes a carrier arm having a portion configured to magnetically engage a single washer from the washer store.

In some aspects, the drilling and bolting rig for performing automated drilling and bolting operations further includes a support configured to maintain the washer in a predetermined position relative to the consumable as the consumable and washer are transferred to the driver.

In some aspects, the washer loader includes a carrier arm, further including a protrusion for guiding the washer as the consumable and washer are transferred to the driver, the protrusion extending from the carrier arm.

In some aspects, the washer loader may optionally bypass placement of at least one washer of the washer store when the consumable is transported to driver by the loader.

In some aspects, the consumable is one of a plurality of consumables supported by the magazine, the plurality of consumables including at least two of a drill bit, a resin cartridge, a resin injector, a first bolt, a second bolt, an adaptor, and an extension rod.

In some aspects, the drilling and bolting rig for performing automated drilling and bolting operations further includes a controller configured to automate operation of the magazine, the loader, the feed, and the washer loader such that the bit, bolt, and the washer are transported to the work surface without manual interaction of a human operator.

In some aspects, the washer loader includes a carrier arm configured to engage the washer and a carrier actuator supporting the carrier arm, the washer loader further including a guide groove coupled to one of the carrier arm and the carrier actuator, and a guide coupled to the other of the carrier arm and the carrier actuator, the guide received within the guide groove, wherein operation of the actuator causes the guide to move along the guide groove to move the carrier arm along a predetermined path.

In some aspects, at least a portion of the guide groove is curvilinear, movement of the guide in the guide groove causing rotation of the carrier arm in response to operation of the carrier actuator.

In some aspects, the guide groove includes a first groove portion and a second groove portion releasably secured relative to the first groove portion, wherein a position of the first groove guide portion relative to the second groove guide portion may be adjusted, thereby adjusting at least one of a starting position and an ending position of the carrier arm.

In some aspects, the washer loader includes a carrier arm configured to engage the washer, the carrier arm being rotatable about an axis by a first carrier actuator and moveable in a radial direction relative to the axis by a second carrier actuator.

In some aspects, the washer loader includes a carrier arm configured to engage the washer, the carrier arm being extendable along a first axis by a first carrier actuator and moveable along a second axis offset relative the first axis by a second carrier actuator, and the carrier arm is moveable along at least one of the first axis and the second axis to move the washer.

The disclosure provides, in another aspect, a drilling and bolting rig for performing automated drilling and bolting operations. The drilling and bolting rig includes a magazine including a mast, a carousel rotatable relative the mast about a carousel axis and including a plurality of stations, at least some of the stations configured to support a consumable, the plurality of stations being positioned around the mast, and an actuator positioned within the mast, the actuator configured to rotate the carousel about the carousel axis. The drilling and bolting rig includes a magazine further including a loader configured to retrieve at least one of the consumables from the magazine and transfer the consumable into a drive unit.

In some aspects, the drilling and bolting rig further includes a feed supporting the drive unit for movement relative to the work surface along a longitudinal direction, and the longitudinal direction is parallel to the carousel axis.

In some aspects, the drilling and bolting rig further includes a controller configured to operate the loader to retrieve the consumable from the magazine and transfer the consumable to the drive unit, and configured to operate the drive unit and feed to insert the consumable into a work surface without requiring manual interaction of a human operator.

The disclosure provides, in another aspect, a magazine for storing consumables for a drilling and bolting rig. The magazine includes a mast, a carousel supported for rotation relative the mast about an axis, and a clip supported on the carousel. The clip is configured to retain a consumable. The clip is removably coupled to the carousel.

In some aspects, the magazine further includes an actuator for rotating the carousel about the axis. The actuator is positioned within the mast.

In some aspects, the clip includes a biasing finger providing a biasing force configured to retain the consumable within a slot, the biasing finger being deformable in response to a force exerted on the finger to permit removal of the consumable from the slot.

In some aspects, the clip is one of a plurality of clips, and the carousel includes at least one rack configured to support the plurality of clips, the clip being removably coupled to the rack by a fastener.

In some aspects, the plurality of clips are arranged circumferentially about the axis.

In some aspects, the clip is configured to engage a consumable of a first type, the clip being replaceable with a clip configured to engage a consumable of a second type.

In some aspects, a portion of the clip configured to engage the consumable includes a wear member along which the consumable may slide as the consumable is inserted into and removed from the clip.

In some aspects, the carousel is rotatable to position the clip in a loading position in which a loader is configured to engage the consumable. The loader is configured to remove the consumable from the clip and transport the consumable to a feed.

The disclosure provides, in another aspect, a drilling and bolting rig that includes a drill head for driving a consumable into a work surface, a feed supporting the drill head for movement relative to a work surface, a hydraulic circuit including, at least one auxiliary flow control valve for selectively controlling flow of pressurized fluid to one of a first hydraulic component and a second hydraulic component, and a main flow control valve for controlling flow of pressurized fluid to the at least one auxiliary flow control valve. The at least one auxiliary flow control valve and the main flow control valve are movable between a first configuration and a second configuration. Pressurized fluid is provided to operate the first hydraulic component while the at least one auxiliary flow control valve and the main flow control valve are in the first configuration. Pressurized fluid is provided to operate the second hydraulic component while the at least one auxiliary flow control valve and the main flow control valve are in the second configuration.

In some aspects, the first hydraulic component is operable to perform one of the following functions: index tilt the feed in a left/right direction; index tilt the feed in a fore/aft direction; rotate a consumable store; raise/lower a loading arm for loading the consumable; rotate the loading arm; open/close jaws for gripping the consumable; and operate a washer loading arm for loading a washer.

In some aspects, the second hydraulic component is operable to perform another one of the following functions: index tilt the feed in a left/right direction; index tilt the feed in a fore/aft direction; rotate a consumable store; raise/lower a loading arm for loading the consumable; rotate the loading arm; open/close jaws for gripping the consumable; and operate a washer loading arm for loading a washer.

In some aspects, the first hydraulic component is operable to actuate a portion of the feed, and the second hydraulic component is operable to actuate a portion of a magazine.

In some aspects, the first hydraulic component is operable to actuate a portion of the feed, and the second hydraulic component is operable to actuate a portion of a loading arm for transferring the consumable from a magazine to the drill head.

In some aspects, the drilling and bolting rig further includes a loader configured to retrieve the consumable from a magazine and load the consumable into a drill head. The loader includes an arm operable to engage the consumable. The arm is supported for both rotational and translational movement.

In some aspects, the hydraulic circuit further includes a function select line selectively providing pressurized fluid to move the at least one auxiliary flow control valve between the first configuration and the second configuration.

In some aspects, function select line may be toggled between a first pressure condition in which the at least one auxiliary flow control valve is in a first position and a second pressure condition in which the at least one auxiliary flow control valve is in a second position.

In some aspects, the at least one auxiliary flow control valve includes a first auxiliary flow control valve associated with the first hydraulic component and a second auxiliary flow control valve associated with the second hydraulic component. Each of the first auxiliary flow control valve and the second auxiliary flow control valve are moveable between a first position and a second position.

In some aspects, the first auxiliary flow control valve and the second auxiliary flow control valve are neutrally biased toward the first position in which pressurized fluid is directed to operate the first hydraulic component, and movement of the first auxiliary flow control valve and the second auxiliary flow control valve to the second position causes pressurized fluid to be directed to operate the second hydraulic component.

In some aspects, the first hydraulic component is part of a first sub-circuit and the second hydraulic component is part of a second sub-circuit that is arranged in parallel with the first sub-circuit.

In some aspects, the main flow control valve is a three-position, solenoid-actuated, electronically-controlled valve, and the at least one auxiliary flow control valve is a two-position, hydraulic valve.

In some aspects, the at least one auxiliary flow control valve is biased toward a neutral position in which pressurized fluid is directed to operate the first hydraulic component.

The disclosure provides, in one aspect, a drilling and bolting rig comprising: a carousel rotatable about a carousel axis and including a plurality of stations configured to support a plurality of consumables; one or more actuators configured to rotate the carousel about the carousel axis; a position sensor coupled to the carousel; and an electronic processor coupled to the one or more actuators and the position sensor. The electronic processor is configured to detect, using the position sensor, a rotational position of the carousel; and rotate, using the one or more actuators, the carousel based on the rotational position of the carousel.

In some aspects, the position sensor is a magnetic rotary encoder.

In some aspects, the position sensor includes a Hall-sensor.

In some aspects, the position sensor is an intrinsically safe position sensor and includes an encoder housing, and the encoder housing is fixed to the carousel such that the Hall-sensor extends into the carousel and is in close proximity to a magnet attached to the carousel.

The disclosure provides, in another aspect, a control panel for a drill rig of an automatic bolter comprising: a keypad including an overlay; a plurality of buttons provided on the keypad and configured to control various functions of the drill rig; a plurality of force sensing resistor material corresponding to the plurality of buttons provided below the overlay, wherein a drop in resistance of a force sensing resistor material of the plurality of force sensing resistor material corresponds to a force applied to the corresponding button of the plurality of buttons; and a display and a speaker provided on the keypad. The plurality of buttons are divided between a plurality of control button banks, each control button bank of the plurality of control button banks corresponding to a particular component of the drill rig.

In some aspects, the overlay has a thickness between 0.15 millimeters (mm) and 3 mm.

In some aspects, the control panel further includes a first light emitting diode (LED) and a second LED corresponding to a first operation and a second operation of the drill rig. The first LED provides a status indication of the first operation, and the second LED provides a status indication of the second operation. The first LED and the second LED are multicolor LEDs.

In some aspects, the control panel further includes a first landmark provided between a first control button bank and a second control button bank of the plurality of control button banks.

In some aspects, the control panel further includes a second set of landmarks provided around a first button and a second button of the first control button bank.

In some aspects, the control panel further includes a third landmark around a third button of the first control button bank and a fourth button provided below the third button without a landmark.

In some aspects, the first landmark, the second set of landmarks and the third landmark are raised landmarks.

In some aspects, the second set of landmarks and the third landmark are engraved landmarks.

In some aspects, the first button is provided above a second button, wherein the second set of landmarks are directional landmarks indicating upwards and downwards directions around the first button and the second button respectively, wherein the first button and the second button control an upward and downward movement respectively of a component of the drill rig.

In some aspects, the third landmark is a directional landmark indicating an upwards direction around the third button, wherein the third button and the fourth button control a clockwise and counterclockwise rotation respectively of a component of the drill rig.

In some aspects, the control panel further includes a bounding box provided around the first control button bank.

In some aspects, the control panel further includes a connector that allows a connection of a second control panel configured to control the automatic bolter from a distance.

The disclosure provides, in another aspect, a method for fully automated operation of a drill rig for an automatic bolter, the method comprising: receiving, with a controller of the drill rig, a full automation mode request; automatically performing, using the drill rig, a drilling operation on a working surface in response to receiving the full automation mode request; automatically performing, using the drill rig, a resin injection operation on the working surface subsequent to the drill operation; and automatically performing, using the drill rig, a bolting operation on the working surface subsequent to the resin injection operation In some aspects, the method further includes determining, using the controller, whether an error has occurred during one of the automatic drilling operation, the automatic resin injection operation, and the automatic bolting operation; directing a user to manually perform an operation when the error has occurred; receiving, via a control panel, user input corresponding to the operation; and performing, using the controller, the operation based on user input.

In some aspects, the method further includes determining, using the controller, whether the error is resolved; generating, using the controller, an alert indicating that the drill rig is ready for automated operation; receiving, via the control panel, an input to resume automated operation; and resuming, using the controller, one of the drilling operation, the resin injection operation, and the bolting operation.

In some aspects, performing one of the automatic drilling operation, the automatic resin injection operation, and the automatic bolting operation includes rotating the carousel to one of a drill loading position, a resin cartridge loading position, a bolt loading position, and an adapter loading position.

In some aspects, rotating the carousel to one of the drill loading position, the resin cartridge loading position, the bolt loading position, and the adapter loading position further includes controlling, using the controller, a first actuator based on rotation position signals received from an intrinsically safe rotary encoder of the carousel.

The disclosure provides, in another aspect, a drill rig for an automatic bolter comprising: a carousel rotatable about an axis and configured to store one or more consumables; a drill head configured to apply the one or more consumables to a working surface; and a loading assembly. The loading assembly includes a loading arm configured to move laterally between the carousel and the drill head, and clamps at one end of the loading arm configured to secure the one or more consumables. The drill rig further includes a controller coupled to the carousel, the drill head, and the loading assembly. The controller is configured to receive a full automation mode request; automatically perform a drilling operation on the working in response to receiving the full automation mode request; automatically perform a resin injection operation on the working surface subsequent to the drill operation; and automatically perform a bolting operation on the working surface subsequent to the resin injection operation.

In some aspects, to automatically perform the bolting operation, the controller is further configured to: rotate, using a first actuator, the carousel to a bolt loading position; secure a bolt from the carousel to the loading arm; load, using the loading arm, the bolt to the drill head; align, using the drill head, the bolt with a hole in the working surface; rotate, using the first actuator, the carousel to an adapter loading position; secure the adapter from the carousel to the loading arm; load, using the loading arm, the adapter to the drill head; drive, using the drill head and the adapter, the bolt into the working surface; secure the adapter from the drill head to the loading arm; and unload, using the loading arm, the adapter to the carousel.

In some aspects, the controller is further configured to determine whether an error has occurred during one of the automatic drilling operation, the automatic resin injection operation, and the automatic bolting operation; direct a user to manually perform an operation when the error has occurred; receive, via a control panel, user input corresponding to the operation; and perform the operation based on user input.

In some aspects, the controller is further configured to determine whether the error is resolved; generate an alert indicating that the drill rig is ready for automated operation; receive, via the control panel, an input to resume automated operation; and resume one of the drilling operation, the resin injection operation, and the bolting operation.

In some aspects, the drill rig further includes a first actuator configured to rotate the carousel about the axis; and an intrinsically safe rotary encoder mounted to the carousel and configured to provide rotation position signals corresponding to a rotary position of the carousel. The controller is coupled to the first actuator and the intrinsically safe rotary encoder and the controller is further configured to control the first actuator to rotate the carousel to one of the drill loading position, resin cartridge loading position, the bolt loading position, and the adapter loading position based on the rotation position signals received from the intrinsically safe rotary encoder.

Other aspects of the disclosure will become apparent by consideration of the detailed description and accompanying drawings.

BRIEF DESCRIPTION OF THE DRAWINGS

FIGS. 18A-18M are schematic view of the drill rig of FIG. 1, performing a bolt cycle.

FIG. 31 is a flowchart of a method for controlling a bolt operation of the drill rig of FIG. 1 in an automatic mode.

FIG. 32 is a flowchart of a method for controlling an error-handling operation of the drill rig of FIG. 1 in an automatic mode.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects may be implemented in software (for example, stored on non-transitory computer-readable medium) executable by one or more processing units, such as a microprocessor, an application specific integrated circuits ("ASICs"), or another electronic device. As such, it should be noted that a plurality of hardware and software based devices, as well as a plurality of different structural components may be utilized to implement the invention. For example, "controllers" described in the specification may include one or more electronic processors or processing units, one or more computer-readable medium modules, one or more input/output interfaces, and various connections (for example, a system bus) connecting the components.

Figure 1:
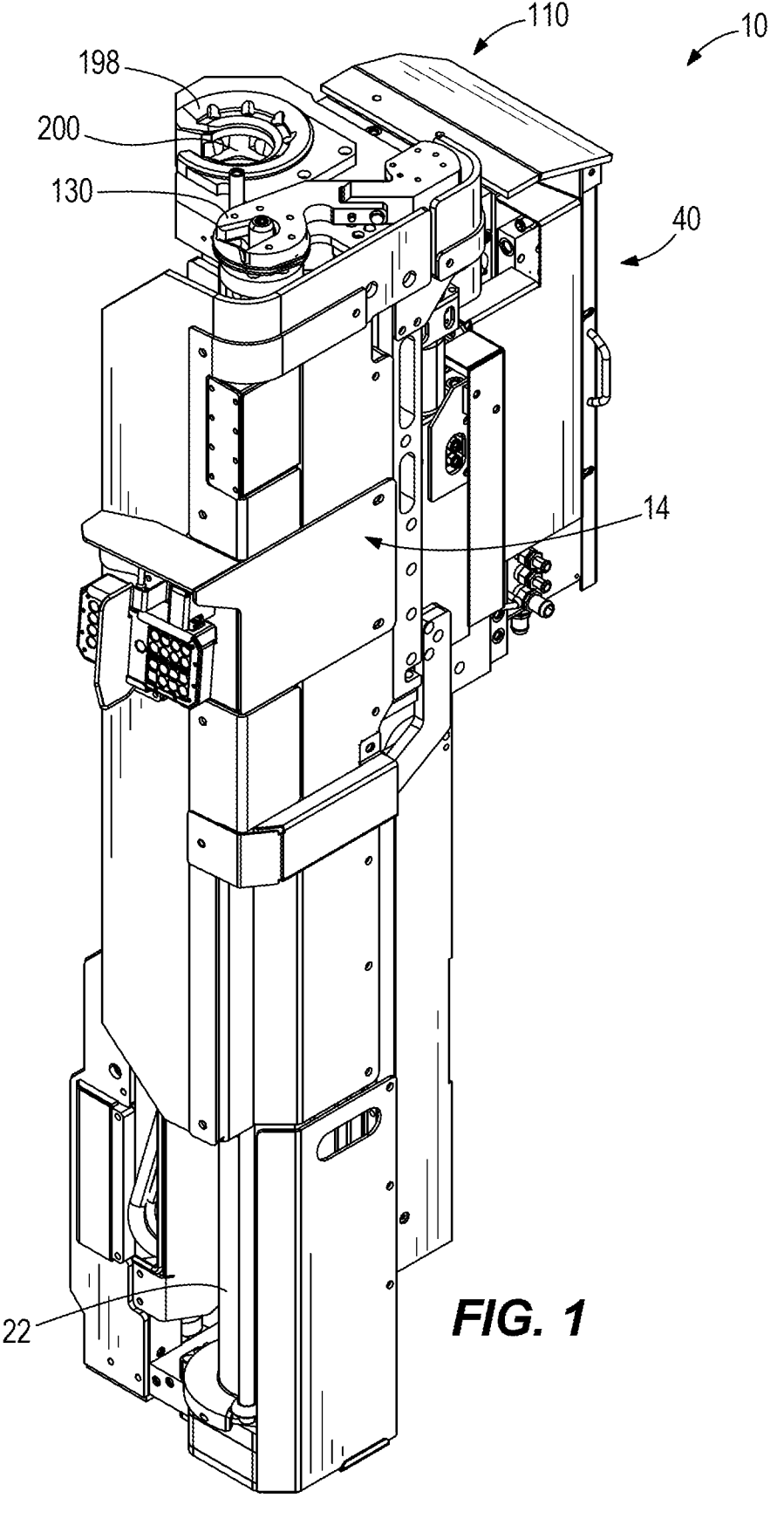
FIG. 1 is a perspective view of a drill rig in accordance with an embodiment of the disclosure.
Figure 2:
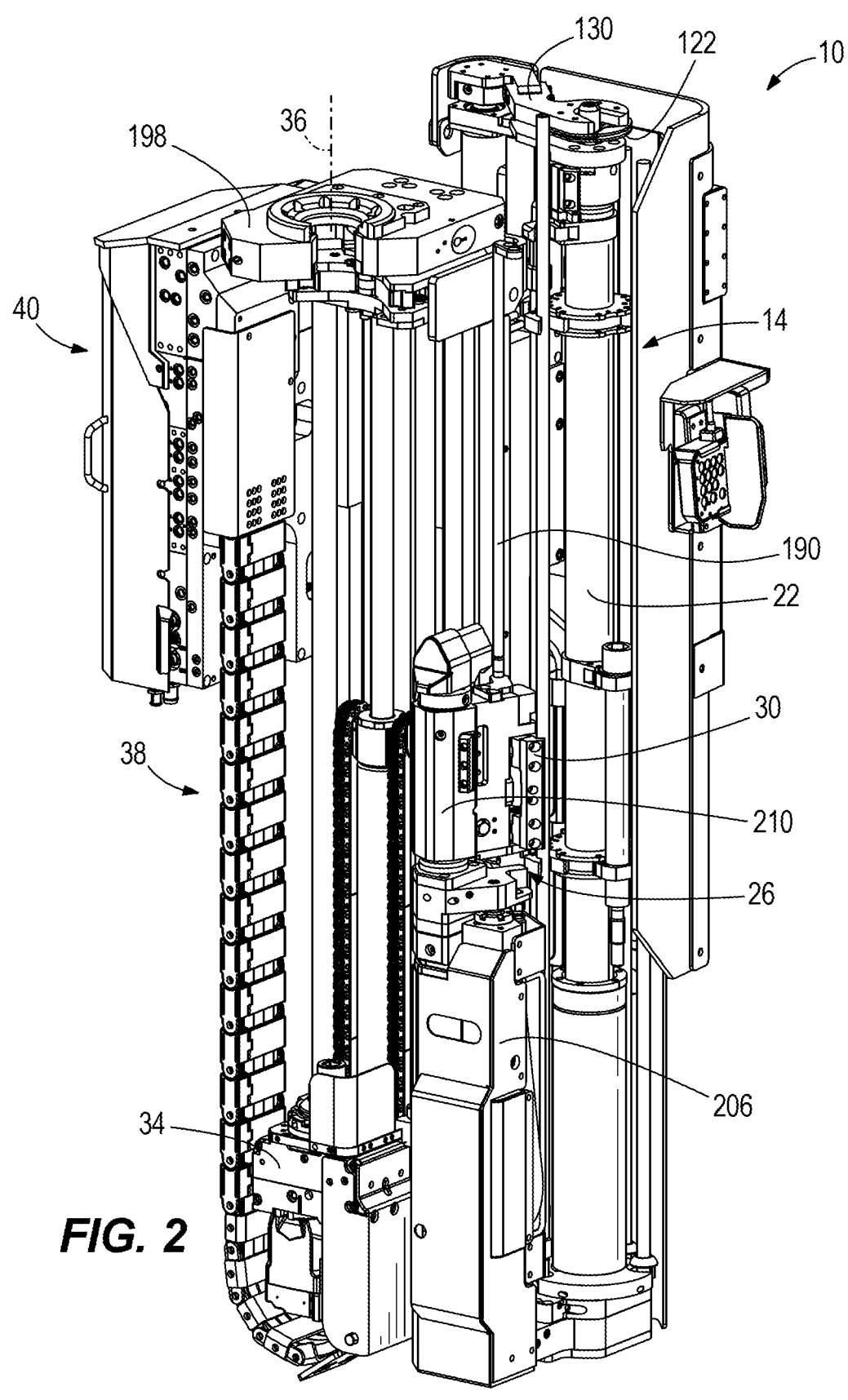
FIG. 2 is another perspective view of the drill rig of FIG. 1.
Figure 3:
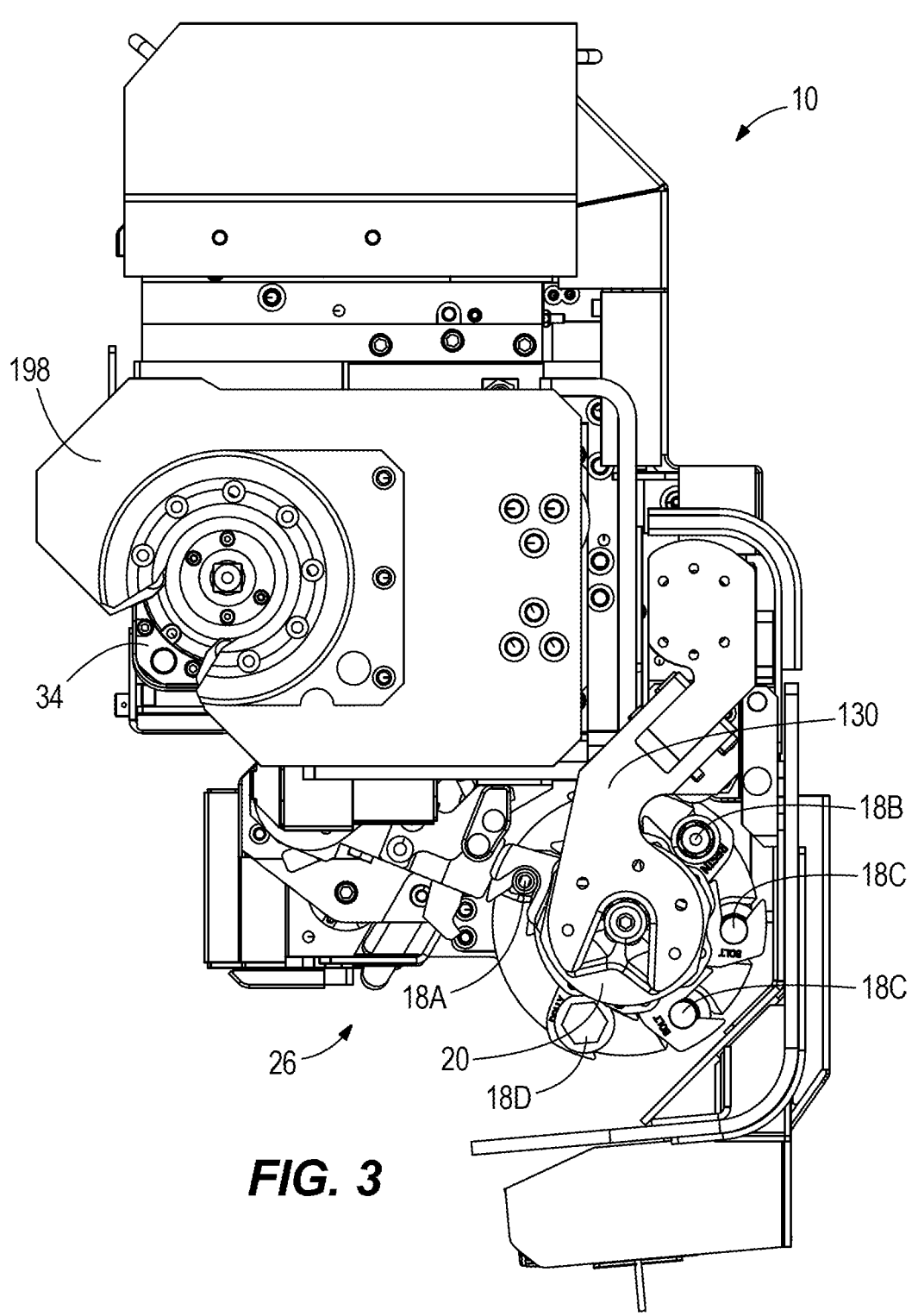
FIG. 3 is a top view of the drill rill of FIG. 1.
Figure 4:
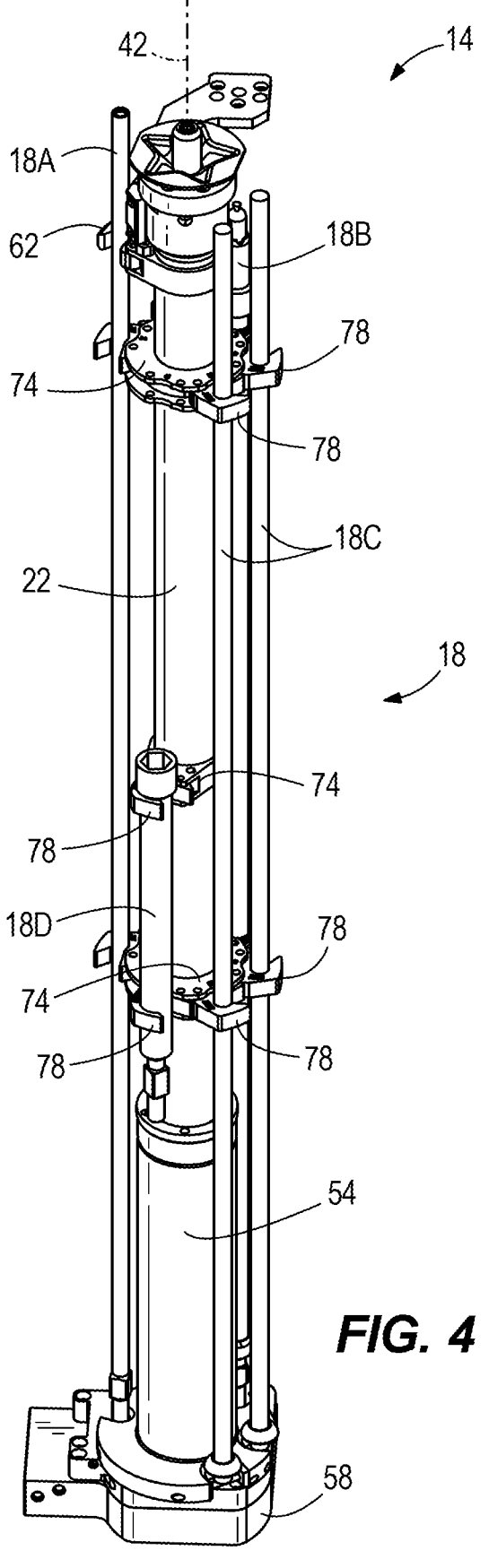
FIG. 4 is a perspective view of the drill rig of FIG. 1, illustrating a carousel.

With reference to FIGS. 1-3, a drill rig 10 (i.e., a drilling rig, a bolting rig) is operable to drill or bolt into a work surface (e.g., a mine side wall, a mine roof, etc.). The drill rig 10 includes a storage or magazine assembly (e.g., carousel assembly 14) that includes, as illustrated in FIG. 4, consumables 18 (e.g., drill bits, bolts, resin cartridges, adaptors, expendables, self-drilling bolts, combined bolt-and-resin type bolts, extension drill rods, etc.) carried on a rotating magazine or carousel 22. The drill rig 10 also includes a loading assembly 26 with a loading arm 30 that retrieves one of the consumables 18 from the carousel 22 and loads the consumable 18 into a driver, such as a drill head 34. The drill head 34 and the consumable 18 are then fed or driven toward the work surface as the drill head 34 translates along a drill axis 36 on a track assembly 38. The drill rig 10 includes a controller 40 and is capable of automated operation. In some embodiments, a complete drill cycle, resin cycle, and bolt cycle, for example, can be performed by the drill rig 10 consecutively without manual interaction with a human operator. As explained in greater detail below, the automated drill rig 10 provides improvements in overall efficiency, safety, and compactness.

With reference to FIGS. 3 and 4, the carousel 22 of the carousel assembly 14 is rotatable about a carousel axis 42. In the illustrated embodiment, the carousel assembly 14 includes a plurality of consumables 18 (e.g., drill bits 18A, resin cartridges 18B, bolts 18C, adaptors 18D, expendables, etc.) carried on the carousel 22. The consumables 18 are of various sizes (i.e., different lengths, different diameters) and shapes. In the illustrated embodiment, the carousel assembly 14 includes six consumables 18: one drill bit 18A, two resin cartridges 18B, two bolts 18C, and an adaptor 18D. In other embodiments, the carousel assembly 14 includes any number of consumables or types of consumables. In the illustrated embodiment, the carousel 22 is circular. In other embodiments, the carousel is non-circular (e.g., oval shaped). The carousel 22 is rotatable about the carousel axis 42 to place a desired consumable in a position that the loading assembly 26 can retrieve the desired consumable. In the embodiment illustrated in FIGS. 3 and 4, the carousel 22 is shown with the drill bit 18A in a loading position such that the loading assembly 26 can access the drill bit 18A and load the drill bit 18A into the drill head 34. Other consumables can be rotated into the loading position as the carousel 22 is rotated.

Figure 5:
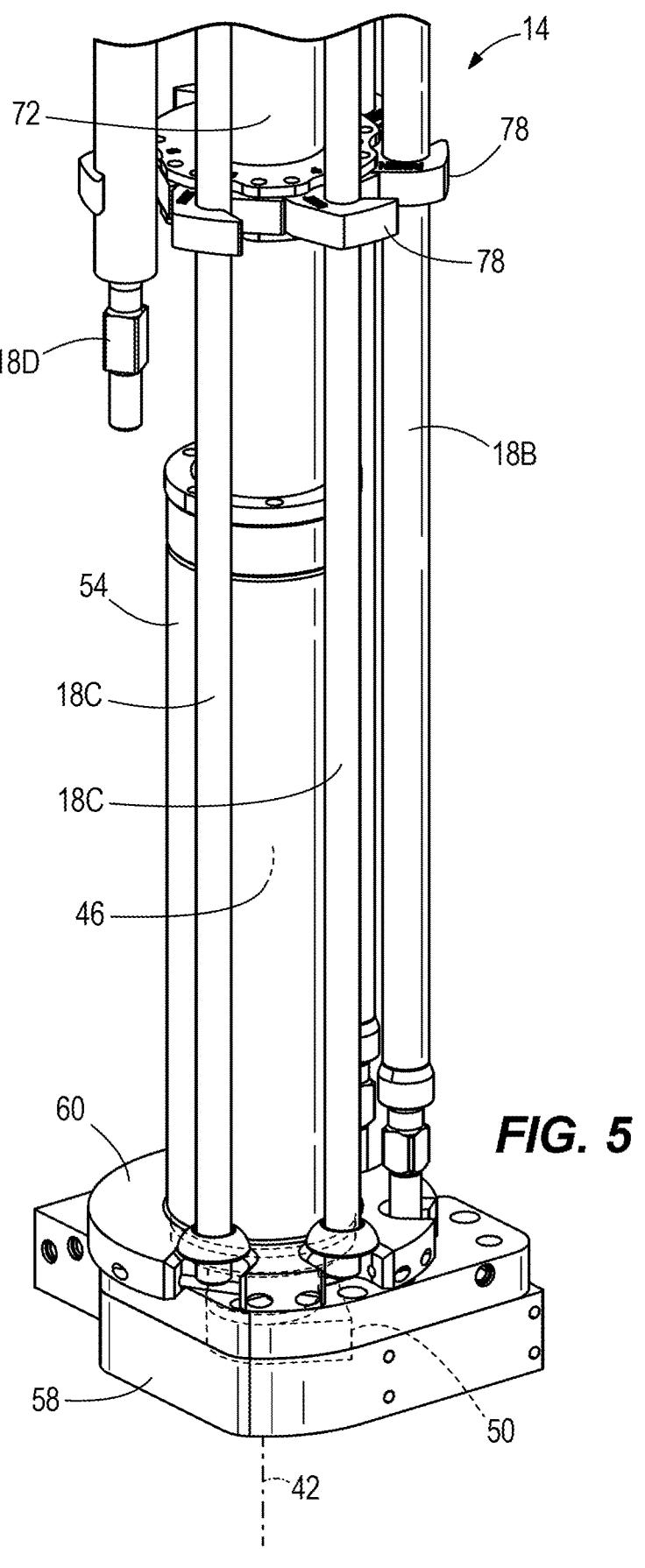
FIG. 5 is a partial perspective view of the carousel of FIG. 4.

With reference to FIG. 5, an actuator 46 (e.g., a hydraulic actuator) is positioned within the carousel 22 and is aligned with carousel axis 42. A sensor 50, such as a position sensor, a rotary sensor, or the like is coupled to the hydraulic actuator 46 and is also aligned with the carousel axis 42. In the embodiment illustrated in FIG. 5, the sensor 50 is an encoder 50 (e.g., rotary encoder). In the illustrated embodiment, the actuator 46 and the encoder 50 are positioned coaxially with the carousel axis 42. Specifically, as illustrated also in FIG. 4, the actuator 46 is positioned within a lower mast 54 of the carousel 22, and the encoder 50 is positioned within a casing 58 (shown transparently in FIG. 5). The encoder 50 may be optical, magnetic, or any other type of suitable sensor that is configured to detect the rotational position of the actuator 46 or the carousel 22. The encoder 50 may further be configured to detect an axial or translational position of the actuator 46 and/or carousel 22. In some embodiments, a plurality of actuators 46 may be positioned with the carousel 22. The carousel 22 may be supported on the casing 58, the actuator 46, and/or lower mast 54 by a bearing or base rack 60 surrounding the actuator 46.

Figure 6:
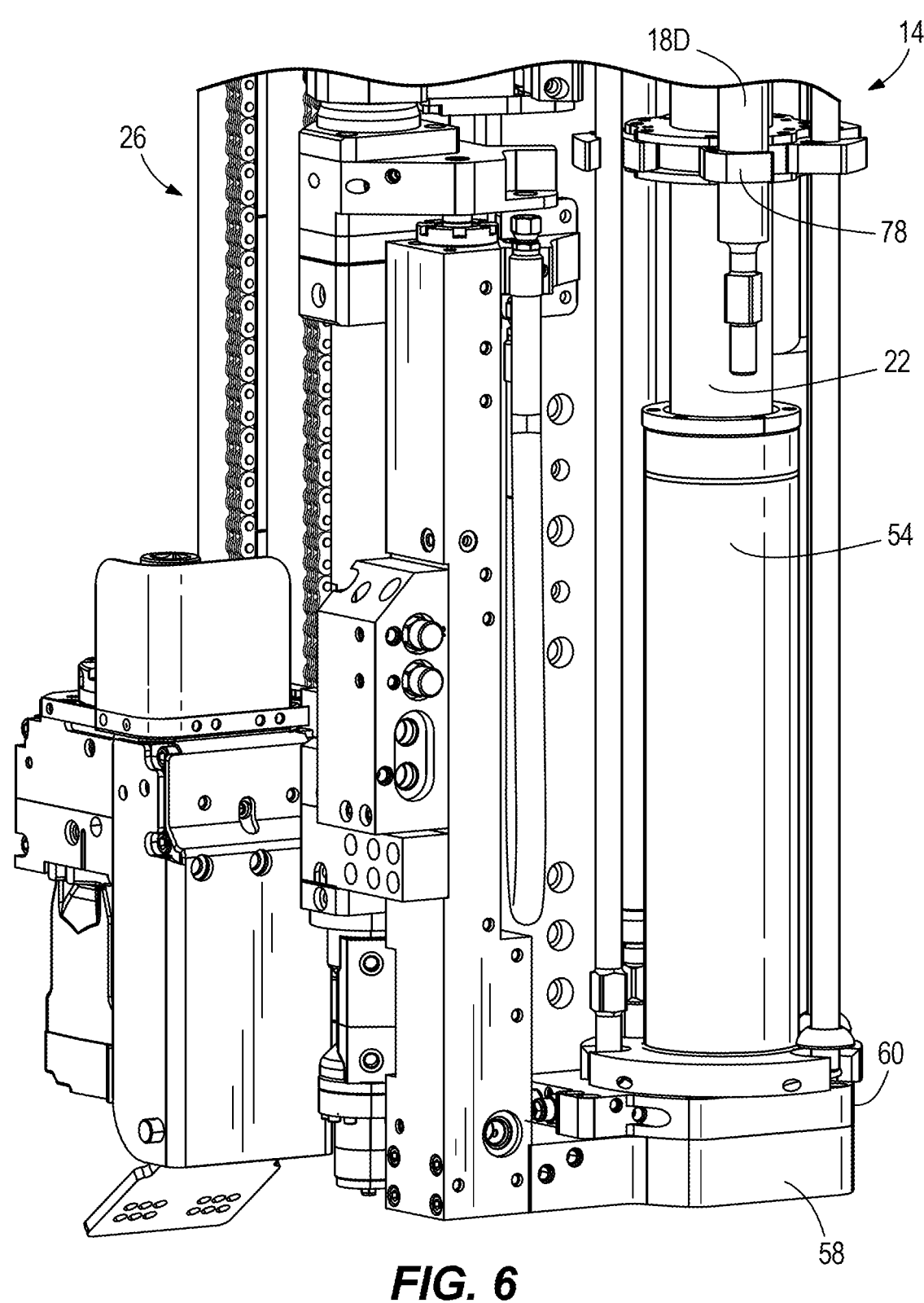
FIG. 6 is a partial perspective view of the drill rig of FIG. 1, illustrating an actuator carried on the carousel.
Figure 9A:
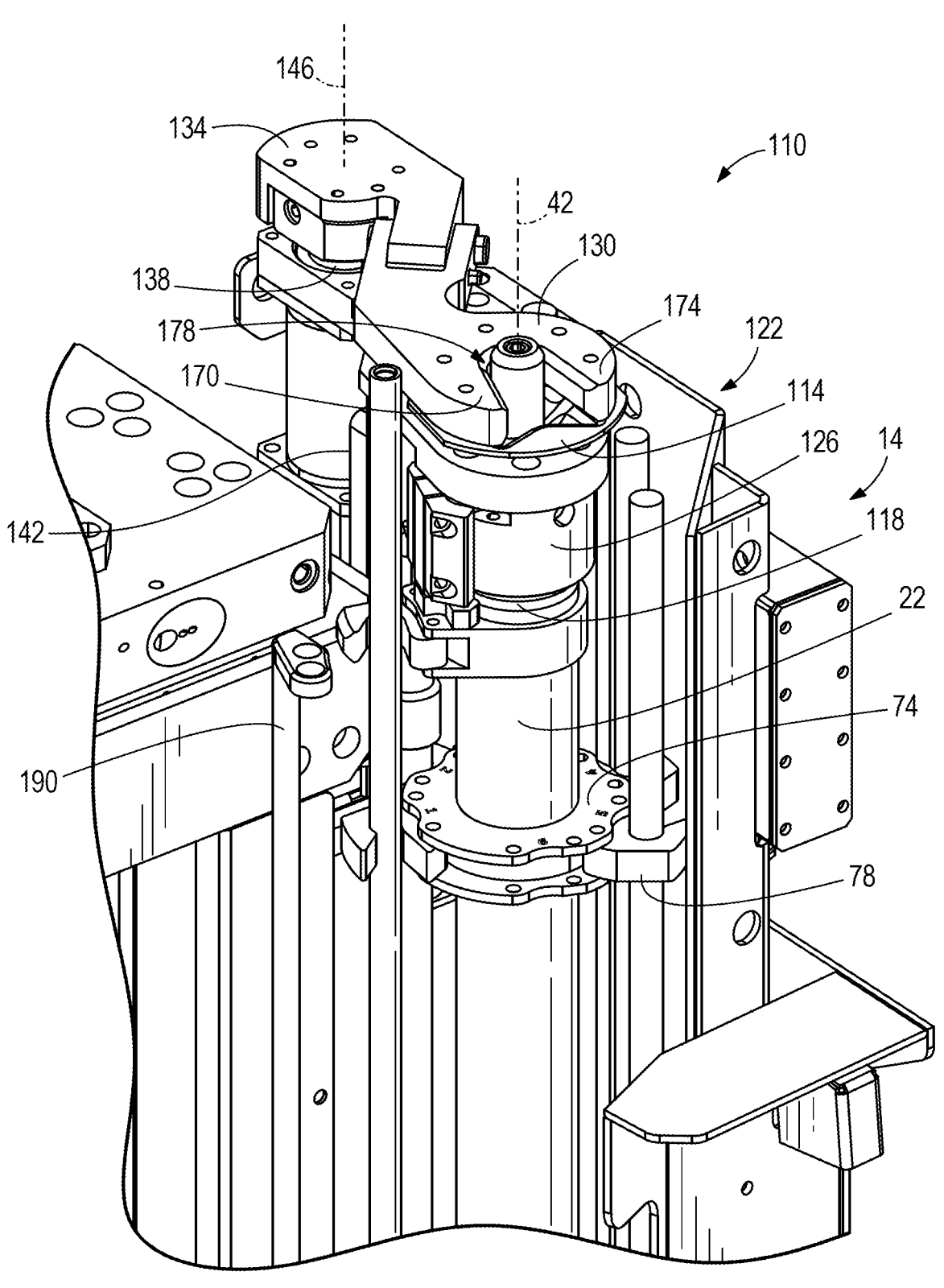
FIG. 9A is a perspective view of the drill rig of FIG. 1, illustrating a washer loader.
Figure 9B:
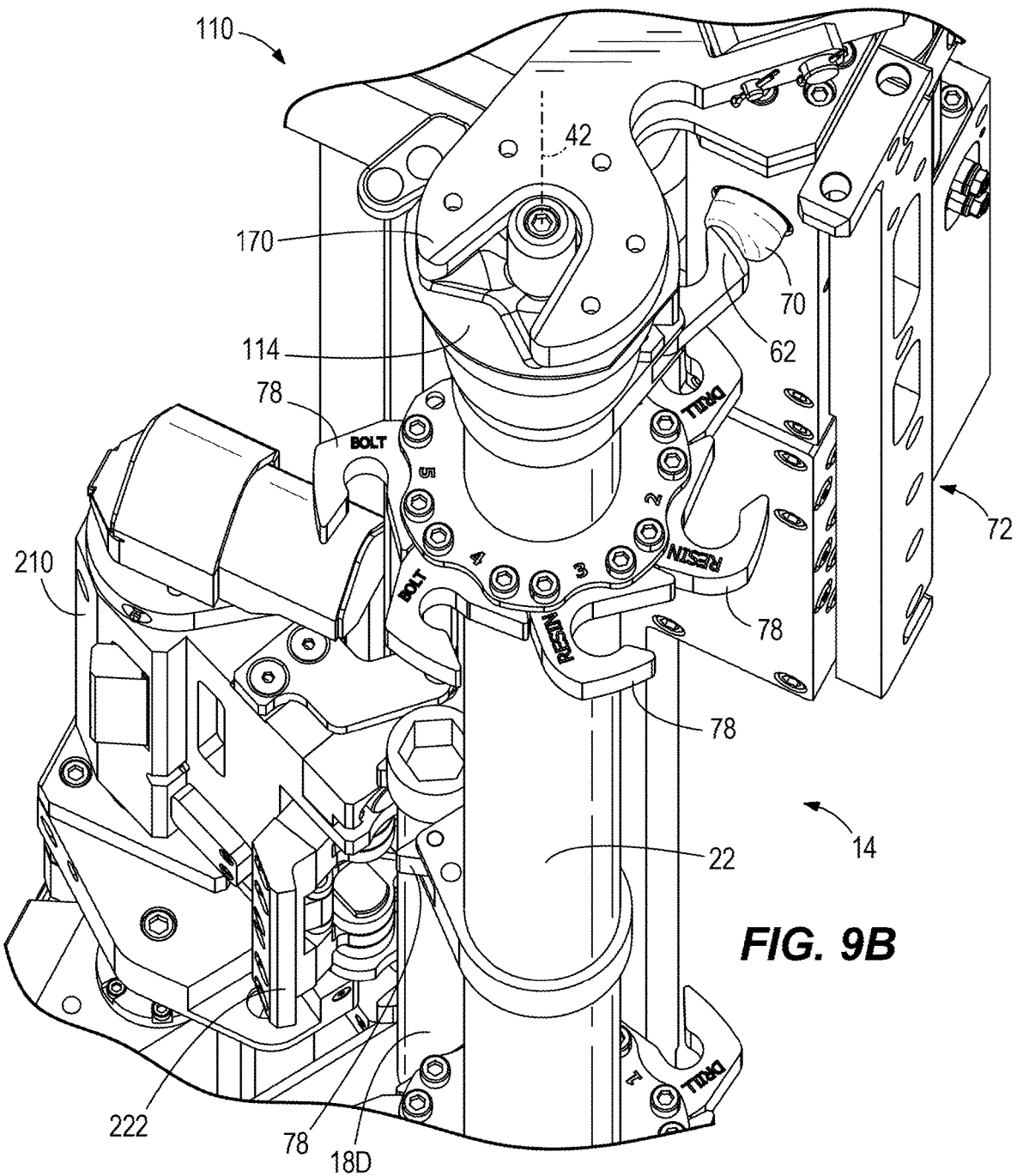
FIG. 9B is another perspective view of the drill rig of FIG. 1, illustrating a cam in engagement with a valve actuator.

With reference to FIGS. 6 and 9B, the carousel assembly 14 further includes an arm or cam 62 (FIG. 9B) supported on the carousel 22 for rotation therewith. In some embodiments, the cam 62 is supported on a post or pillar that is coupled to the carousel 22. In the illustrated embodiment, the cam 62 is positioned above (e.g., relative an axially direction) the adaptor 18D but may positioned axially below the adapter 18D in other embodiments. When the adaptor 18D is in the loading position (shown in FIG. 9A), the cam 62 is positioned to engage a corresponding valve actuator 70 (FIG. 9B) that is configured to actuate a hydraulic valve (e.g., a push button solenoid valve, a switch valve, etc.). In the illustrated embodiment, the valve actuator 70 is supported on a valve manifold 72 (see FIG. 9B). The valve manifold 72 may also house and/or support fluid circuitry and multiple other valves, cylinders, reservoirs, or the like, such as a hydraulic valve.

In response to the valve actuator 70 being actuated (e.g., depressed) by the cam 62, a valve may alter a fluid flow path of a hydraulic circuit. In the illustrated embodiment, actuating the valve actuator 70 causes a hydraulic circuit that is responsible for raising the loading arm 30 to be bypassed. In other words, actuating the valve actuator 70 may deactivate a portion of a hydraulic circuit that is responsible for a certain function (e.g., raising and lowering) of the loading assembly 26. For example, engagement of the valve actuator 70 causes the loading arm 30 not to raise or lower but only rotate. Since the adaptor 18D has a much shorter length than other consumables, bypassing the raising/lowering actuator of the loading assembly 26 may assist in transferring the adaptor 18D to the feed and/or simplify the path for the loading arm. In the illustrated embodiments, the cam 62 is positioned toward an upper portion of the carousel 22. In other embodiments, the cam 62 and the valve actuator 70 may be positioned at a lower or bottom portion of the carousel 22.

Figures 7, 8:
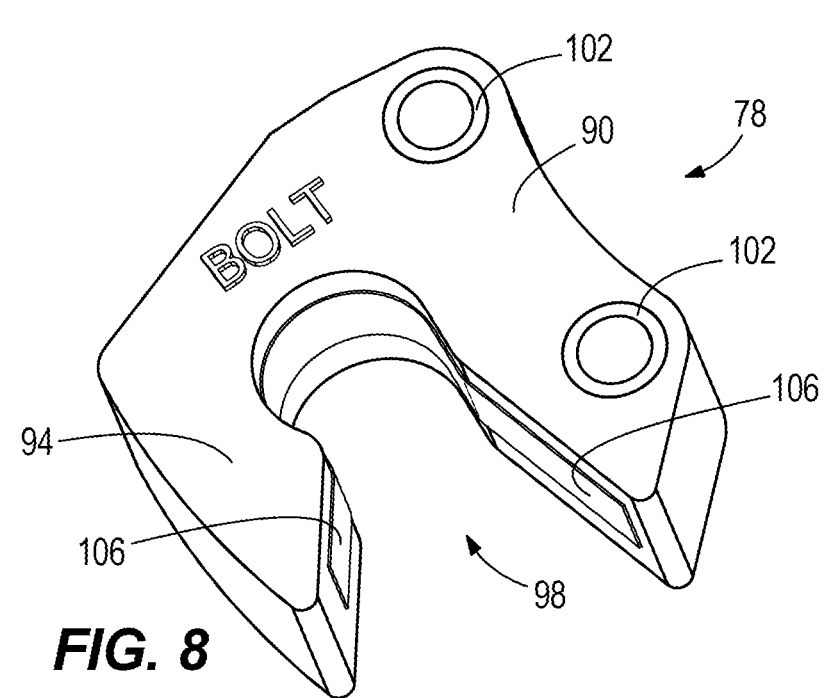
FIG. 7 is a partial perspective view of the carousel of FIG. 4, illustrating a plurality of clips on the carousel.
FIG. 8 is a perspective view of one of the plurality of clips of FIG. 7.

With reference to FIG. 7, a plurality of clip racks 74 are coupled to the carousel 22 at spaced locations along the carousel axis 42. Each of the clip racks 74 is configured to receive a plurality of clips 78 positioned about the carousel axis 42 (see FIG. 5). In the illustrated embodiment, the clips 78 are received within a recess 82 formed in the clip racks 74. The consumables 18 are removably coupled to the clips 78 carried on the carousel 22. In other words, the consumables 18 may be selectively attached or removed from the clips 78 by overcoming a biasing force. The clips 78 elastically deform to facilitate easy push-in and easy pull-out of the consumables 18 from the clips 78. In some embodiments, the clips 78 could include a grasping member or moveable lock configured to hold the consumables 18 in the respective clip 78.

With further reference to FIG. 7, the clips 78 are at least partially received within the recess 82 and secured to the clip rack 74 by fasteners 86. The clips 78 may be easily replaced or swapped out from the clip rack 74 according to the desired number and type of consumables 18 or as the clip 78 wears out. In the illustrated embodiment, the fasteners 86 are threaded bolts. In other embodiments, another type of fastener (e.g., lock bolt, nut, screw, magnet, clamp, etc.) may be used.

With reference to FIG. 8, the clip 78 includes a base 90 and a deflectable finger 94 that defines an opening 98 in which to receive the consumable 18. In some embodiments, the base 90 and the finger 94 are formed from an elastically deformable material, such as an elastically deformable plastic. The base 90 includes two apertures 102 configured to receive the fasteners 86 (see FIG. 7) that secure the clip 78 to the clip rack 74 when the base 90 of the clip 78 is positioned within the recess 82 (see FIG. 7). The clip 78 also includes wear strips 106 that are positioned adjacent the opening 98. The wear strips 106 provide a durable surface against which the consumable 18 may slide when moving in and out of the opening 98. In the illustrated embodiment, the clip 78 includes two wear strips 106 that are molded within the base 90 and the finger 94 (i.e., insert molded), and the wear strips 106 may be formed of spring steel. The wear strips 106 protect the base 90 and the finger 94 from excessive wear during normal operation. In other constructions, one or more wear strips 106 are omitted and the clip 78 itself is formed of or with a similar durable surface to that of the wear strips 106. In some embodiments, the wear strips 106 may provide additional elastic gripping force.

During operation of the carousel assembly 14, the actuator 46 can be activated by the controller 40 based on feedback from the encoder 50 to rotate the carousel 22 about the carousel axis 42. The carousel 22 is positioned in a desired orientation (e.g., an indexed position) to place the desired consumable 18 in the loading position, in which the desired consumable can be retrieved by the loading assembly 26. As illustrated in FIG. 9B, when the carousel 22 is positioned with the adaptor 18D in the loading position, the cam 62 engages the valve actuator to deactivate a portion of hydraulic circuit of the loading assembly 26. The consumables 18 are selectively coupled to the carousel 22 by the clips 78 and are released from the carousel 22 when the loading assembly 26 overcomes the threshold force required to deflect the finger 94, thereby releasing the consumable 18 from the carousel 22. Further detail of the carousel assembly 14 operation is described below in reference to the overall operation of the drill rig 10.

With specific reference to FIGS. 1 and 9A-11B, the drill rig 10 includes a washer loader assembly 110 configured to load a washer 114 onto a consumable 18 (e.g., a drill bit 18A). The washer loader assembly 110 includes a plurality of washers 122 (see FIG. 10) stored at an axial end 118 (e.g., an upper end) of the carousel assembly 14, forming a stack of washers 122. The stack of washers 122 is aligned (i.e., coaxial) with the carousel axis 42. In the illustrated embodiment, the stack of washers 122 is positioned on a plate 126 positioned adjacent an upper end of the carousel 22.

As illustrated in FIGS. 1-3 and 9A-11B, the washer loader assembly 110 also includes a carrier arm 130 that is configured to move a single washer 114 from the stack of washers 122 and position the washer 114 co-axially with the consumable 18 that is coupled to the loading assembly 26, as explained in greater detail below.

Figures 10, 11A:
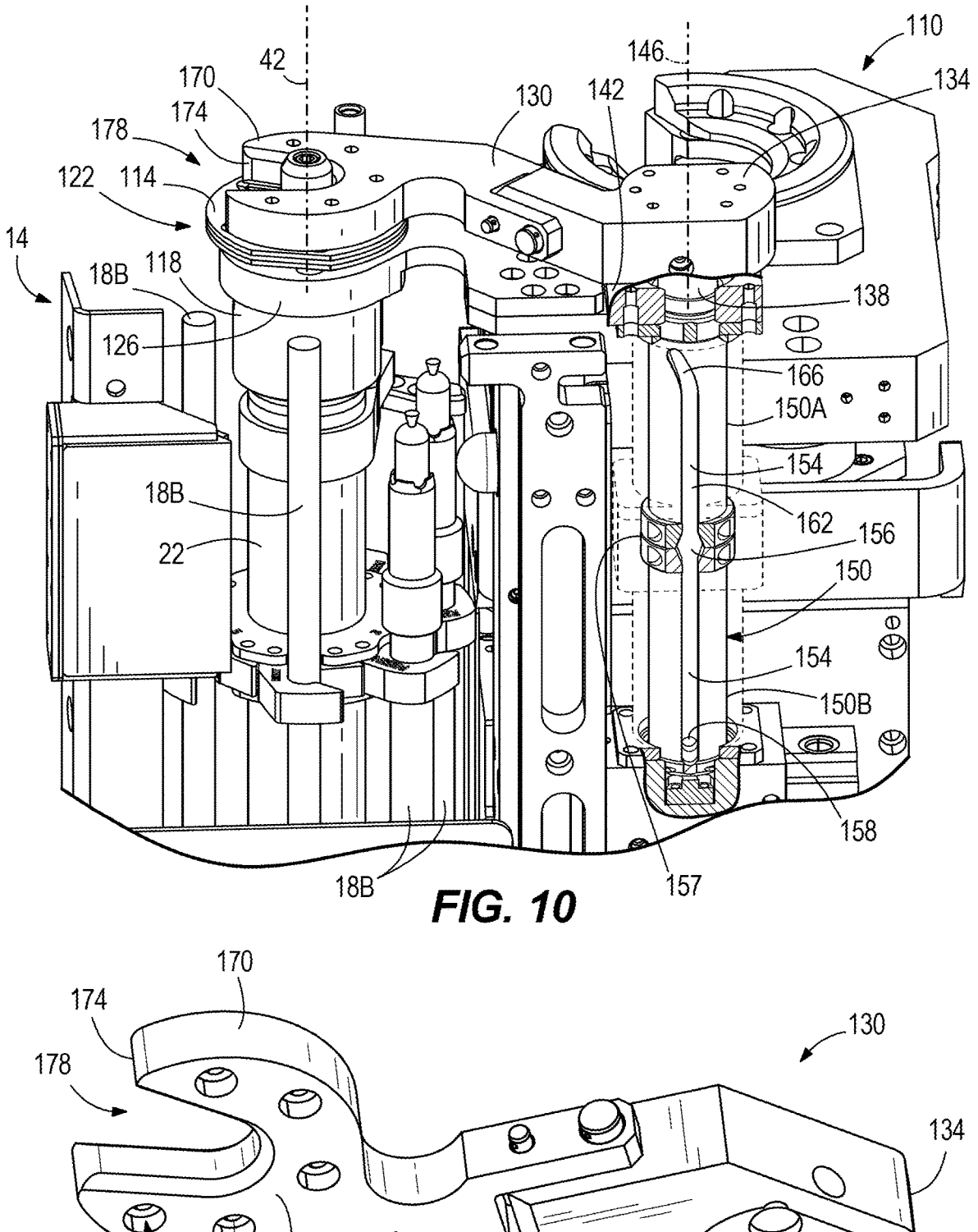
FIG. 10 is a perspective view of the washer loader of FIG. 9, illustrating a portion of an actuator cylinder as transparent.
FIG. 11A is a perspective view of a carrier arm of the washer loader of FIG. 9.

With specific reference to FIG. 10, the carrier arm 130 is coupled at a first end 134 to an actuator 138. The actuator 138, along with the carrier arm 130, is configured to extend and rotate with respect to a fixed casing 142 (see also FIG. 9A). Specifically, the actuator 138 defines an axis 146 along which the actuator 138 extends and about which the actuator 138 rotates. In the illustrated embodiment, a support post or sleeve 150 is positioned between the casing 142 and the actuator 138. The sleeve 150 includes a groove 154 that captures a corresponding pin 158 formed on the actuator 138. As the actuator 138 is extended from the casing 142, the pin 158 moves within the groove 154.

In the illustrated embodiment, the sleeve 150 may is a two-piece sleeve that includes a first sleeve (e.g., an upper sleeve) 150A and a second sleeve (e.g., a lower sleeve) 150B with the groove 154 extending in the upper and lower sleeves 150A, 150B. The groove 154 includes a flair 156 that allows for minor relative rotation between the sleeves 150A, 150B. The flair 156 may have a generally diamond shape and be disposed at a junction 157 between the first sleeve 150A and the second sleeve 150B. In the illustrated embodiment, the sleeves 150A, 150B are allowed to rotate by approximately (+/−) 5-degrees relative one another. Providing minimal relative rotation between the sleeves 150A, 150B allows for separate positional adjustments of the first sleeve 150A and the second sleeve 150B. Hydraulics may be applied to the sleeve 150 to improve control during movement of the actuator 138 and the arm 130.

With continued reference to FIG. 10, the groove 154 includes a linear portion 162 and a curved portion 166 position on either side of the flair 156. As the pin 158 moves along the linear portion 162 of the groove 154, the actuator 138 extends away from the casing 142, translating along the axis 146. As the pin 158 moves along the curved portion 166 of the groove 154, the actuator 138 extends away from the casing 142 along the axis 146 and rotates relative to the casing 142 about the axis 146. The flair 156 allows the pin 158 to slightly deviate from the linear portion 162 and the curved portion as it passes between the sleeves 150A, 150B. In other words, the actuator 138 extends and rotates simultaneously as the pin 158 moves past the flair 156 and through the curved portion 166 of the groove 154 in the sleeve 150. As a result, the carrier arm 130 is raised away from and rotated relative to the stack of washers 122 upon activation of the actuator 138. In the illustrated embodiment, a position of the groove 154 above the flair 156 can be adjusted relative a position of the groove 154 below the flair 156 to thereby adjust a starting or ending position of the carrier arm 130.

With reference to FIGS. 10 and 11, the carrier arm 130 includes a forked portion 170 positioned at a second end 174, opposite the first end 134. The forked portion 170 defines an opening 178 through which one of the consumables 18 may pass, as explained in greater detail below. The carrier arm 130 also includes one or more magnets 182 (i.e., a magnetic coupling) positioned adjacent a surface 186 that faces the stack of washers 122. In the illustrated embodiment, the magnets 182 are permanent magnets positioned within one or more recessed portions 183 on the arm 130. In other embodiments, the magnets 182 are permanent magnets positioned adjacent to the opening 178.

Figures 16A, 16B, 16C, 16D, 16E:
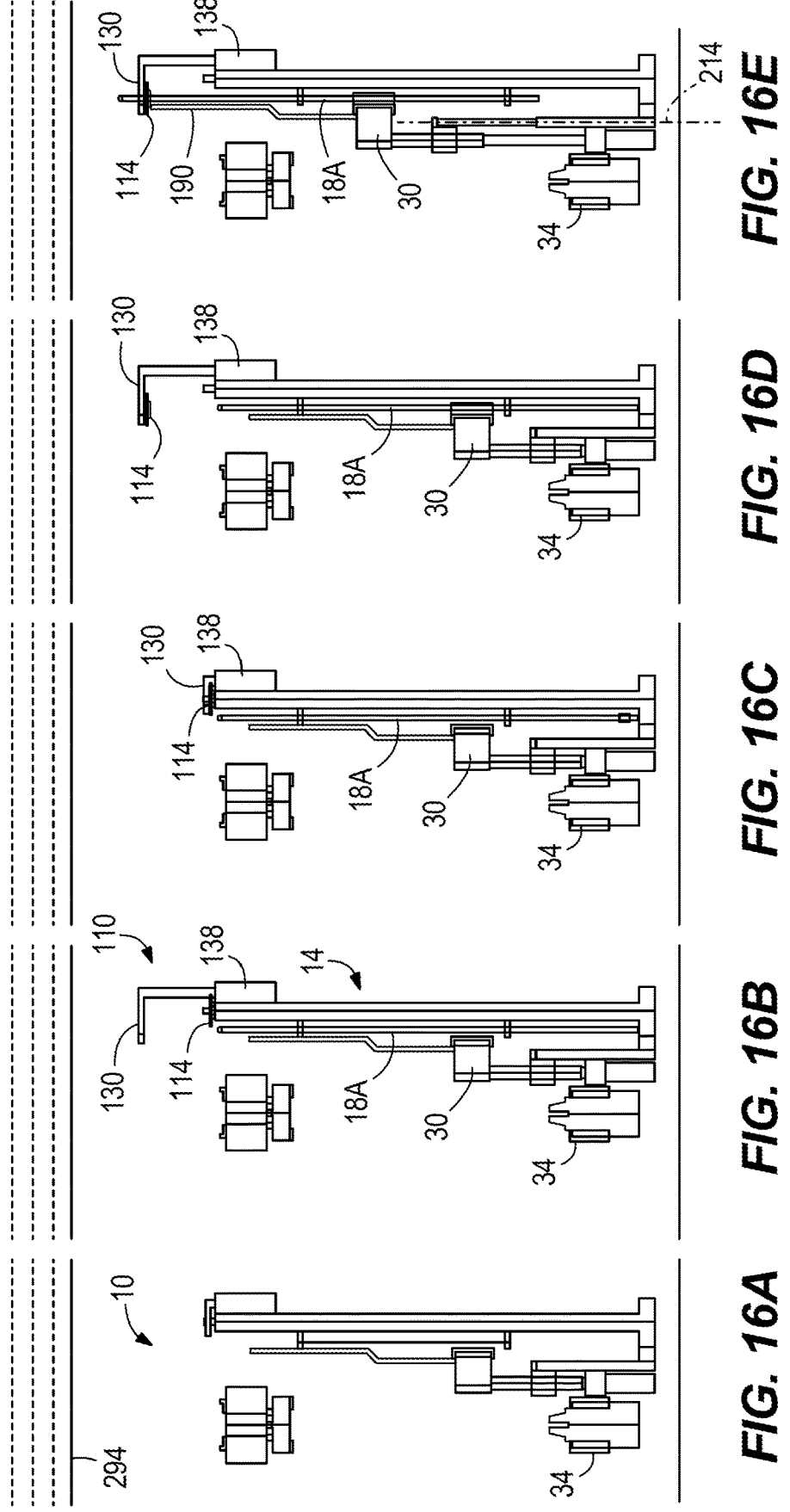
FIGS. 16A-16O are schematic views of the drill rig of FIG. 1, performing a drill cycle.
Figures 16F, 16G, 16H, 16I, 16J:
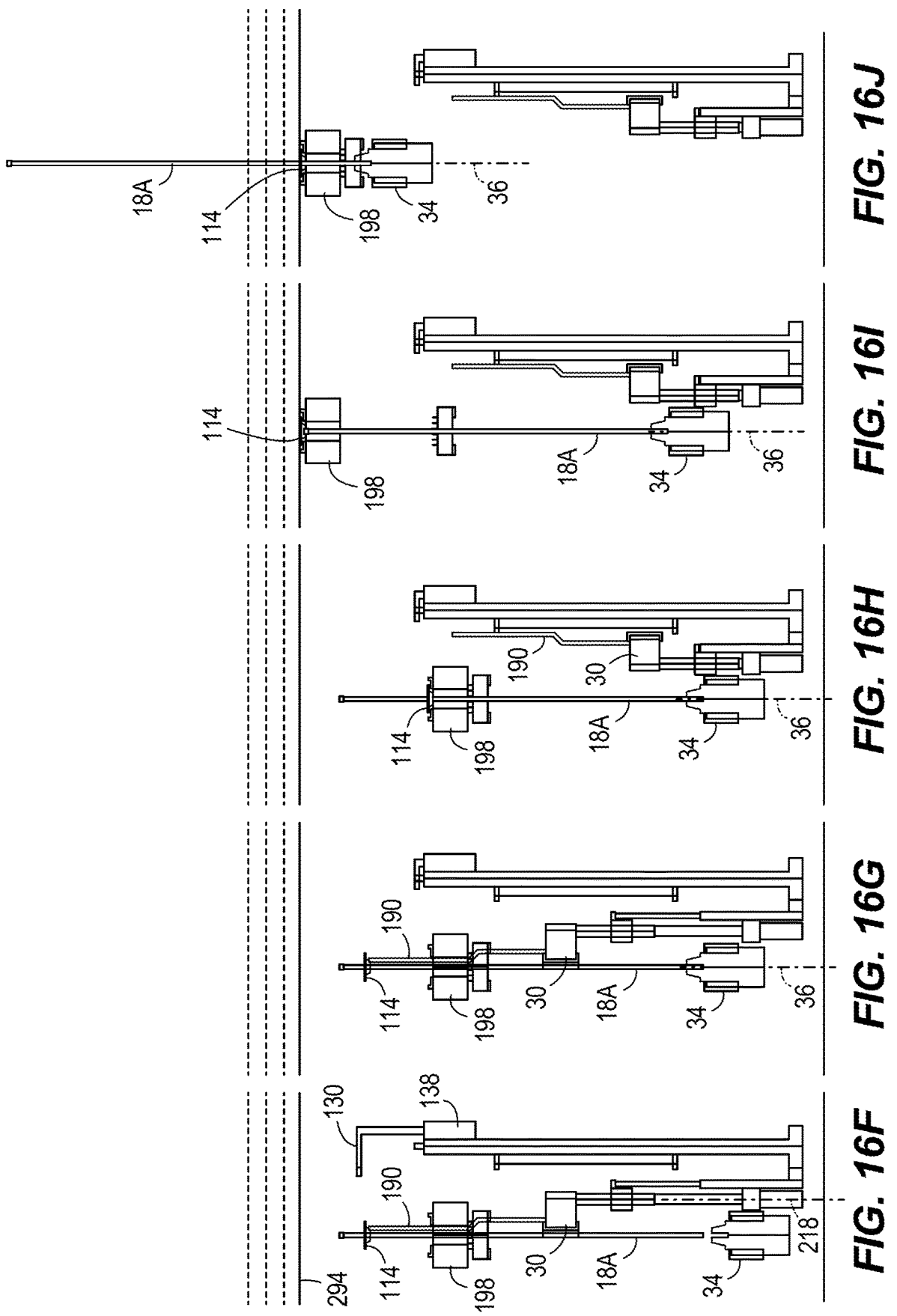

During operation of the washer loader assembly 110, the magnet 182 on the carrier arm 130 is capable of magnetically coupling one of the washers from the stack 122 to the carrier arm 130. The carrier arm 130 is then raised and rotated by the actuator 138 to reposition the single washer 114 from a stored position on the stack of washers 122 to a mounting position. In the mounting position, the washer 114 is aligned with a consumable 18 carried by the loading assembly 26 and is configured to receive the consumable 18 controlled by the loading assembly 26 (e.g., FIG. 16D-16F). In other words, with the washer 114 in the mounting position (FIG. 16D), the consumable 18 is translated by the loading assembly 26 through a central aperture in the washer 114 (FIG. 16E). The loading assembly 26 then moves the consumable 18 and the washer 114 away from the carrier arm 130, thereby breaking the magnetic coupling between the carrier arm 130 and the washer 114 (FIG. 16D-16F). As the consumable 18 and the washer 114 move away from the carrier arm 130, the consumable 18 moves through the opening 178 formed in the carrier arm 130.

Figure 11B:
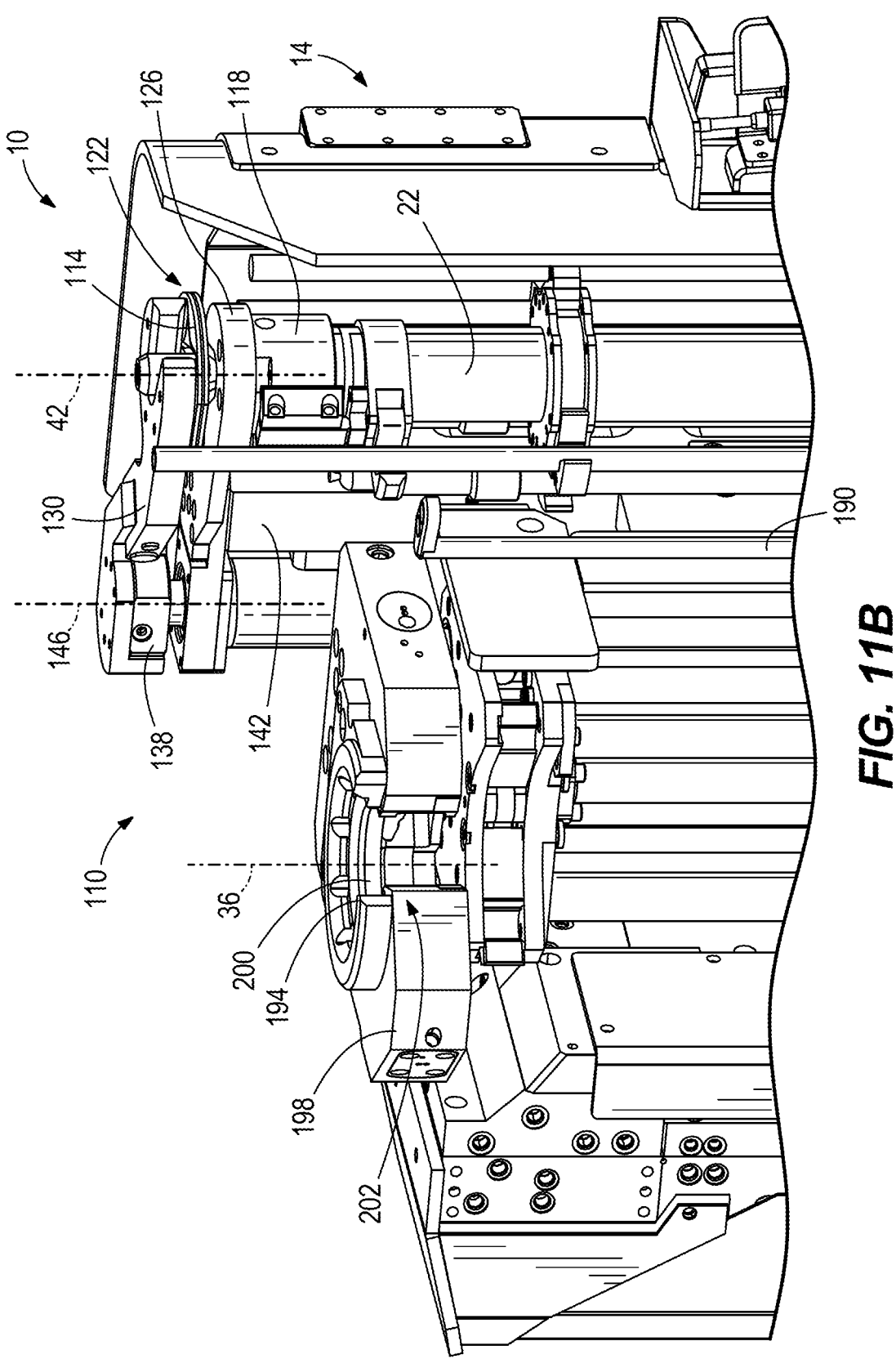
FIG. 11B is a partial perspective view of the drill rig of FIG. 1.

With reference to FIGS. 2, 9A, and 11B, a balance rod 190 is coupled to the loading assembly 26 and is configured to support the washer 114 once the washer 114 has been loaded onto the drill bit 18A. As described in greater detail below, the balance rod 190 supports the washer 114 in position on the drill bit 18A as the loading assembly 26 moves the drill bit 18A and until the drill bit 18A has been coupled to the drill head 34. Once the drill bit 18A has been coupled to the drill head 34, the washer 114 is received within a recess 194 formed in a top plate 198 of the drill rig 10. The top plate 198 includes an opening or bore 200 through which the consumable may be driven. The drill axis 36 is aligned with the bore 200. In the illustrated embodiment, the recess 194 is circular shaped and is aligned with the drill axis 36. The top plate 198 and the recess 194 include a section 202 that has been removed (i.e., a cut-out) in order to allow the consumable 18 to translate in and out of the bore of the top plate 198.

As such, the washer 114 is automatically loaded onto the drill bit 18A during a drill cycle (FIG. 16A-16O) of the drill rig 10. The drill rig 10 therefore automates the addition of the washer 114 to the consumable 18A, which would otherwise be loaded manually onto the consumable. The drill rig 10 also maintains the ability to override or temporarily halt operation of the washer loader 110 to selectively allow an operator the ability to load and/or unload a washer 114 on/from the consumable 18A.

As explained in more detail below, the washer loader assembly 110 automatically loads a washer 114 onto a desired consumable 18A, but not onto other consumables 18B, 18C, 18D that do not require a washer. The washer 114 is supported on the consumable 18A by the balance rod 190 until the consumable 18A is loaded in the drill head 34 and the washer 114 is received within the recess 194 formed in the top plate 198.

With reference to FIGS. 12A-12D, an alternate washer loader assembly 110a usable with the drill rig 10 obviates the need for the balance rod 190 coupled to the loading assembly 26. Rather than the balance rod 190 positioned on the loading assembly 26 to temporarily support the washer 114, the washer 114 is centered on the consumable 18A before the consumable 18A is centered in the drill head 34. Other than the balance rod 190 being obviated, the alternate washer loader assembly 110a operates in a similar or common manner as the washer loader assembly 100, as described below.

Figure 12A:
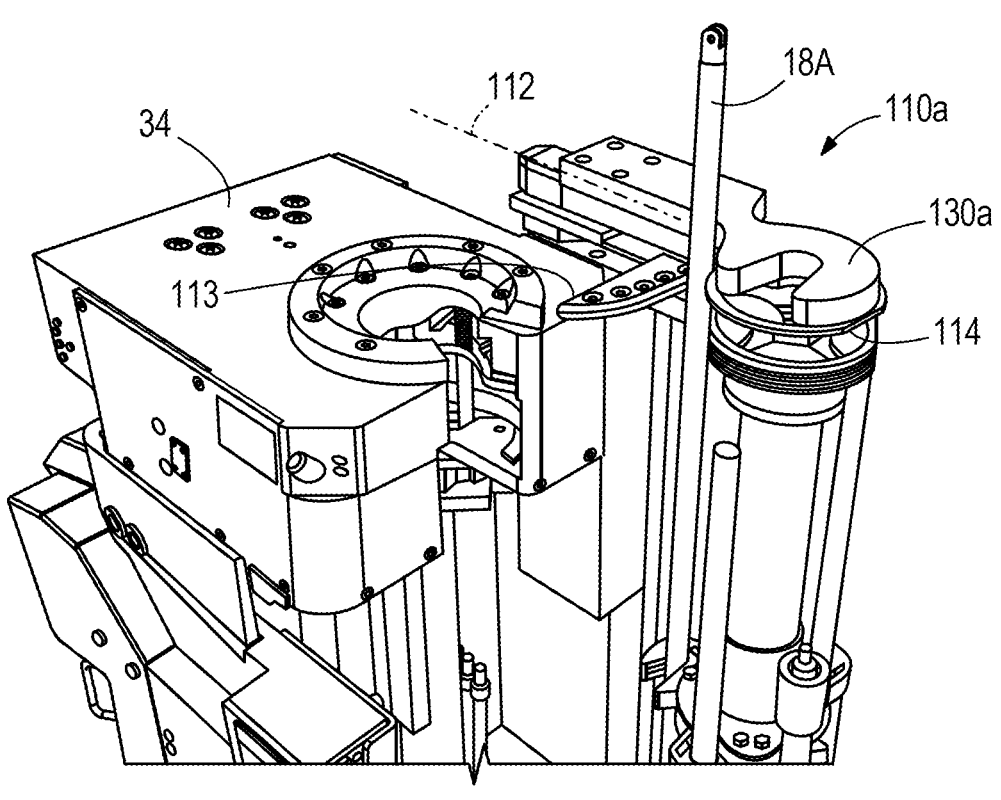
FIG. 12A is a perspective view of an alternate washer loader useable with the drill rig of FIG. 1, illustrating the alternate washer loader in a loading position.

FIG. 12A illustrates the alternate washer loader assembly 110a in a loading position, in which a loading arm 130a of the alternate washer loader assembly 110a is extended along a washer loader axis 112.

Figure 12B:
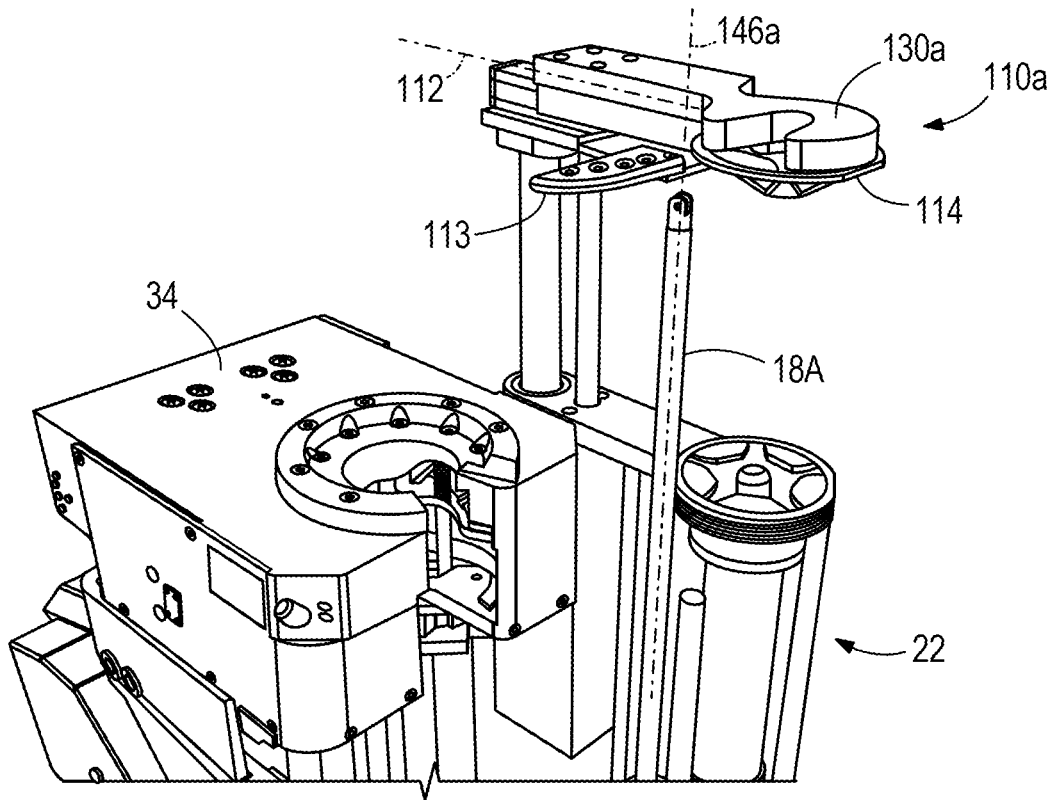
FIG. 12B is a perspective view of the alternate washer loader of FIG. 12A, illustrating the alternate washer loader in a lifted position.

FIG. 12B illustrates the alternate washer loader assembly 110a in a lifted position, in which the loading arm 130a of the alternate washer loader assembly 110a is extended along the washer loader axis 112 and lifted along a washer loader axis 146a. The loading arm 130a is lifted above an upper end of the consumable 18A supported on the carousel 22.

Figure 12C:
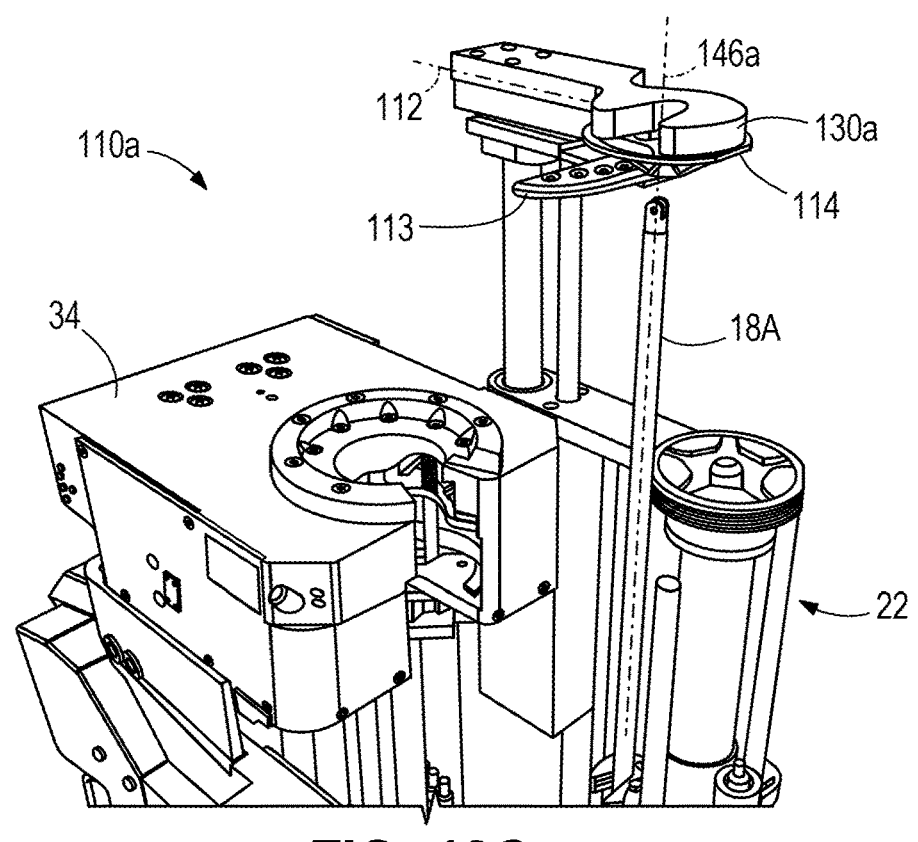
FIG. 12C is a perspective view of the alternate washer loader of FIG. 12A, illustrating the alternate washer loader in a lifted and retracted position.

FIG. 12C illustrates the alternate washer loader assembly 110a in a lifted and retracted position, in which the loading arm 130a of the alternate washer loader assembly 110a is retracted along a washer loader axis 112 relative the extended position. The loading arm 130a remains lifted above an upper end of the consumable 18A such that, as the loading arm 130a is retracted, a center of the washer 114 passes over a center of the consumable 18A. The consumable 18A is offset relative the washer 114 such that retracting the loading arm 130a centers the washer 114 over the consumable 18A.

Figure 12D:
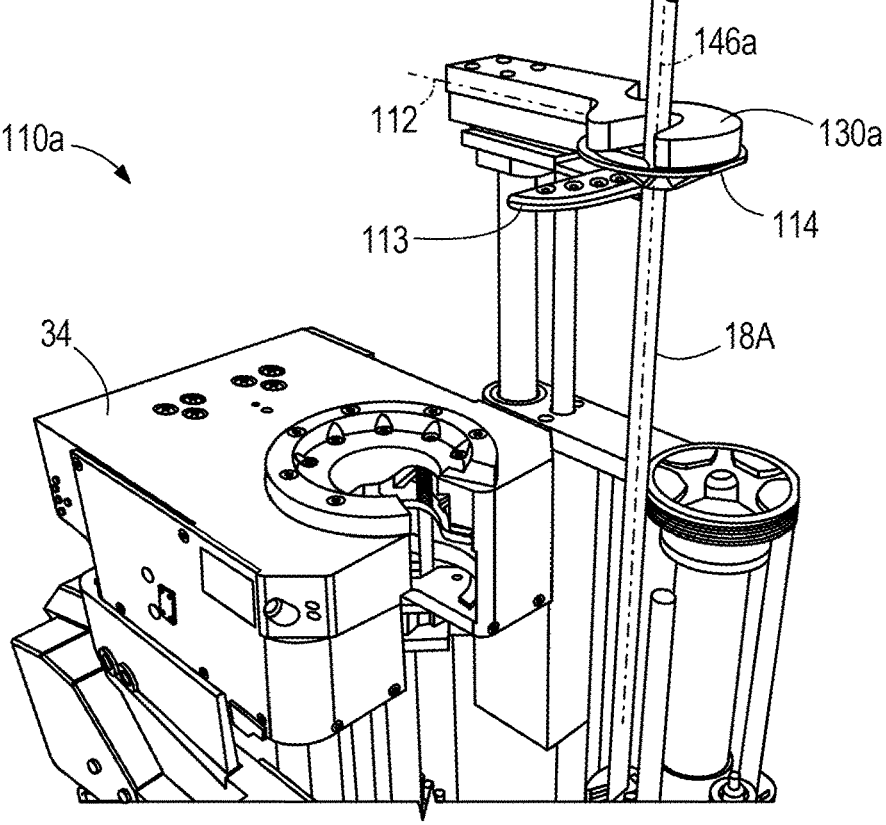
FIG. 12D is a perspective view of the alternate washer loader of FIG. 12A, illustrating the alternate washer loader in bit receiving position.

FIG. 12D illustrates the alternate washer loader assembly 110a in a bit receiving position, in which the loading arm 130a of the alternate washer loader assembly 110a is retracted along the washer loader axis 112 and lifted along the axis 146a. FIG. 12D further illustrates the consumable 18A lifted into the washer 114. The alternate washer loader assembly 110a further includes a guide protrusion 113 that extends from the alternate washer loader assembly 110a adjacent the loading arm 130a.

As shown in FIGS. 12A-12D, the guide protrusion 113 is partially curved to generally correspond to the curved movement of the loading assembly 26. The guide protrusion 113 is positioned on the alternate washer loader assembly 110a such that the washer 114 is guided into the drill head 34 as the loading assembly 26 rotates the consumable 18A and washer 114 out of/away from the loading arm 130a. In other words, the guide 113 extends far enough away from the loading arm 130a such that the washer 114 does not fall down the consumable 18A past the drill head 34.

Figure 13A:
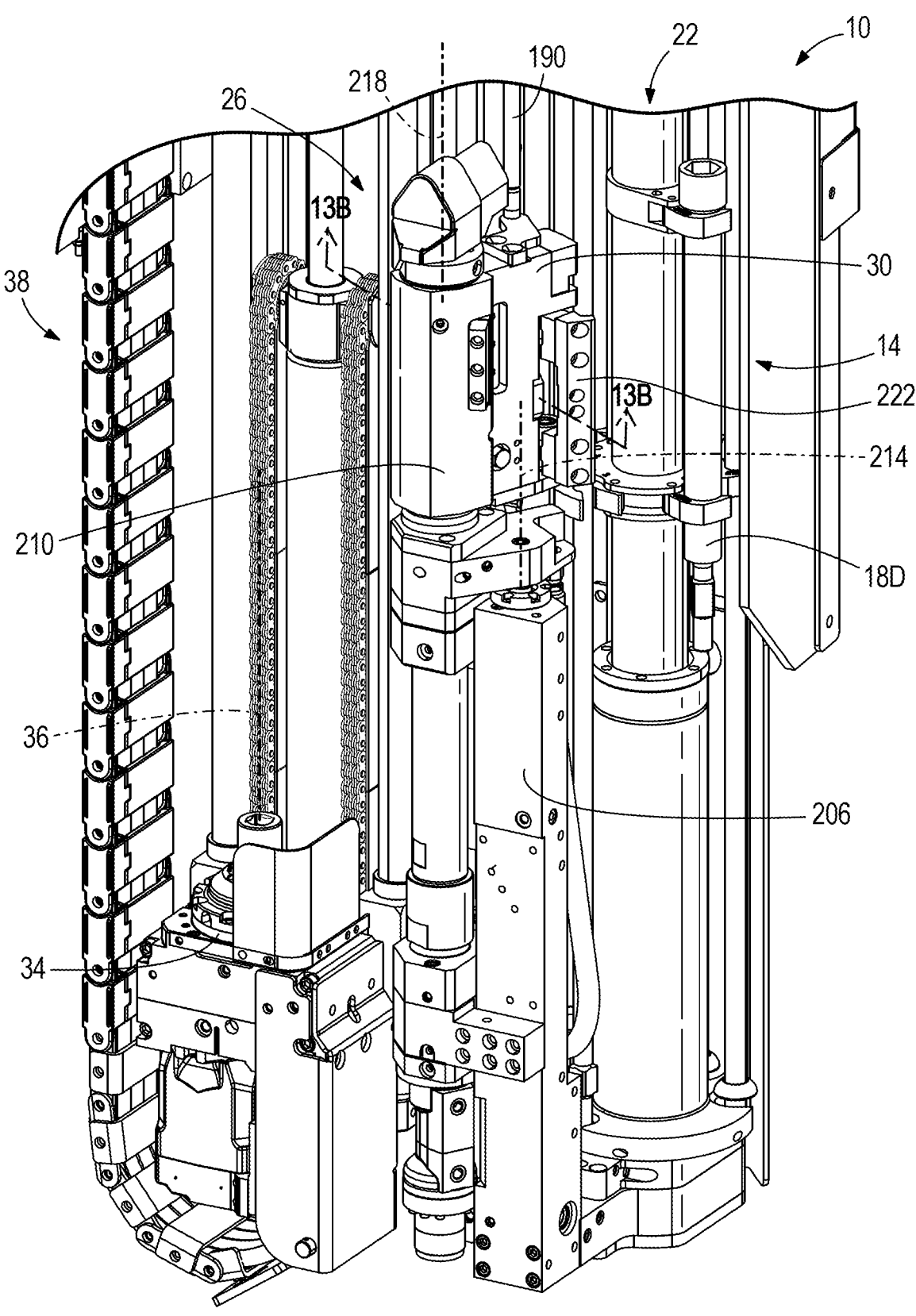
FIG. 13A is a partial perspective view of the drill rig of FIG. 1, illustrating a loading arm assembly.
Figure 13B:
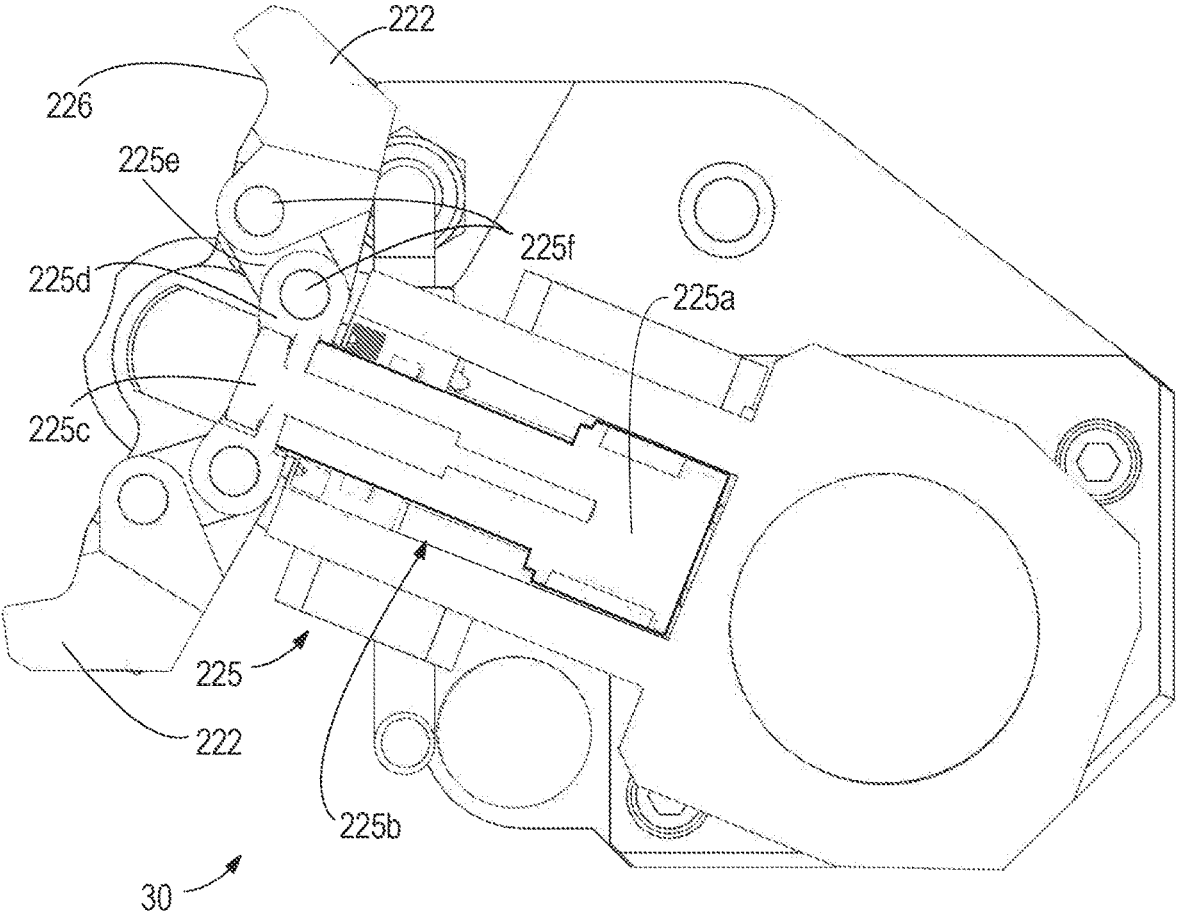
FIG. 13B is a cross-sectional top view of a portion of the loading arm assembly of FIG. 13A, taken along the section line 13B-13B of FIG. 13A.
Figure 14A:
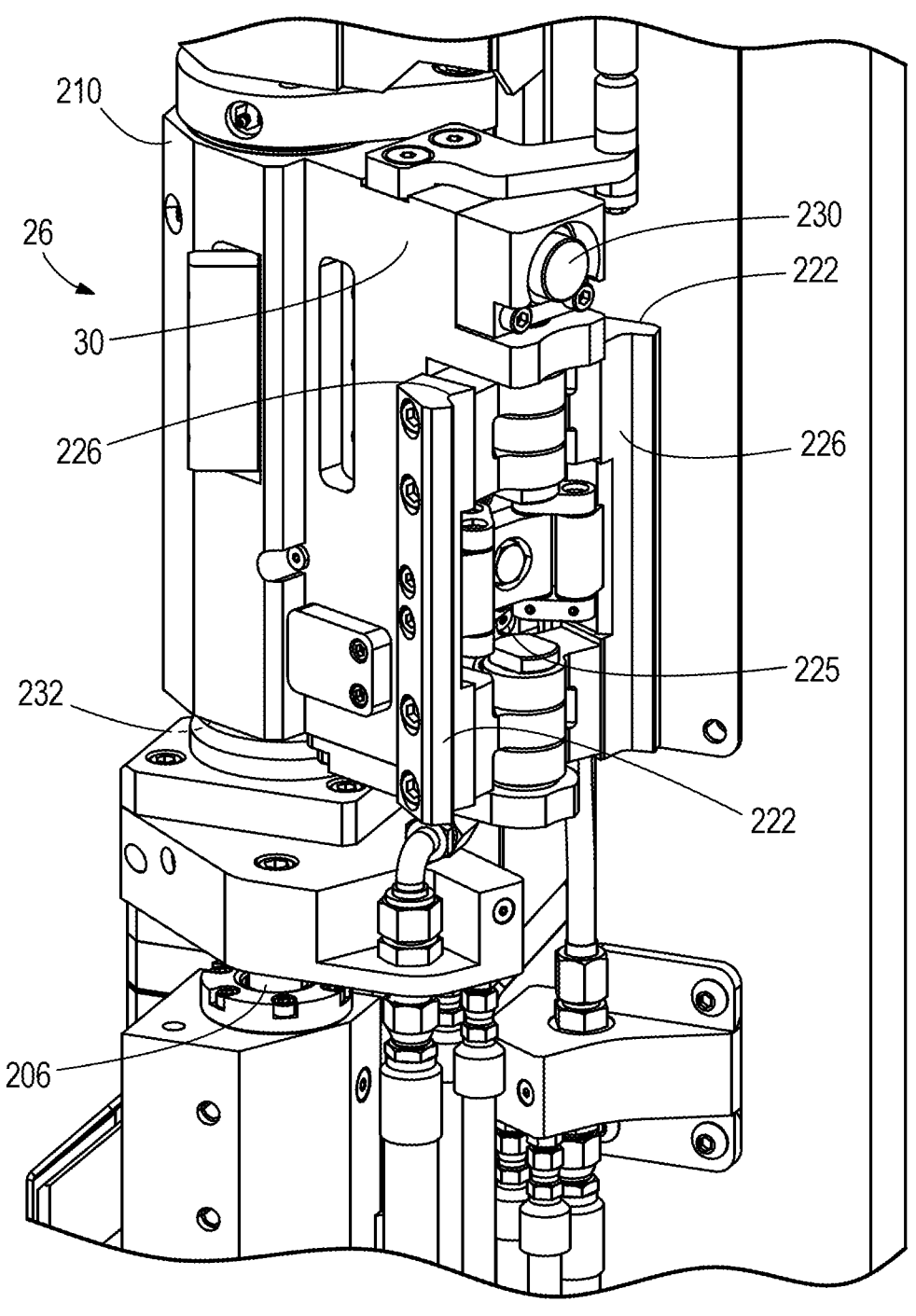
FIG. 14A is a perspective view of a loading arm of the loading arm assembly of FIG. 13.

With reference to FIGS. 13A, 13B, and 14A, the loading assembly 26 is illustrated with the loading arm 30 positioned adjacent the carousel assembly 14. Specifically, the loading arm 30 can be positioned adjacent to the consumables 18 (e.g., adaptor 18D) carried on the carousel 22 while in the loading position. The loading assembly 26 includes a first actuator 206 configured to raise and lower the loading arm 30 and a second, separate actuator 210 configured to rotate the loading arm 30. The first actuator 206 defines a first axis 214 and the second actuator 210 defines a second axis 218. In the illustrated embodiment, the first axis 214 is spaced apart and oriented parallel to the second axis 218. The first actuator 206 and the second actuator 210 allows for the loading arm 30 to be raised and lowered independently of rotation. In other words, the loading arm 30 can be raised or lowered (i.e., translated along the first axis 214) without being rotated (i.e., rotated about the second axis 218). Likewise, the loading arm 30 can be rotated about the second axis 218 without being raised or lowered along the first axis 214. Independent control of the loading arm 30 movement offers greater flexibility in controlling the loading assembly 26 to perform various tasks.

With continued reference to FIG. 13A, the loading arm 30 has a fixed length. The loading arm 30 does not need to be extended in order to move the consumables 18 from the carousel 22 or to load the consumable 18 into the drill head 34. In other words, a separate actuator is not required to translate the loading arm in a direction transverse to the second axis 218. Stated another way, the distance between the drill head 34 and the second axis 218 is equivalent to the distance between the consumables 18 in the loading position on the carousel 22 and the second axis 218. As such, a distance between the drill head 34 and the second axis 218 is equal to the distance between the second axis 218 and the carousel assembly 14.

With reference to FIGS. 13B and 14A, the loading arm 30 includes two clamp plates 222 that are configured to move between an open position (FIGS. 13B and 14A) and a closed position, where the clamp plates 222 are positioned around and secured to the consumable 18. In the illustrated embodiment, each clamp plate 222 includes a groove 226 in which to receive the consumable 18 when in the closed position. The movement of the clamp plates 222 and the shape of the grooves 226 in the clamp plates 222 are configured to capture consumables having a variety of diameters. The loading arm 30 also includes a sensor 230 (see FIG. 14A) positioned adjacent the clamp plates 222. As shown in FIG. 13B, a clamp actuator 225 may be operated to move the clamp plates 222, as detailed below. In some embodiments, the actuator 210 may be operated to move the clamp plates 222.

Referring to FIG. 13B, the clamp actuator 225 is operable to drive a piston that is positioned in an actuator housing 225b. A rod of the piston 225a is secured to a coupling plate 225d (e.g., by a bolt having a head 225c). The coupling plate 225d is coupled to the clamp plates 222 by a linkage 225e by, for example, one or more couplers 225f. The linkage or bar arrangement of the plate 225d, linkage 225e, and clamp plate 222 translates linear or axial movement of a part of the actuator 225 (e.g., the piston 225a) into rotational movement of the clamp plates 222. In the illustrated embodiment, the plate 225d is coupled to both clamp plates 222. In some embodiments, more than one linkage 225e may be coupled between the plate 225d and the clamp plate 222.

Figure 14B:
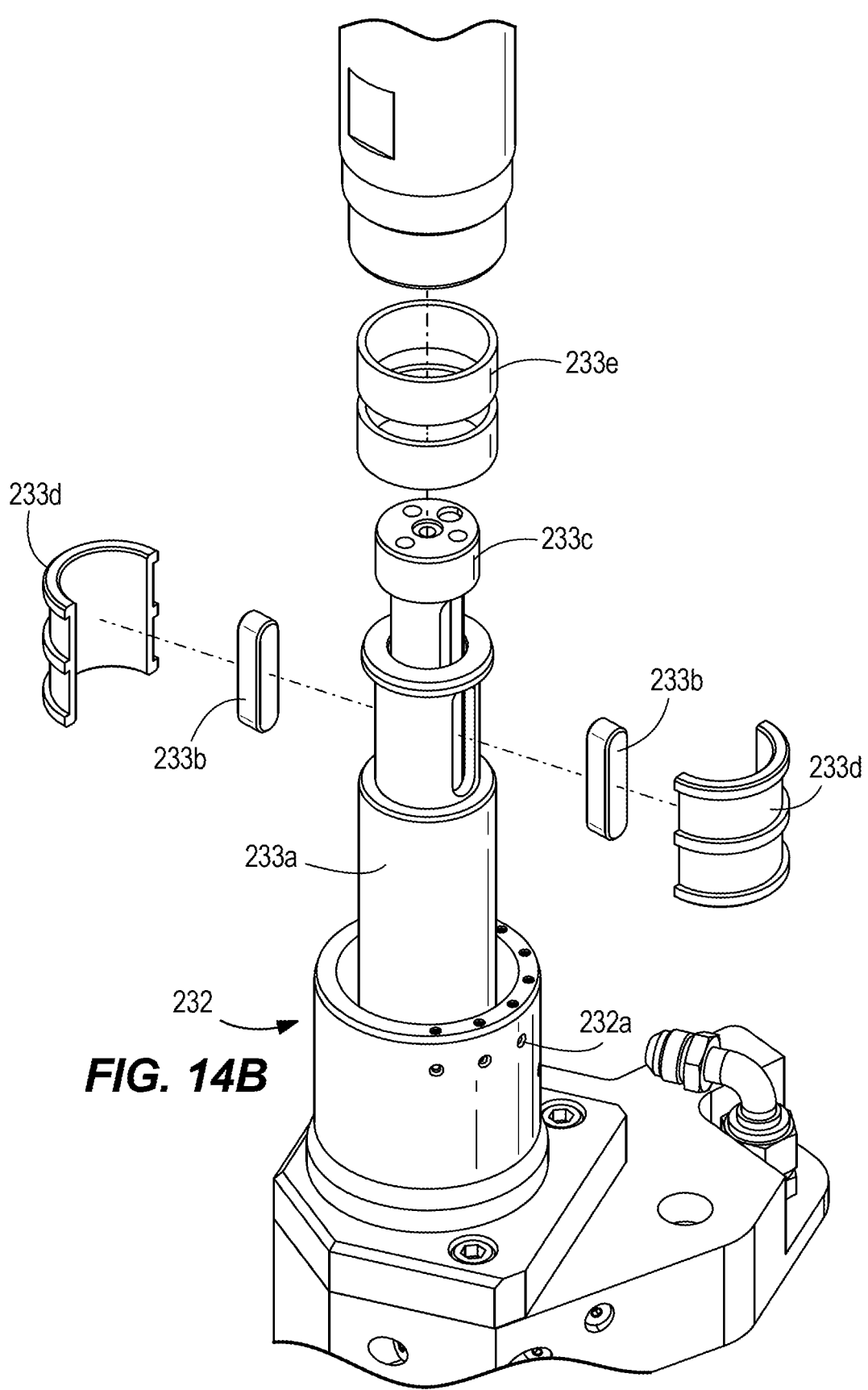
FIG. 14B is a partially exploded perspective view of an oil coupling and support of the loading arm of FIG. 14A.

In some embodiments, as shown in FIG. 14B, pressurized fluid may be provided to an actuator on loading arm (e.g., the actuator for moving clamp plates 222) by a fluid coupling 232. The loading arm 30 is supported for rotation relative to the fluid coupling 232 such that lubricant supply hoses do need to rotate with the loading arm 30. Rather, the fluid coupling 232 supports a lubricated bearing or cone shape that accommodates delivery of fluid to a rotational part of the clamp plates 222 and loading arm 30. The fluid coupling 232 includes a plurality of cavities 232a, such as tunnels, galleries, or the like. The cavities 232a are positioned around a circumference of the fluid coupling 232 to supply fluid to the loading arm 30. In the illustrated embodiment, the cavities 232a extend radially outwardly and are positioned around approximately half of an outer circumference of the fluid coupling 232. In other embodiment, the cavities 232a are positioned around more than half (e.g., 75%, 100%, etc.) of the outer circumference of the fluid coupling 232. In some embodiments, the cavities 232a are capped or plugged at one end and pressurized to provide pressurized fluid to loading arm 30 and clamp actuator 225. The loading arm 30 includes a plurality of complementary receptacles configured to receive fluid from the cavities 232a. In other words, the cavities 232a on the fluid coupling 232 provide a first port and the complementary receptacles on the loading arm 30 provides a second port to maintain fluid communication with the first port throughout the rotational motion of the loading arm 30. A lubricant may be provided to components on the loading arm 30 in a similar manner.

Figure 14C:
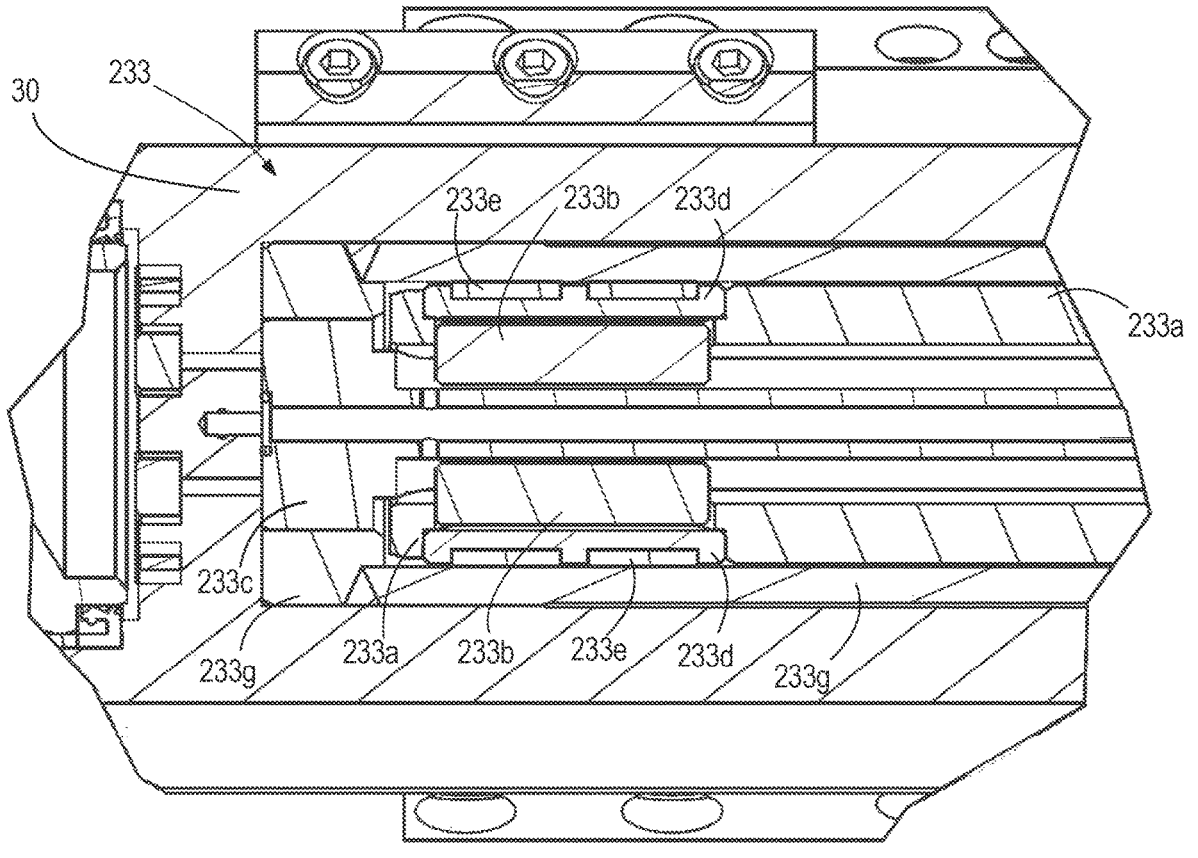
FIG. 14C is a cross-sectional side view of the support of FIG. 14B.

As illustrated in FIGS. 14B and 14C, a portion of the loading arm 30 may be supported by a key arrangement 233 that accommodates sliding movement (e.g., along the axis 218) of the loading arm 30. The key arrangement 233 includes a support mast or axially fixed shaft 233a, two keys 233b receivable in a portion of the support mast 233a, and an inner shaft 233c that is received in the support mast 233a and axially moveable (e.g., slidable) relative, for example, the oil coupling 232. The keys 233b are retained to the support mast 233a by a carrier 233d, such as, for example, a split band wear carrier 233d. The carrier 233d is a two-piece carrier that supports one or more wear bands 233e. The keys 233b are sized and shaped to contact a grooved surface on the inner shaft 233c to prevent relative rotation between the support mast 233a and the inner shaft 233c. The keys 233b thus support axial movement of the loading arm 30 and prevent wear or damage between the shaft 233a, 233c during movement.

The loading arm 30 is further supported for rotation on an outer shaft 233g that slides with the inner shaft 233c. In the illustrated embodiment, the inner and outer shafts 233c, 233g do not move axially relative one another, and both shafts 233c, 233g move axially relative the support mast 233a. The outer shaft 233g particularly support rotation of the loading arm 30 through the wear bands 233e that surround the wear band carrier 233d. The wear bands 233e contact the outer shaft 233g and accommodate protected relative rotation between the keys 233b and the loading arm 30 on the outer shaft 233g. In other words, the wear bands 233e assist in preventing wear (e.g., between abrasive or touching surfaces) in the loading assembly 26 as the loading arm 30 is rotated or translated. During installation of the key arrangement 233, the keys 233b are inserted into the support mast 233a, and the portions of the carrier 233d are positioned around the keys 233b. The wear bands 233e are pressed or forced over the carrier 233d to hold the bands 233e, the carrier 233d, and the keys 233b to the support mast 233a.

In the illustrated embodiment, the wear bands 233e are made of a polymer, such as polyester. The wear band carrier 233d is made of metal, such as cast iron, steel, stainless steel, or the like. In other embodiments, the wear band carrier 233d is made of a rigid polymer. In the illustrated embodiment, the carrier 233d is made of steel. The keys 233b are also made of a metal, such as brass, copper, aluminum, or the like. In the illustrated embodiment, the keys 233b are brass.

In the illustrated embodiment, the sensor 230 is a proximity sensor that detects when the consumable 18 is gripped by the loading arm 30 (i.e., positioned between the clamp plates 222). In some embodiments, the sensor 230 is an inductive sensor detecting a presence of a metallic material. The two clamp plates 222 are moved between the open position and the closed position using the clamp actuator 225 (see FIG. 14A), for example, a hydraulic actuator, a motor, a solenoid, or the like. The clamp actuator 225 is part of the drive motors and actuators 332 controlled by the controller 40, as described in detail below.

Figure 15:
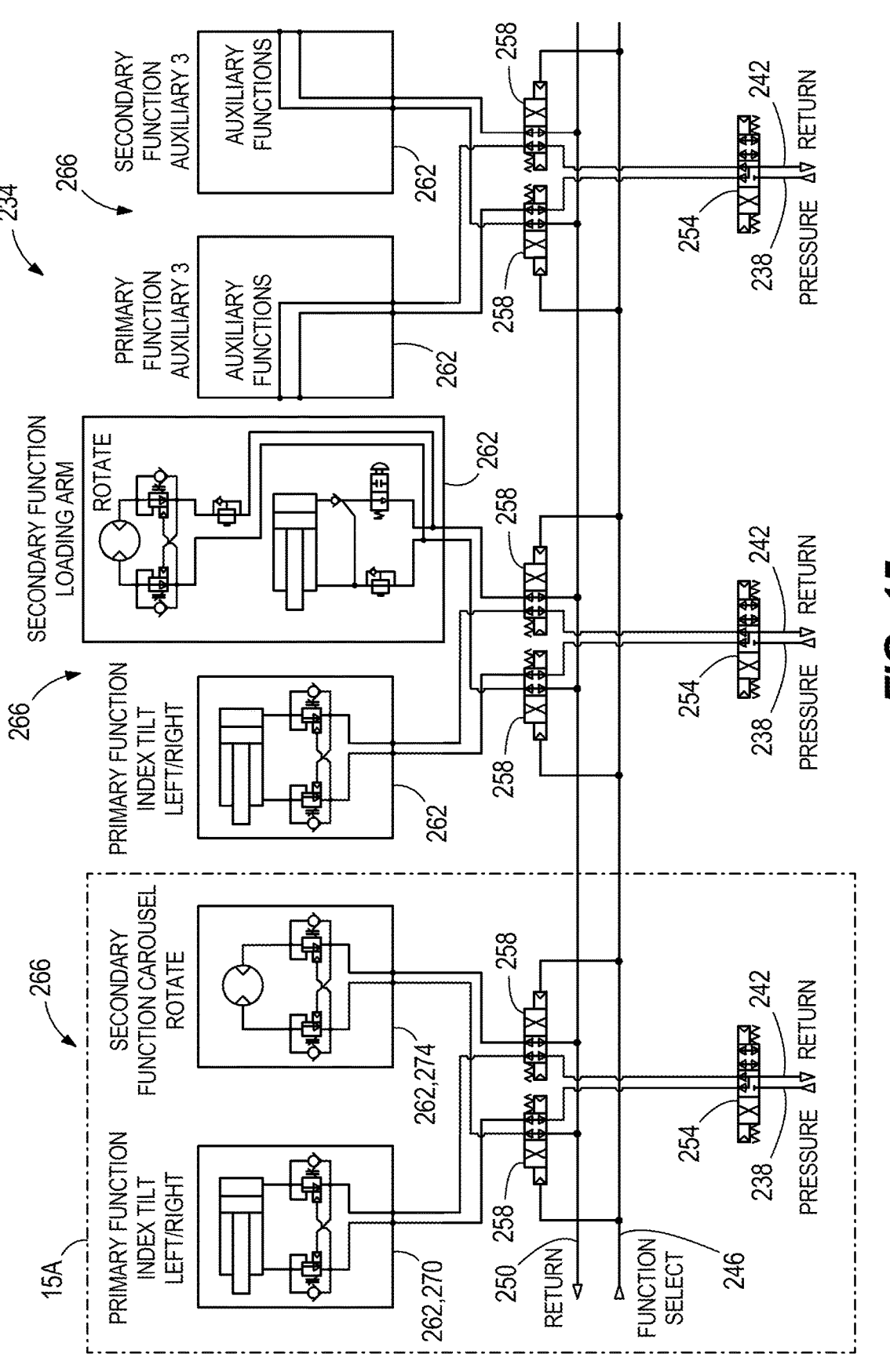
FIG. 15 is a hydraulic circuit for the drill rig of FIG. 1.

With reference to FIG. 15, the drill rig 10 includes a hydraulic circuit 234 to power various functionality on the drill rig 10. The hydraulic circuit 234 includes a main pressure source 238 and a main return 242. The hydraulic circuit 234 also includes a function-select hydraulic line 246 and a hydraulic return 250 (i.e., a second hydraulic return). The hydraulic circuit 234 also includes main flow valves 254 and diversion valves 258 that are fluidly coupled to a hydraulic function 262 on the drill rig 10. In some embodiments, the hydraulic function 262 includes index tilt left/ right; carousel rotate; index tilt fore/aft; rotate loading arm; raise/lower loading arm; open/close jaws; washer loader; auxiliary functions, or any other suitable hydraulic function on the rig 10. The hydraulic functions 262 can include various hydraulic components, for example: actuators; cylinders; hydraulic motors; pressure compensation valves; and check valves.

With continued reference to FIG. 15, the hydraulic functions 262 are paired together to create a hydraulic sub-circuit 266 that includes a primary hydraulic function 270 and a secondary hydraulic function 274. The main pressure source 238 and the main return 242 fluidly communicate with each of the hydraulic sub-circuits 266 in parallel. The second hydraulic return 250 is fluidly coupled to each of the diversion valves 258. Likewise, the function-select hydraulic line 246 is fluidly coupled to each of the diversion valves 258. In the illustrated embodiment, the main flow valves 254 are three-position, solenoid-actuated, electronically controlled hydraulic valves. In the illustrated embodiment, the diversion valves 258 are two-position, hydraulic valves with a spring-biased neutral position.

Figure 15A:
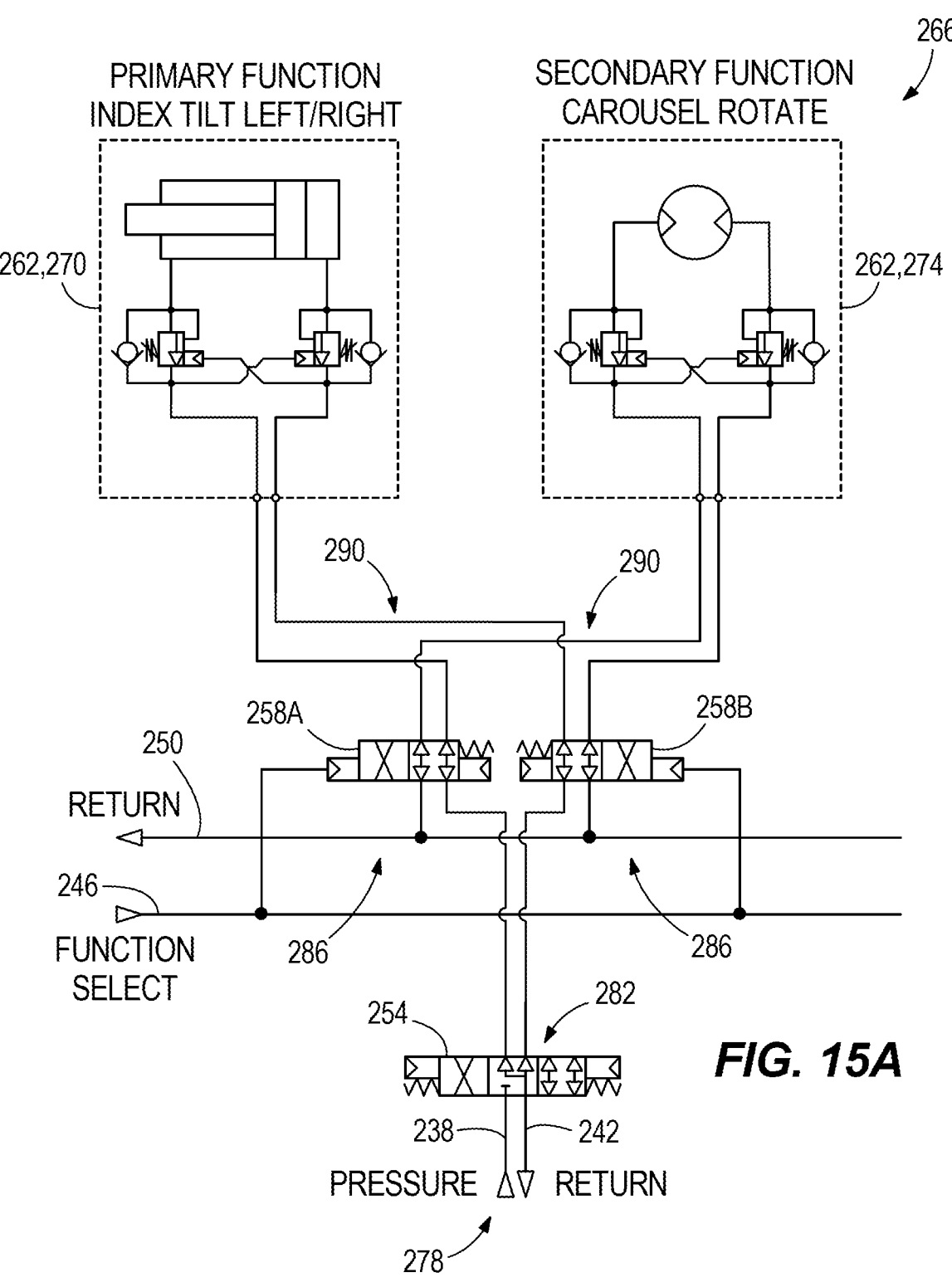
FIG. 15A is an enlarged view of a portion of the hydraulic circuit of FIG. 15.

With reference to FIG. 15A, each hydraulic sub-circuit 266 includes a first diversion valve 258A, a second diversion valve 258B, and a main flow valve 254. An input side 278 of the main flow valve 254 is connected to the main pressure source 238 and the main return 242. The main flow valve 254 has a closed neutral position and is electronically controlled by a solenoid between two open positions to provide directional control of the hydraulic function 262. For example, the main flow valve 254 is controlled to move to a first open position to rotate the carousel 22 in a first direction about the carousel axis 42 (e.g., clockwise) and the main flow valve 254 is controlled to move to a second open position to rotate the carousel 22 in a second direction, opposite the first direction (e.g., counter-clockwise). An output side 282 of the main flow valve 254 are in fluid communication with an inlet side 286 of both the first diversion valve 258A and the second diversion valve 258B. The second hydraulic return 250 is also fluidly communicating with the inlet side 286 of the first diversion valve 258A and the second diversion valve 258B. An output side 290 of each of the diversion valves 258 is fluidly coupled to both the primary hydraulic function 270 and the secondary hydraulic function 274.

With continued reference to FIG. 15A, the diversion valves 258 have a first, spring-biased open position and a second open position. The position of the diversion valve 258 is determined by the pressure in the function-select hydraulic line 246. For example, when the pressure in the function-select hydraulic line 246 is low or near atmosphere, the first diversion valve 258A and the second diversion valve 258B are spring-biased into the first open position, as illustrated in FIG. 15A, thereby activating the primary hydraulic function 270 and deactivating the secondary hydraulic function 274. On the other hand, when the pressure in the function-select hydraulic line 246 is higher, the first diversion valve 258A and the second diversion valve 258B are forced into the second open position (against the spring bias), thereby activating the secondary hydraulic function 274 and deactivating the primary hydraulic function 270. In other words, the pressure in the function-select hydraulic line 246 is toggled high and low to determine whether the primary function 270 or the secondary function 274 is activated by being placed in fluid communication with the main pressure source 238 and the main return 242. The deactivated hydraulic function is placed in fluid communication with the second hydraulic return 250 to release any stored pressure. In some embodiments, the two diversion valves 258A and 258B are combined into a single six-way, two-position direction control valve (e.g., the Model: KVH-6/2-8 directional valve available from Porclain Hydraulics or the Model: DNDY valve available from Sun Hydraulics).

The diversion valves 258 are small and therefore reduce the overall size of the drill rig 10. In other words, the diversion valves 258 are smaller than an additional solenoid operated directional control valve, which also requires an additional solenoid and electrical components. In addition, the diversion valves 258 are hydraulically actuated by the function-select hydraulic line 246 and are not electronically controlled, thereby reducing the complexity of the electronics. In other words, the diversion valves 258 replace electronically controlled solenoid valves. A single solenoid-actuated flow valve 254 can fluidly communicate the main pressure source 238 and the main return 242 to two different hydraulic functions (i.e., the primary function 270 and the secondary function 274). In this sense, the hydraulic circuit 234 provides a dual-functionality for each of the flow valves 254.

With reference to FIGS. 16A-16O, FIGS. 17A-17H, and FIGS. 18A-18M a complete, automated operation cycle of the drill rig 10 is illustrated. In the illustrated embodiment a complete, automated operation cycle includes a drill cycle (FIGS. 16A-16O), a resin cycle (FIGS. 17A-17H), and a bolt cycle (FIGS. 18A-18M). The drill rig 10 automatically performs the drill cycle, followed by the resin cycle, followed by the bolt cycle. In other embodiments, the drill rig 10 may perform any number of desired cycles and in any desired sequence, and/or only some of the cycles may be performed. In the illustrated embodiment, a working surface 294 is a roof of an underground mine. As explained above, the working surface may also be a wall of an underground mine, for example, and the drill rig 10 can be oriented accordingly. In other words, the drill rig 10 is operable while positioned in more than one orientation (e.g., both an up-down vertical orientation and a left-right horizontal orientation)

Figures 16K, 16L, 16M, 16N, 16O:
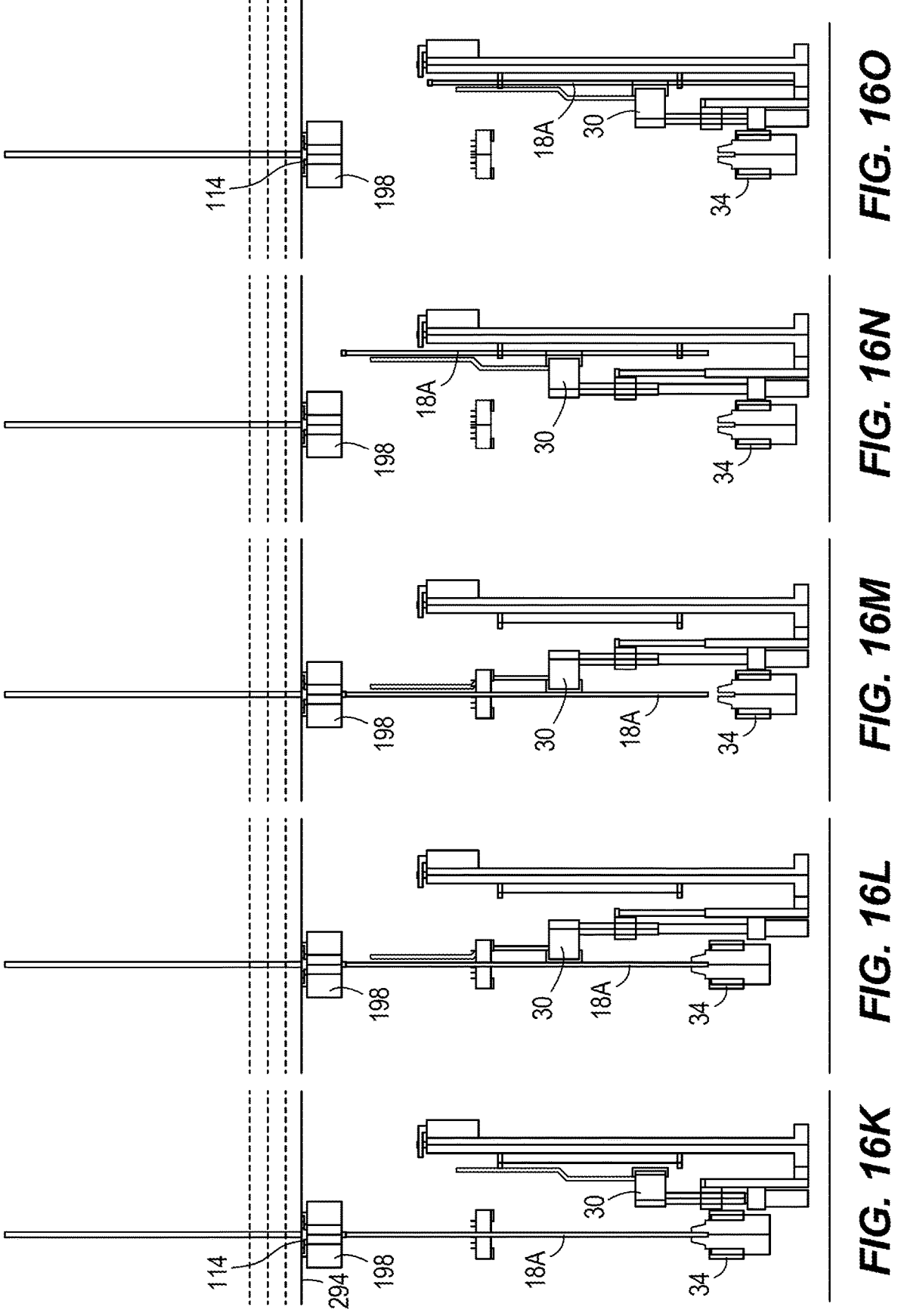

With reference to FIGS. 16A-16O, the drill cycle of the drill rig 10 is illustrated. FIG. 16A illustrated the drill rig 10 in a starting position relative to the working surface 294. In the starting position, the drill head 34 is positioned to receive the consumable 18, and the top plate 198 is retracted.

FIG. 16B illustrates the consumables 18 and the washers 114 (e.g., stack of washers 122) being loaded into the carousel assembly 14 and drill rig 10.

FIG. 16C shows the drill rig 10 moving to a start position after being loaded with the consumables 18 and the washer 114. The actuator 138 of the washer loader assembly 110 retracts and rotates such that the carrier arm 130 magnetically engages with a washer 114. The carousel assembly 14 is rotated to position the desired consumable (i.e., the drill bit 18A) into the loading position such that it can be loaded into the loading arm 30.

FIG. 16D illustrates the washer loader assembly 110 with the actuator 138 and the carrier arm 130 extended and rotated. The carrier arm 130 holds the washer 114 in a position that is aligned with the drill bit 18A, which is now secured to the loading arm 30.

FIG. 16E illustrates that the loading arm 30 and the drill bit 18A are extended along the axis 214 (i.e., raised) such that the drill bit 18A passes through the center aperture of the washer 114.

FIG. 16F illustrates the loading arm 30 and the drill bit 18A with the washer 114 rotated about the second axis 218 such that the drill bit 18A is aligned with the drill head 34.

FIG. 16G illustrates the drill head 34 translated along the drill axis 36 in order to receive the drill bit 18A within the drill head 34 (i.e., within a chuck). During the steps shown in FIGS. 16F-16G, the balance rod 190 contacts the washer 114 and maintains the washer 114 in position with respect to the drill bit 18A.

FIGS. 16H-16J illustrate the drill bit 18A, the drill head 34, and the top plate 198 translating along the drill axis 36 such that the drill bit 18A drills a hole into the working surface 294 and the top plate 198 with the washer 114 abuts the working surface 294.

FIGS. 16K-16O illustrate the end of the drill cycle where the drill bit 18A and drill head 34 are retracted away from the working surface 294 and the drill bit 18A is returned to the carousel 22 by the loading arm 30. In the illustrated embodiment, the top plate 198 and the washer 114 remain abutted against the working surface 294 at the end of the drill cycle (FIG. 16O).

Figures 17A, 17B, 17C, 17D, 17E:
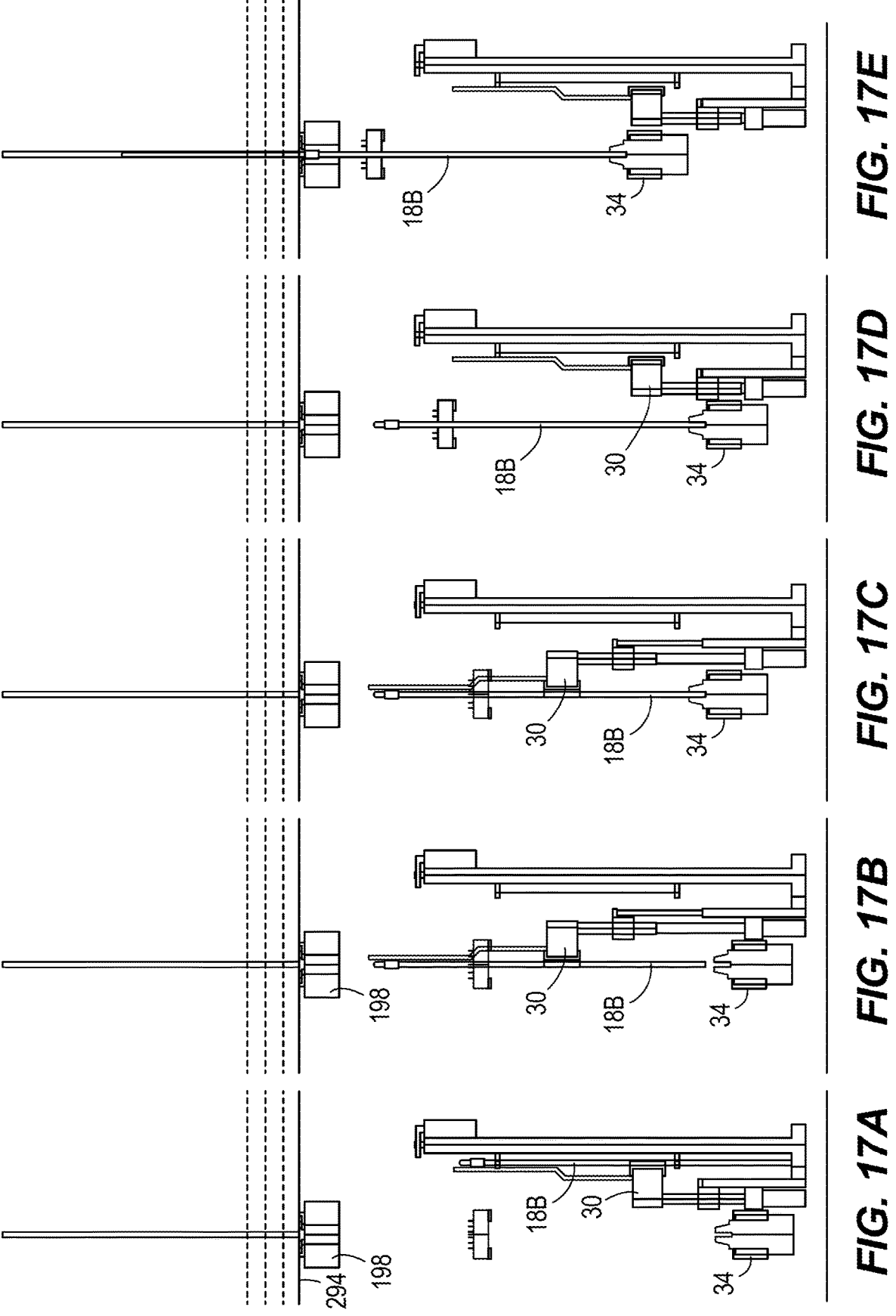
FIGS. 17A-17H are schematic views of the drill rig of FIG. 1, performing a resin cycle.
Figures 17F, 17G, 17H:
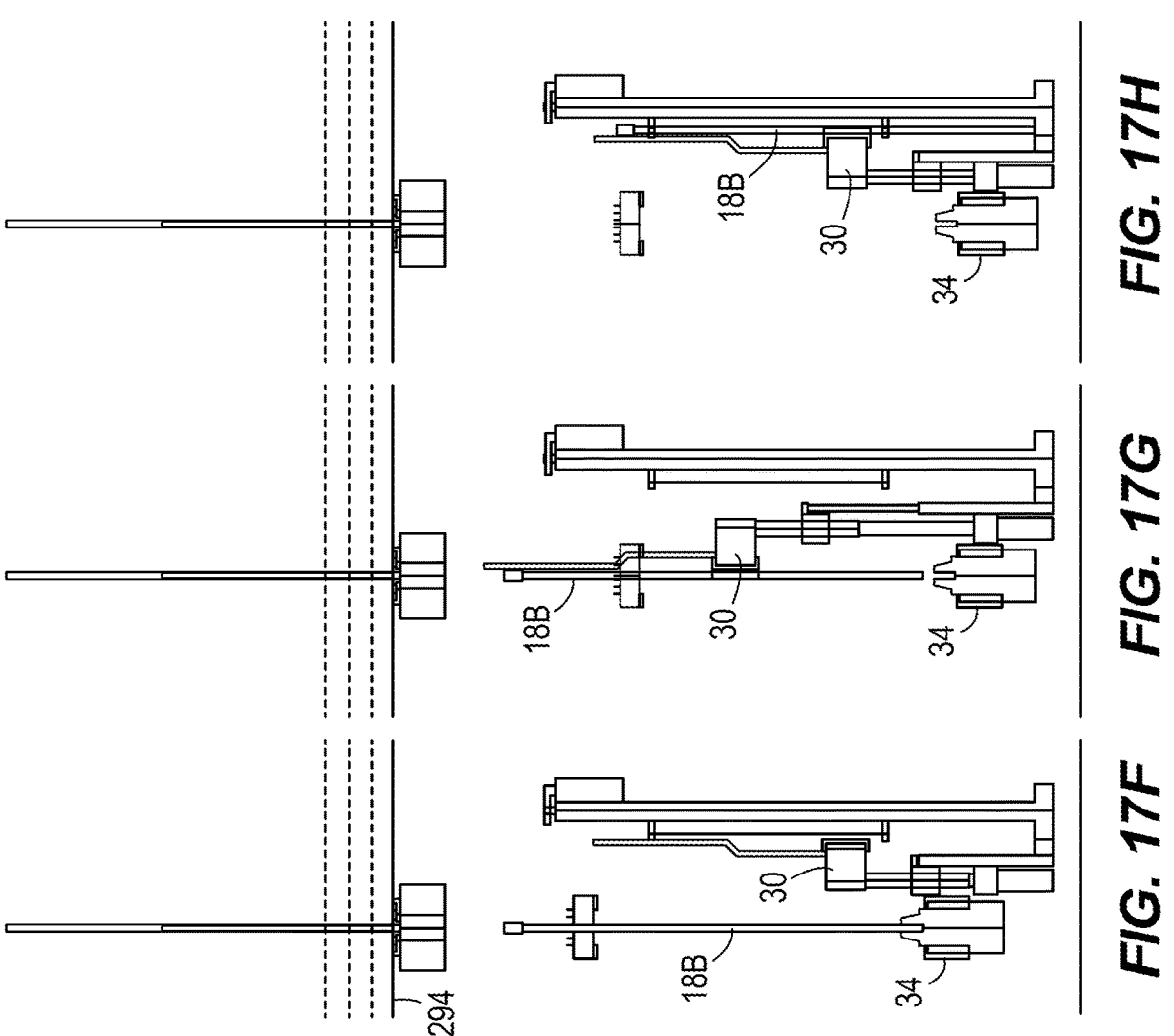

FIGS. 17A-17H illustrate the resin cycle of the drill rig 10. The resin cycle is similar to the drill cycle but with a resin cartridge 18B instead of a drill bit 18A being selected from the carousel assembly 14 by the loading arm 30. In other words, the loading arm 30 moves the resin cartridge 18B from the carousel assembly 14 to the drill head 34 (FIGS. 17A-17D); the resin cartridge 18B is inserted into the working surface 294 (FIGS. 17E-17F); and the resin cartridge 18B is returned to the carousel assembly 14 by the loading arm 30 (FIGS. 17G-17H). Before the resin cartridge 18B is returned to the carousel assembly 14, resin is ejected from the resin cartridge 18B and into the hole drilled by the drill bit 18A. The resin may be ejected from the resin cartridge 18B by a resin inserter or ejector. In the illustrated embodiment, a fluid such as water, oil, a water-oil mixture, or the like is pressurized in the inserter to eject or press the resin from the resin cartridge 18B.

Figures 18K, 18L, 18M:
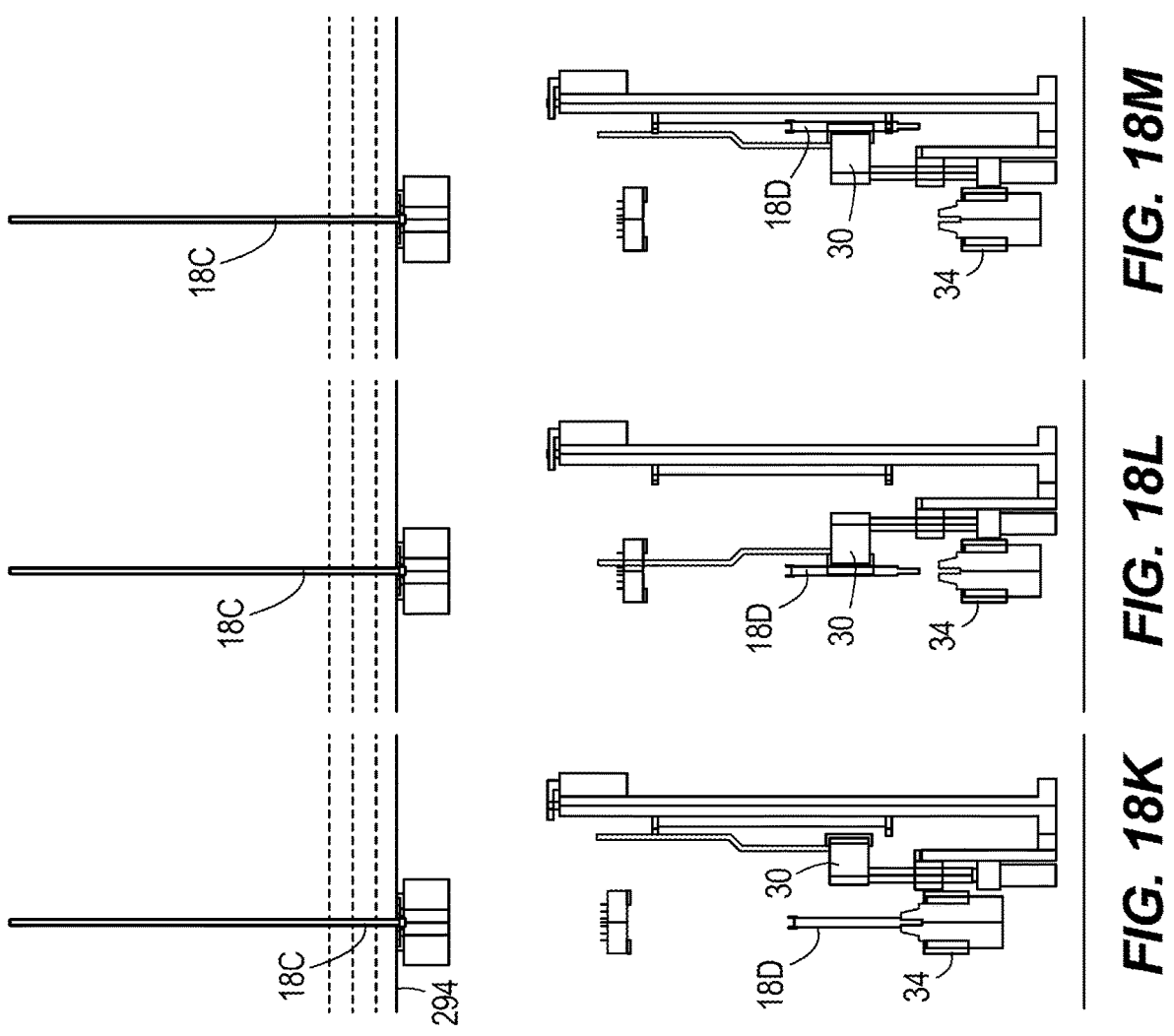

FIGS. 18A-18M illustrate the bolt cycle of the drill rig 10. The bolt cycle is similar to the drill cycle but with a bolt 18C (and optionally, the adaptor 18D) instead of a drill bit 18A being selected from the carousel assembly 14 by the loading arm 30. First, the bolt 18C is loaded into the drill head 34 and partially inserted into the working surface 294 (FIG. 18A-18E). Next, the drill head 34 is retracted with the bolt 18C remaining in position (FIG. 18F). In the illustrated embodiment, the bolt 18C is held in place by the top plate 198. In some embodiments, the top plate 198 includes a clamp that holds the bolt 18C in position. The loading arm 30 then moves the adaptor 18D from the carousel 22 to the drill head 34 (FIGS. 18G-18I).

The loading arm 30 does not raise or lower when loading the adaptor 18D because the cam 62 and valve actuator 70 disengage the first actuator 206. Instead, the drill head 34 is moved to accommodate loading the adaptor 18D into the drill head 34 and the adaptor 18D is held in position. Then, the adaptor 18D is used to complete the insertion of the bolt 18C into the working surface 294 (FIGS. 18J-18K), and the adaptor 18D is returned to the carousel 22 (FIGS. 18L-18M). In some embodiments, the bolt 18C may be loaded and driven by the drill head 34 without use of the adaptor 18D.

Figure 19:
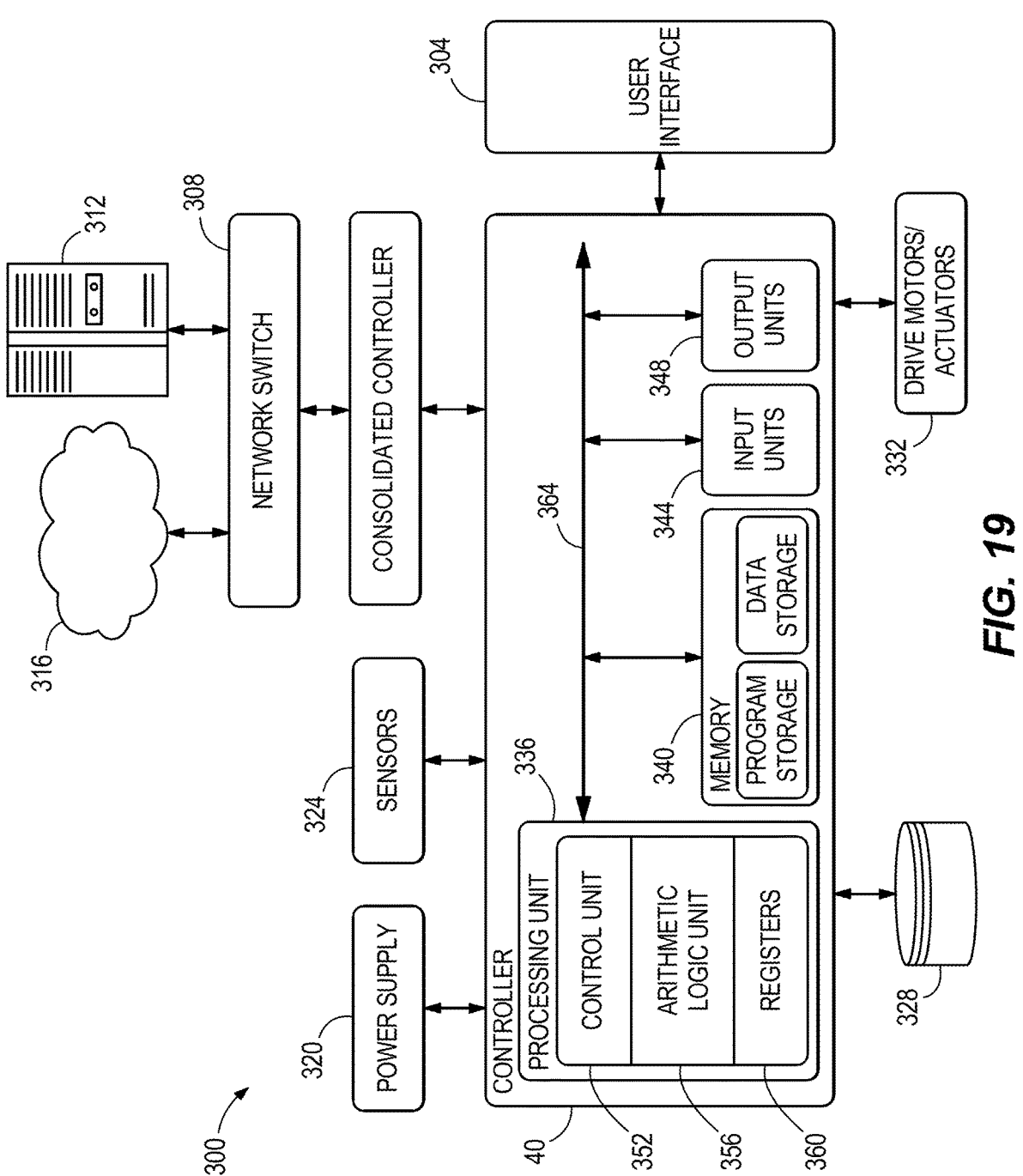
FIG. 19 is a block diagram illustrating a controller of the drill rig of FIG. 1.

The drill rig system 300 and the controller 40 are illustrated in greater detail with respect to FIG. 19. The controller 40 is electrically and/or communicatively connected to a variety of modules or components of the drill rig system 300. For example, the controller 40 may be connected to a user interface 304, a consolidated controller 306, a network switch 308 (via consolidated controller 306), a central controller 312 (via network switch 308), a network 316 (via network switch 308), a power supply module 320 (e.g., an AC power supply module receiving AC mains power), one or more sensors 324 related to the drill rig system 300, a database 328 (e.g., for storing data, images, and/or video related to the drill rig system 300, component profiles, etc.), and/or one or more drive motors and actuators 332 of the drill rig system 300.

The one or more drive motors and actuators 332 include one or more of the motors and actuators of the drill rig 10. For example, the one or more drive motors and actuators 332 include the actuator 46 (i.e., a first actuator) configured to rotate the carousel 22, the actuator 138 (i.e., a second actuator) configured to extend and rotate the carrier arm 130 with respect to the fixed casing 142, the actuator 206 (i.e., a third actuator) configured to raise and lower the loading arm 30, the actuator 210 (i.e., a fourth actuator) configured to rotate the loading arm 30, and the clamp actuator 225 (i.e., a fifth actuator) to open and close the clamps 222. The sensors 324 may include one or more sensors of the drill rig 10. For example, the sensors 324 may include the encoder 50 configured to detect the rotational position of the carousel 22 and the sensor 230 to detect a consumable proximate the loading arm 30. In addition to the encoder 50 and the sensor 230, the sensors 324 may include a feed pressure sensor, a fine feed speed sensor, a rotation pressure sensor, a rotation speed sensor, an inclinometer, and/or a flow sensor.

The controller 40 includes combinations of hardware and software that are operable to, among other things, control the operation of the drill rig 10, communicate with a central controller 312 or over the network 316, among other functions. In some embodiments, the controller 40 includes a plurality of electrical and electronic components that provide power, operational control, and protection to the components and modules within the controller 40 and/or drill rig 10. For example, the controller 40 includes, among other things, a processing unit 336 (e.g., a microprocessor, a microcontroller, or another suitable programmable device), a memory 340, input units 344, and output units 348. The processing unit 336 includes, among other things, a control unit 352, an arithmetic logic unit ("ALU") 356, and a plurality of registers 360 (shown as a group of registers in FIG. 19), and is implemented using a known computer architecture (e.g., a modified Harvard architecture, a von Neumann architecture, etc.). The processing unit 336, the memory 340, the input units 344, and the output units 348, as well as the various modules connected to the controller 40 are connected by one or more control and/or data buses (e.g., common bus 364). The control and/or data buses are shown generally in FIG. 19 for illustrative purposes.

The memory 340 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 336 is connected to the memory 340 and executes software instructions that are capable of being stored in a RAM of the memory 340 (e.g., during execution), a ROM of the memory 340 (e.g., on a generally permanent basis), or another non-transitory computer readable medium such as another memory or a disc. Software included in the implementation of the drill rig 10 can be stored in the memory 340 of the controller 40. The software includes, for example, firmware, one or more applications, program data, filters, rules, one or more program modules, image processing software, and other executable instructions. The controller 40 is configured to retrieve from the memory 340 and execute, among other things, instructions related to the control processes and methods described herein. In other constructions, the controller 40 includes additional, fewer, or different components. In some embodiments, the software included in the implementation of the drill rig 10 can be stored in a memory of the central controller 312. In such embodiments, the central controller 312 is configured to retrieve from the memory and execute instructions related to the control processes and methods described herein.

In mining environments, electrically components are desired to be intrinsically safe. For a device to be certified as intrinsically safe, every electrical element of the device is to perform according to the intrinsically safe standard specified. Rotary encoders present a roadblock for such certification. Multi-turn and optical encoders, which are typically used in mining equipment, are too large to and difficult to configure to be intrinsically safe. One alternative solution to multi-turn and optical encoders is to use mechanical encoders that do not use electrical components. However, mechanical encoders are not generally reliable, experience wear and tear, and are faced with coupling alignment and fitment issues.

Figure 20:
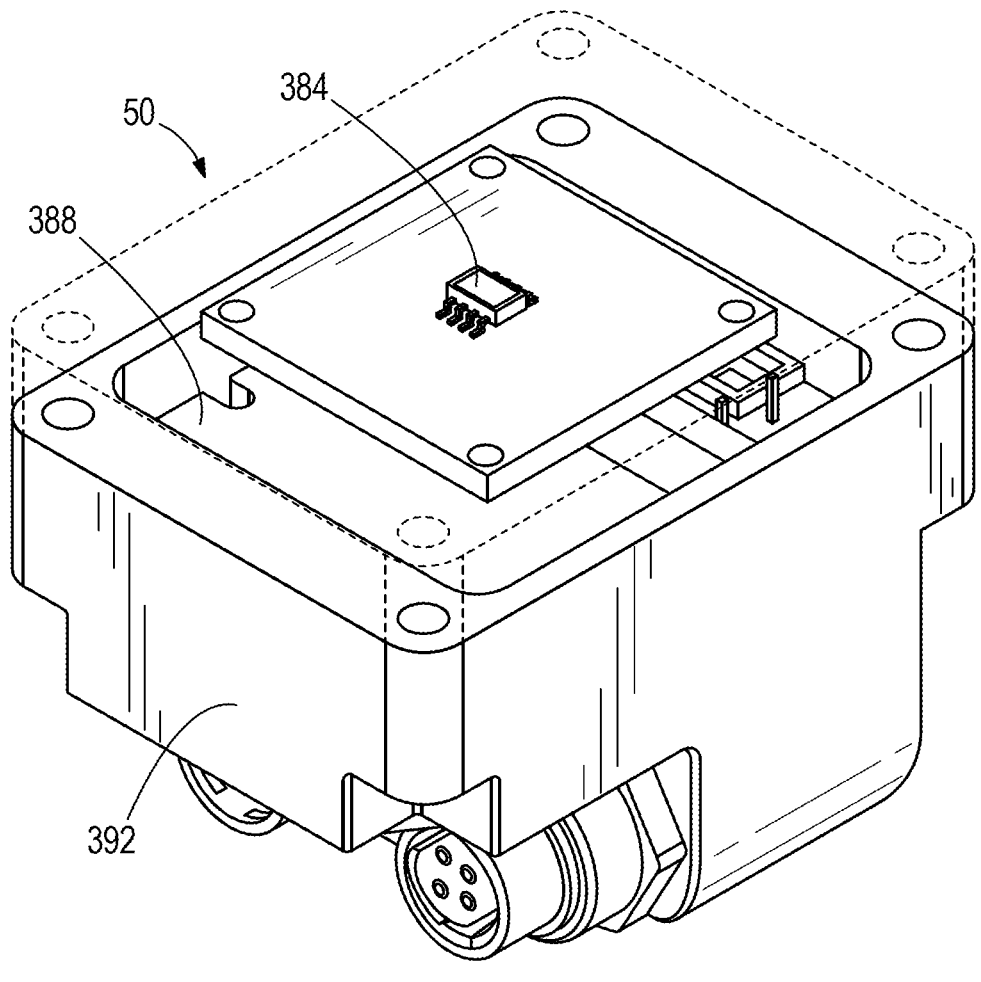
FIG. 20 is a perspective view of an intrinsically safe position detector of the drill rig of FIG. 1.

FIG. 20 illustrates an intrinsically safe rotary encoder 50 configured to detect the rotational position of the carousel 22. In the example illustrated, the intrinsically safe rotary encoder 50 is a magnetic position sensor including one or more Hall-effect sensors that detect a permanent magnet attached to the carousel 22. As shown in FIG. 20, the encoder 50 includes a position sensor 384 (e.g., Hall sensor) on a top portion of a housing 392. The housing 392 is formed from a protective material configured to house the position sensor 384. In some embodiments, the housing 392 is a stainless steel or other metal housing configured to arrest any flames or cut-off oxygen supply to any flame generated within the housing. Magnetic rotary encoders provide a significant temperature advantage over multi-turn and optical encoders. Hall sensor outputs operate at a power level of below 1 Watt (W) with minimal heat loss. Such low levels of power generate minimal heat making it easier to meet the intrinsically safe limitations. Although magnetic rotary encoders provide a significant advantage over other types of encoders, magnetic rotary encoders are currently not extensively used in the mining industry. The magnetic rotary encoder provides a contactless position detection mechanism. Magnetic encoders need to be positioned very close to a sensed element to provide accurate measurements. Additionally, the output signals provided by generally available Hall sensors are not compatible with the communication and sensing techniques used by a control system of a mining machine.

Figure 21:
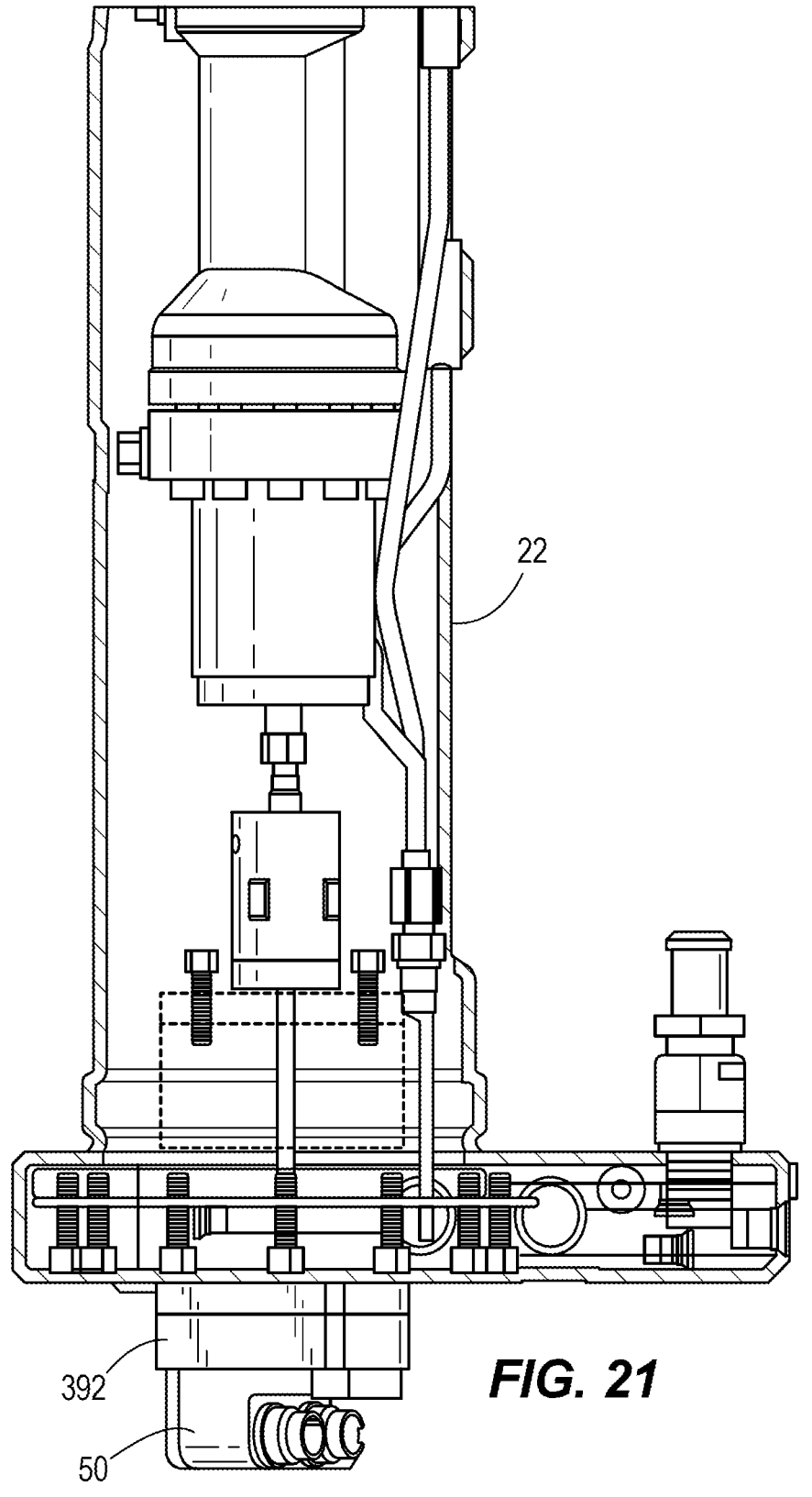
FIG. 21 is a perspective view of the intrinsically safe position detector of FIG. 20 while coupled to the carousel of FIG. 4.

To overcome the above challenges, the position sensor 384 is exposed from the housing 392 such that the position sensor 384 can be placed in close contact with a magnet of the carousel. Specifically, the position sensor 384 is provided outside a periphery of the housing 392. With reference to FIG. 21, the intrinsically safe rotary encoder 50 is provided at a bottom of the carousel 22. In some embodiments, the rotary encoder 50 may be provided at a top of the carousel 22. The housing 392 of the rotary encoder 50 is fixed to a housing of the carousel 22 using fasteners. A gasket or seal may be provided between the rotary encoder 50 and the carousel 22 to provide an air-tight and/or watertight seal between the rotary encoder 50 and the carousel 22. As discussed above, the position sensor 384 is exposed from the housing 392 such that the position sensor 384 extends into a housing of the carousel 22. The rotary encoder 50 is fixed to the carousel such that the position sensor 384 is in close proximity to a magnet fixed to a rotary shaft of the carousel 22. The magnet includes at least two poles (one North and one South), which are detected by the position sensor 384. The detection signals are then forwarded to the controller 40 to indicate a rotary position of the carousel 22. In some embodiments, the magnet may include additional poles (e.g., two or more North and two or more South) to provide additional granularity in rotation position measurement. In some embodiments, the position sensor 384 may be provided within the periphery of the housing 392 and the magnet of the carousel can be extended into the housing 392 of the rotary encoder 50 to place the magnet in close proximity to the position sensor 384.

Depending on the type of magnetic encoder used, the rotary encoder 50 may provide an analog output, a pulse-width modulated (PWM) output, a serial peripheral interface output, and the like. Accordingly, an analog to digital converter (ADC) or a Universal Asynchronous Receiver-Transmitter (UART) to convert the output signal from one form (e.g., analog) to another form (UART) such that the rotary encoder 50 may be integrated with other components of the drill rig 10.

Figure 22:
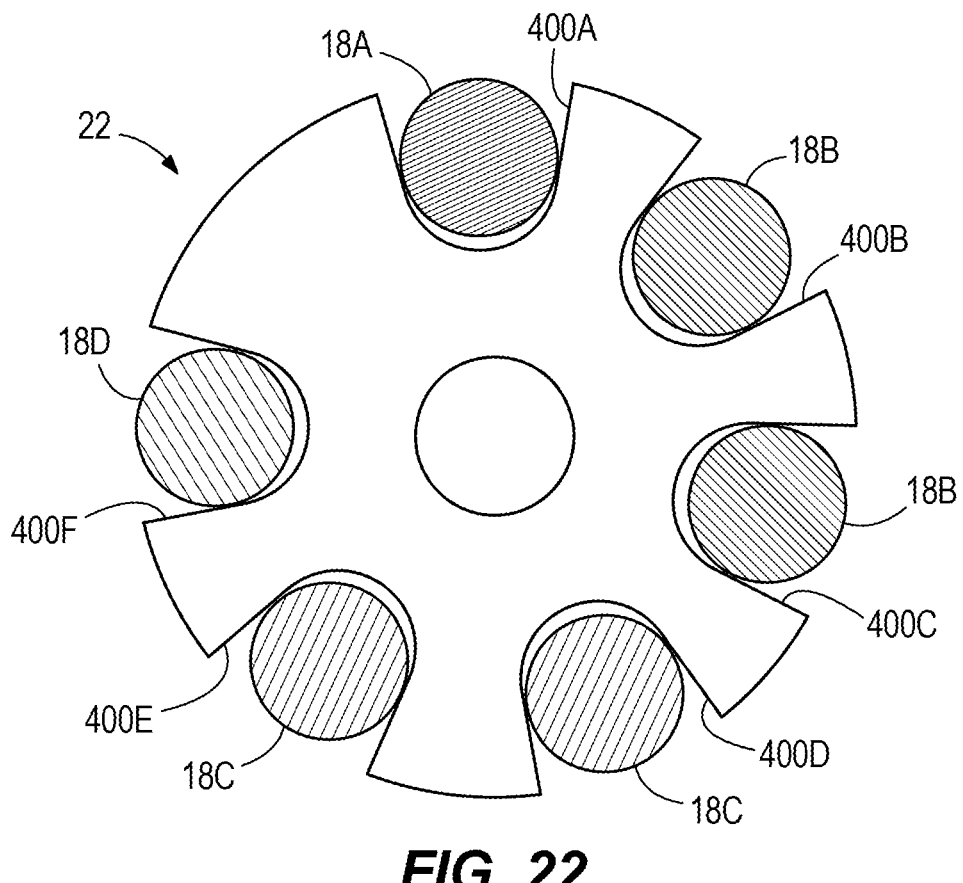
FIG. 22 is a plan view of the carousel of FIG. 4 showing a loaded state of the carousel.

FIG. 22 illustrates an exemplary configuration of the carousel 22. The carousel 22 includes one or more stations 400 for loading one or more consumables 18. For example, as illustrated in FIG. 22, a first station 400A is loaded with a drill bit 18A. A second station 400B and a third station 400C are each loaded with a resin cartridge 18B. A fourth station 400D and a fifth station 400E are each loaded with a bolt 18C. A sixth station 400F is loaded with an adaptor 18D. The currently selected station 400 of the carousel 22 may be determined by the intrinsically safe position detector 50. An angular position of the carousel 22 may be identified by the rotary encoder 50) based on a magnet, a target, or some other object mounted to the carousel 22. For example, as illustrated in FIG. 22, the carousel is positioned at 0°.

Figure 23:
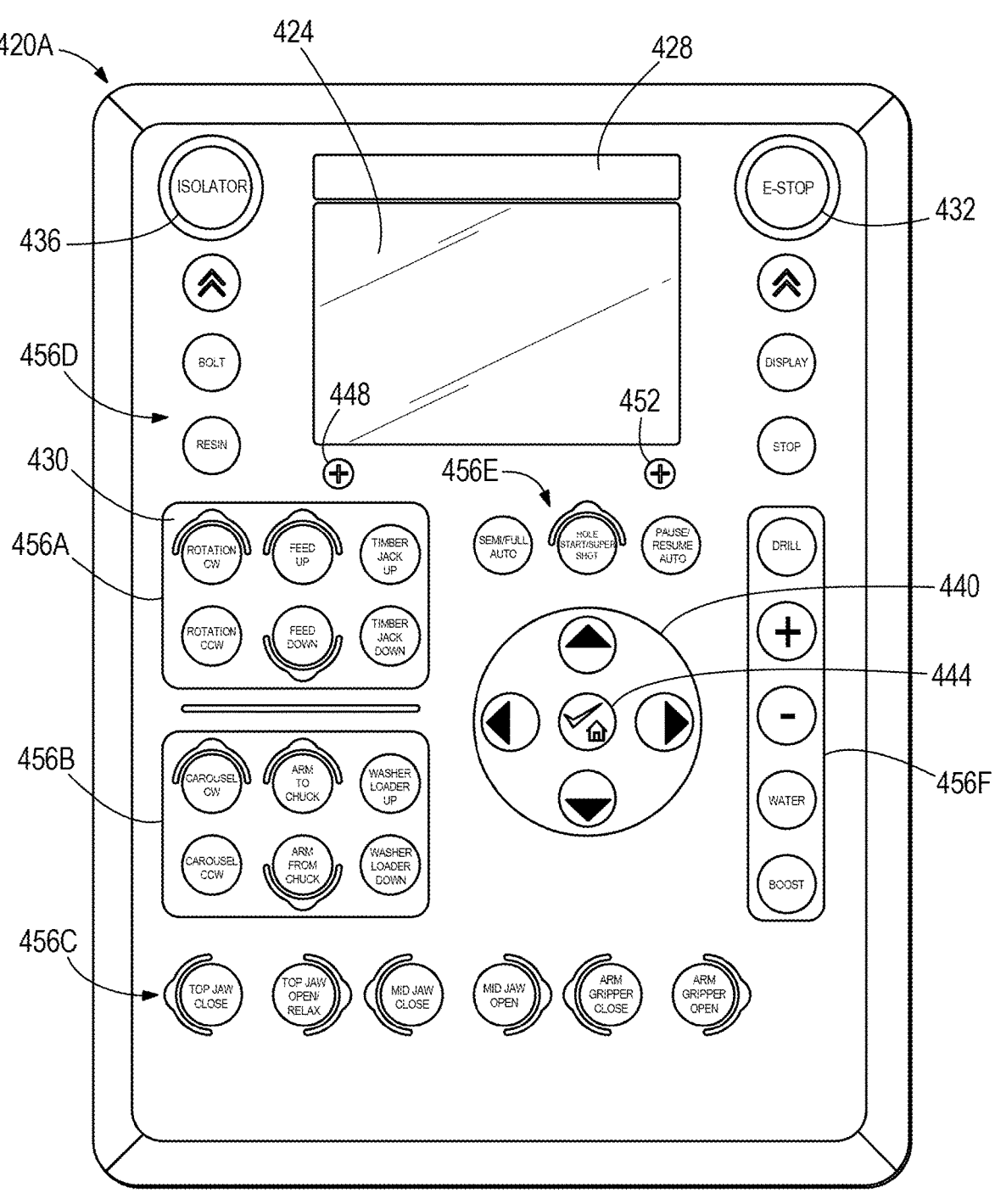
FIG. 23 illustrates an example control panel of the drill rig of FIG. 1.
Figure 24:
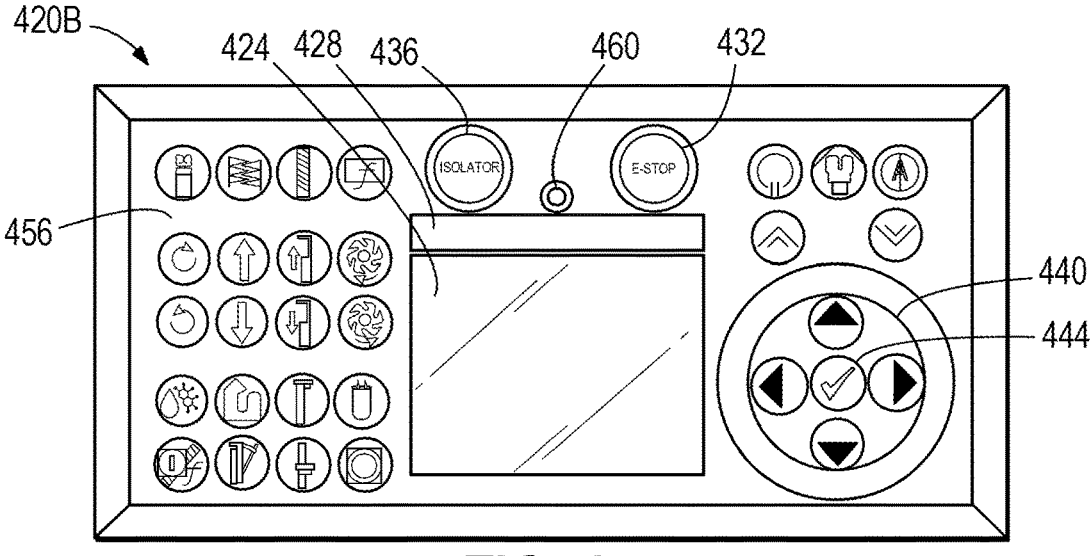
FIG. 24 illustrates an example control panel of the drill rig of FIG. 1.

The drill rig 10 further includes an intrinsically safe control panel 420. The control panel 420 is part of the user interface 304 and is connected to the controller 40. FIGS. 23 and 24 illustrates a first example embodiment of a control panel 420A and a second example embodiment of a control panel 420B for controlling the drill rig 10. The first control panel 420A and the second control panel 420B include a display screen 424, a speaker 428, and one or more buttons (e.g., a plurality of buttons). The one or more buttons are provided as a keypad 430. The keypad 430 has a thickness between 0.15 millimeter (mm) and 1 mm. The one or more buttons include a combination of single press on/off buttons that toggle states when pressed and proportional input buttons that provide a signal to the controller proportional to the force applied on the button. When the one or more buttons includes a proportional input button, a force sensing resistor material is provided below the plastic overlay for each proportional input button. The force applied on the one or more buttons is transmitted to the force-sensing resistor material, which causes a drop in the electrical resistance of the force-sensing resistor. This drop in electrical resistance is detected to determine the amount of force applied to the one or more buttons. Since the one or more buttons use a resistive technology rather than capacitive touch technology, contact with human skin is not required to activate the one or more buttons. The one or more buttons can be activated even when a person is wearing gloves as is required for an operator in the mining environment.

Electrical detection signals from the one or more buttons are detected and a corresponding signal is provided to the controller 40. The controller 40 then performs the functions assigned to one or more buttons based on the received signal. The one or more buttons include, for example, a stop button 432, an isolator button 436, one or more navigational buttons 440, a home and/or select button 444, and/or one or more control button banks 456A-F. The first control panel 420A includes a bolting light emitting diode (LED) 448 (e.g., a first LED) and a drilling LED 452 (e.g., a second LED). The second control panel 420B includes a three-color LED 460. In some embodiments, such as the embodiment illustrated in FIG. 23, the one or more buttons include a text label describing the function of the button. In other embodiments, such as the embodiment illustrated in FIG. 24, the one or more buttons include an icon corresponding to the function of the button. The stop button 432 allows a user to stop an operation of the drill rig 10. When the stop button 432 is pressed, the controller 40 ceases all mechanical functions of the drill rig 10. The one or more navigational buttons 440 and the home and/or select button 444 allow a user to navigate through options on the display 424. The bolting LED 448 and the drilling LED 452 are each, for example, multicolor LEDs provide a status indication of the bolting operation (e.g., a first operation) and the drilling operation (e.g., a second operation) respectively.

The one or more control button banks 456A-F each include one or more control buttons for manually controlling an operation of the drill rig 10. For example, as illustrated by FIG. 23, a first control button bank 456A includes control buttons for controlling the drill head 34 and a timber jack. The first control button bank 456A includes a clockwise rotation button, a counterclockwise rotation button, a feed up button, and a feed down button. When the controller determines that the clockwise rotation button is being pressed (that is, the controller 40 receives an input to rotate the drill head 34 in a clockwise direction), the controller 40 controls an actuator (e.g., a motor) of the drill head 34 to rotate the drill head 34 in a clockwise direction. When the controller 40 determines that the counterclockwise rotation button is being pressed (that is, the controller 40 receives an input to rotate the drill head 34 in a counterclockwise direction), the controller 40 controls an actuator of the drill head 34 to rotate the drill head 34 in a counterclockwise direction. When the controller 40 determines that the feed up button is being pressed (that is, the controller 40 receives an input to move the drill head 34 upward), the controller 40 controls an actuator of the drill head 34 to move the drill head 34 upward toward the roof. When the controller 40 determines that the feed up button is being pressed (that is, the controller 40 receives an input to move the drill head 34 downward), the controller 40 controls an actuator of the drill head 34 to move the drill head 34 downward away from the roof. The first control button bank 456A also includes a timber jack up and timber jack down buttons that similarly control the timber jack to move up (e.g., to support the roof) and down (e.g., after the bolting operation). In some embodiments, the buttons provided in the first control button bank 456A are proportional input buttons such that the force on the buttons dictates the speed of the corresponding operation.

A second control button bank 456B includes control buttons for controlling a position of the carousel 22, the loading arm 30, and the carrier arm 130. The second control button bank 456B includes a carousel clockwise rotation button, a carousel counterclockwise rotation button, an arm to feed button, an arm from feed button, a washer loader up button, and a washer loader down button. When the controller 40 determines that the carousel clockwise rotation button is being pressed (that is, the controller 40 receives an input to rotate the carousel 22 in a clockwise direction), the controller 40 controls the actuator 46 to rotate the carousel in a clockwise direction. When the controller 40 determines that the carousel counterclockwise rotation button is being pressed (that is, the controller 40 receives an input to rotate the carousel 22 in a counterclockwise direction), the controller 40 controls the actuator 46 to rotate the carousel in a counterclockwise direction. When the controller 40 determines that the arm to feed button is being pressed (that is, the controller 40 receives an input to move the loading arm 30 to the carousel 22), the controller 40 controls the second actuator 206 to move the loading arm 30 to the carousel 22. When the controller 40 determines that the arm from feed button is being pressed (that is, the controller 40 receives an input to move the loading arm 30 away from the carousel 22), the controller 40 controls the second actuator 206 to move the loading arm 30 away from the carousel 22. When the controller 40 determines that the washer loader up button is being pressed (that is, the controller 40 receives an input to raise the carrier arm 130), the controller 40 controls the actuator 136 to raise the carrier arm 130. When the controller 40 determines that the washer loader down button is being pressed (that is, the controller 40 receives an input to lower the carrier arm 130), the controller 40 controls the actuator 130 to lower the carrier arm 130. In some embodiments, the buttons provided in the second control button bank 456B are proportional input buttons such that the force on the buttons dictates the speed of the corresponding operation.

A third control button bank 456C includes control buttons for opening/closing an arm gripper. When the controller 40 determines that the arm gripper open button is pressed (that is, the controller receives an input to open the clamps 222), the controller 40 controls the clamp actuators to open the clamps 222. When the controller 40 determines that the arm gripper close button is pressed (that is, the controller receives an input to close the clamps 222), the controller controls the clamp actuators to close the clamps 222.

Figure 29:
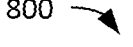
FIG. 29 is a flowchart of a method for controlling a drill operation of the drill rig of FIG. 1 in an automatic mode.
Figure 29:
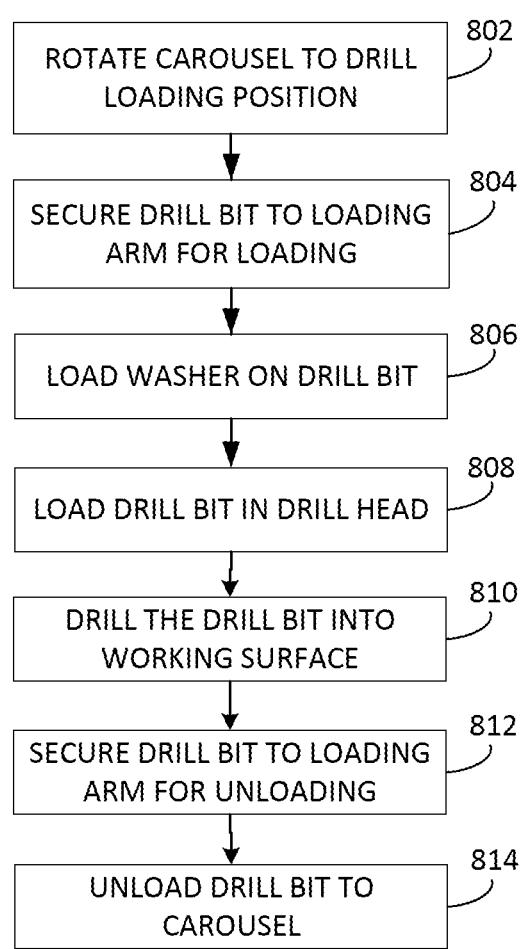
Figure 30:
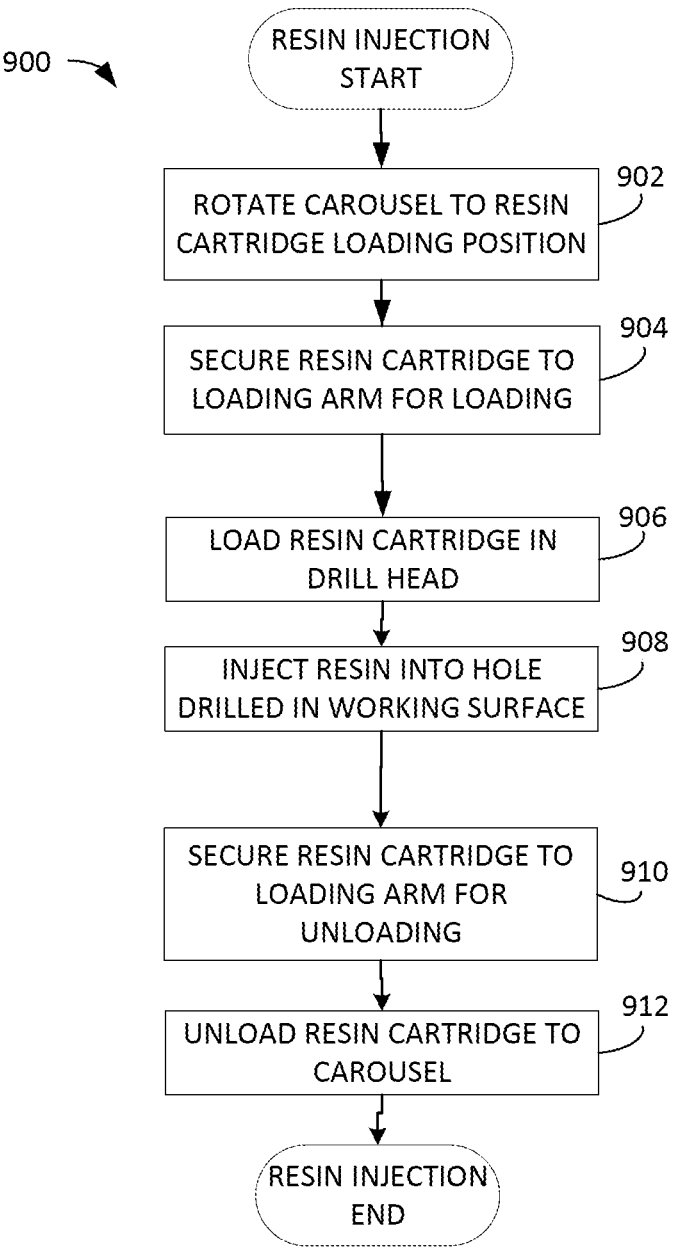
FIG. 30 is a flowchart of a method for controlling a resin operation of the drill rig of FIG. 1 in an automatic mode.

A fourth control button bank 456D includes a bolt button for beginning a bolting operation (see, e.g., FIG. 31), and a resin button for beginning a resin injection operation (see, e.g., FIG. 30). A fifth control button bank 456E includes control buttons for selecting an automation state of the drill rig 10. The fifth control button bank 456E includes a semi/full auto button for selecting a semi/full automation mode of the drill rig 10 (see, e.g., FIG. 28) and a pause/resume auto button for pausing or resuming an automatic operation of the drill rig 10. A sixth control button bank 456F includes buttons for controlling a drill operation of the drill rig 10. The sixth control button bank 456F includes a drill button for beginning a drill operation (see, e.g., FIG. 29), plus (+) and minus (−) buttons to control the intensity or speed of the drilling operation, a water button to control a cooling water flow for the drilling operation, and a boost button to provide a power boost for the drilling operation. In some embodiments, the buttons provided in the sixth control button bank 456F are proportional input buttons such that the force on the buttons dictates the speed of the corresponding operation.

The various control buttons of the control button banks 456A-F provide controls for activating, deactivating, pausing, or resuming an automatic operation of the drill rig 10. The various control buttons of the control button banks

456A-F also provide controls for a manual control operation of the drill rig 10. For example, in response to an error detected during an automatic operation of the drill rig 10, the drill rig 10 may require an operator to manually control the drill rig 10 as a failsafe.

Figure 23A:
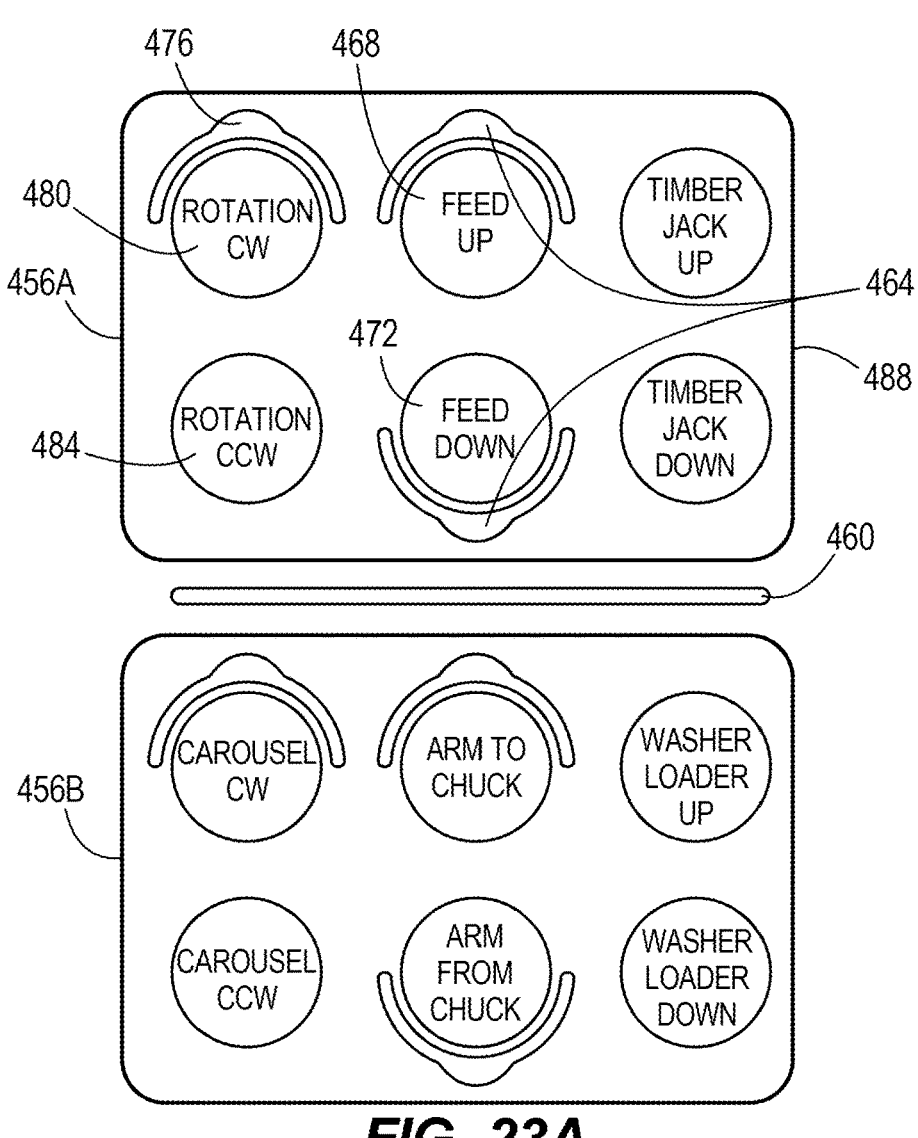
FIG. 23A illustrates an example button layout of the control panel of FIG. 23.

In some embodiments, various landmarks may be provided between the different button banks 456A-F and around the one or more buttons so that the user can easily locate the button banks 456A-F based on touch. In a mining environment, there may not always be sufficient light for an operator to easily make out the different buttons. FIG. 23A illustrates one example of the landmarks provided on the control panel 420A. A first landmark 460 is provided between the first control button bank 456A and the second control button bank 456B. The first landmark 460 may be an engraved landmark or a raised landmark such that a user may feel the first landmark 460 as the user moves their hand from the first control button bank 456A to the second control button bank 456B. An engraved landmark is a feature that is depressed into the surface membrane keypad and a raised landmark is a feature that is raised above a surface of the membrane keypad. A second set of landmarks 464 are provided around a first button 468 and a second button 472 of the first control button bank 456A. In the example illustrated, the second set of landmarks 464 are directional landmarks indicating upwards and downwards around the first button 468 and the second button 472 respectively. The second set of landmarks 464 may include engraved landmarks or raised landmarks such that the user may feel the second set of landmarks 464 as the user moves their hand over the second set of landmarks 464. The first button 468 is a feed up button that is used to move a component upwards and the second button 472 is a feed down button that is used to move a component downwards. The second set of landmarks 464 therefore indicate to a user that the first button 468 and second button 472 are upward and downward movement buttons of the respective button bank 456A-F. A third landmark 476 is provided around a third button 480. The third landmark 476 is also a directional landmark indicating an upward direction, however, the third landmark 476 is not provided as a set. Accordingly, the third landmark 476 is provided to indicate that the corresponding button 480 is a rotational button. In the example illustrated, the third button 480 is a clockwise rotation button and a fourth button 484 is provided below the third button 480. The fourth button 484 is a counterclockwise rotation button. In some embodiments, a fourth set of landmarks may also be provided around buttons that are used for lateral movement. The fourth set of landmarks are directional landmarks indicating a left and right directions on the control panel 420A. In some embodiments, one or more of the control button banks 456A-F also include a bounding box 488 to visually differentiate between the different buttons. Bounding boxes are also provided around each of the one or more buttons. In some embodiments, the intrinsically safe control panel 420 further includes a connector that allows a connection of a second intrinsically safe control panel. The second intrinsically safe control panel 420 may be configured to control the drill rig 10 from a distance (for example, remotely or from a remote location). The connector may be a wireless connector or a wired connector. In embodiments wherein the connector is a wireless connector, the wireless connector may be a Wi-Fi connector, a Bluetooth connector, a satellite connector, a cellular network connector, a radio transceiver, a combination thereof, or the like.

Figure 25:
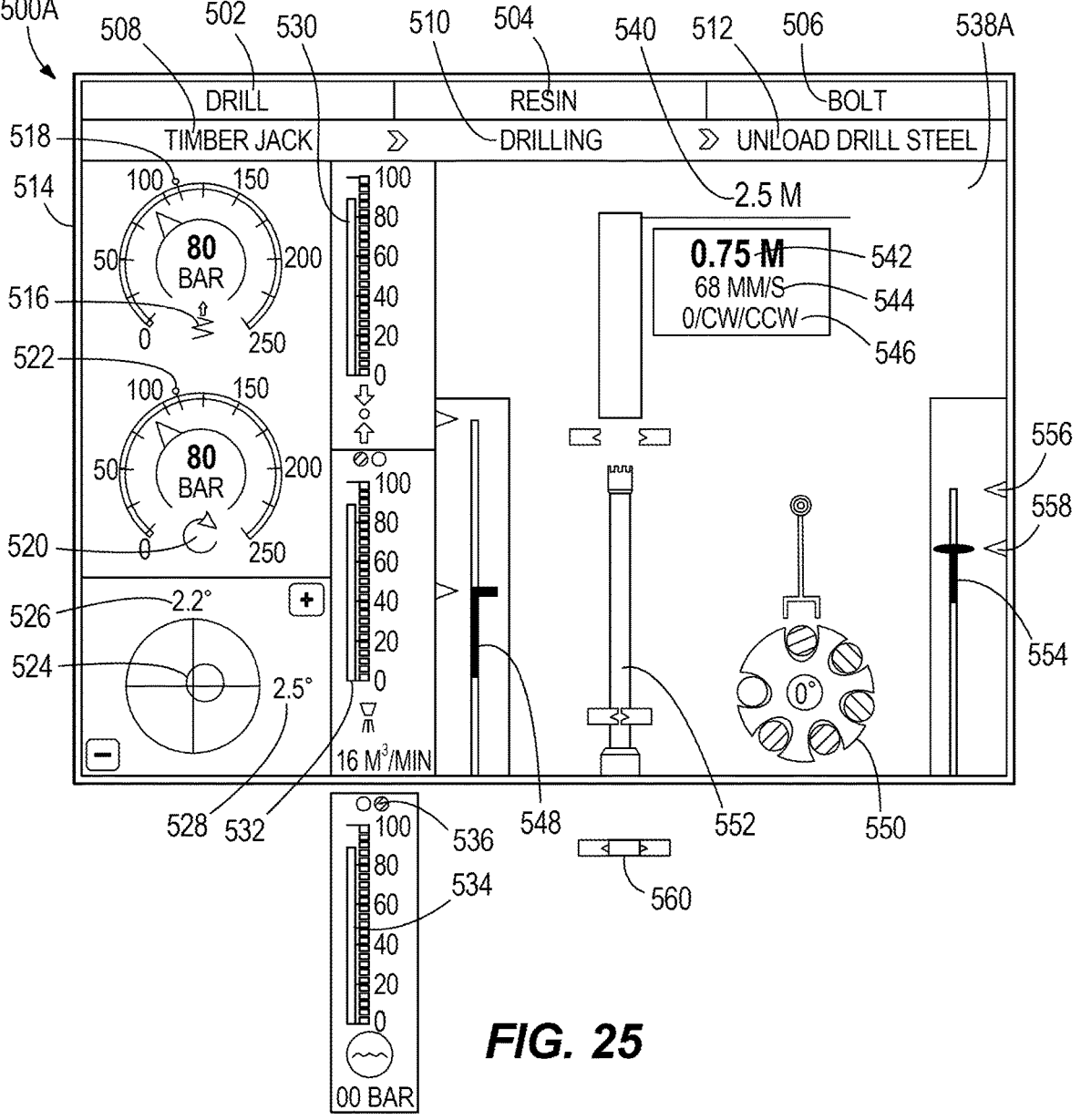
FIG. 25 illustrates an example user interface during a drill operation of the drill rig of FIG. 1.

The display 424 is used to display a graphical user interface, such as the function interface 500 illustrated in FIGS. 25-27B. FIG. 25 illustrates a drilling function interface 500A. The drilling function interface 500A includes a drill view tab 502, a resin view tab 504, and a bolt view tab 506. The drilling function interface 500A further includes a previous auto state indicator 508 for indicating a previous automated task performed by the drill rig 10 while in as fully automatic mode, a current auto state indicator 510 for indicating a current automated task performed by the drill rig 10 while in as fully automatic mode, and a next auto state indicator 512 for indicating a next automated task performed by the drill rig 10 while in as fully automatic mode. The drilling function interface 500A also include an instrument panel 514 and a status panel 538*a*.

The instrument panel 514 displays a feed pressure gauge 516 and a feed pressure target indicator 518, a rotational pressure gauge 520 and a rotational pressure target indicator 522, an orientation index 524 including a north/south degree value 526 and an east/west degree value 528, a timber jack pressure gauge 530, a water flow rate gauge 532, and a water pressure gauge 534 including a selector button 536.

The status panel 538A displays information relating to an automated drilling function, such as a target hole depth value 540, a current hole depth indicator 542, a feed speed indicator 544, a rotation direction indicator 546, a timber jack indicator 548, a carousel position indicator 550, a drill steel indicator 552, a washer loader indicator 554, a washer loader working position indicator 556, and washer loader home position indicator 558, and a top jaw reflex indicator 560.

Figure 26A:
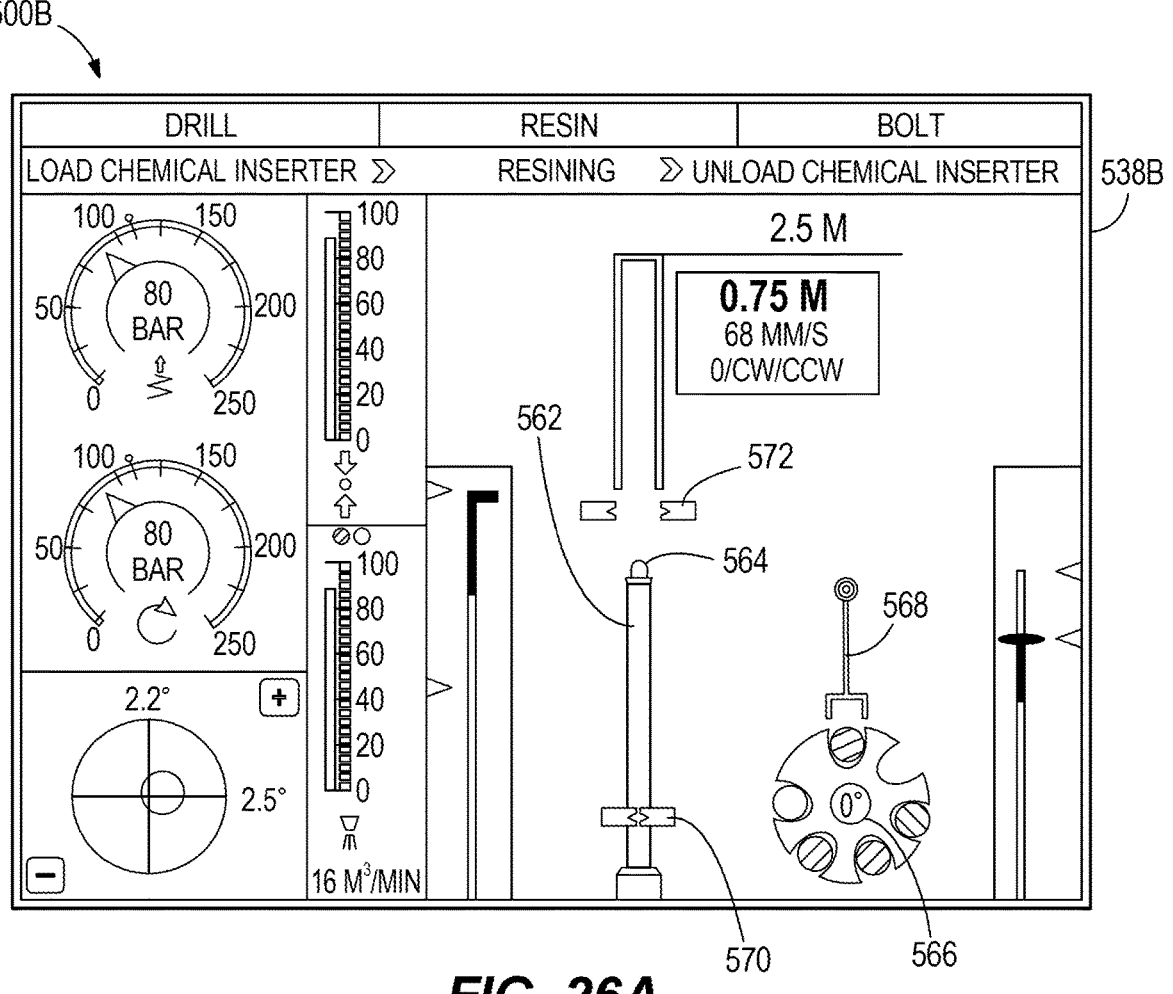
FIGS. 26A and 26B illustrate an example user interface during a resin operation of the drill rig of FIG. 1.
Figure 26B:
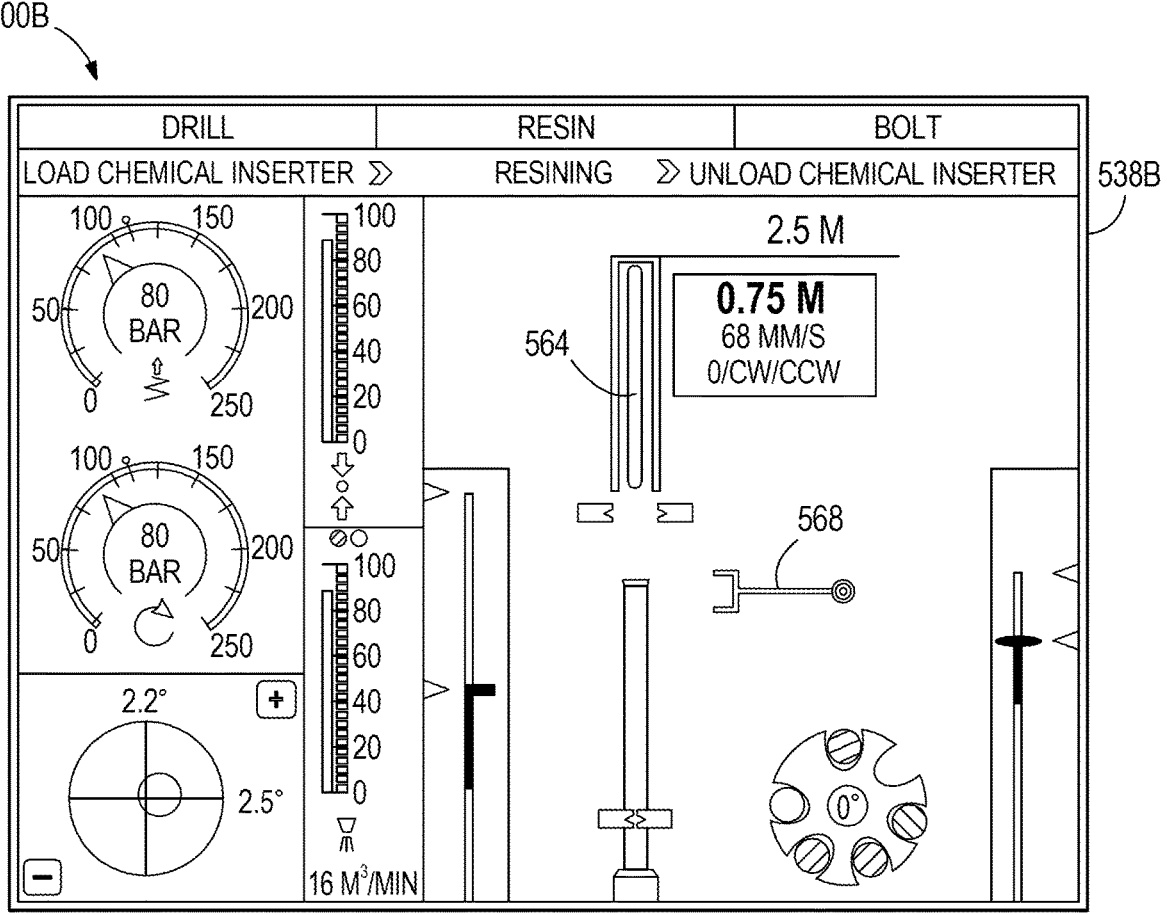

FIG. 26A illustrates a resin function interface 500B at a first time during an automated resin function. The resin function interface includes similar tabs and panels as the drill function interface 500A. The resin function interface 500B further includes a status panel 538B. The status panel 538B displays information relating to the automated resin function, such as a resin inserter indicator 562, a resin indicator 564, a carousel index degree indicator 566, a loader arm indicator 568, a mid-jaw indicator 570, and a top-jaw indicator 572. FIG. 26B illustrates the resin function interface 500B at a second time later than the first time during the automated resin function. The resin function interface 500B remains mostly unchanged, with the exception of the resin indicator 564 and loader arm indicator 568 being shown in different positions on the status panel 538B. This indicates that the automated resin operation was successful.

Figure 27A:
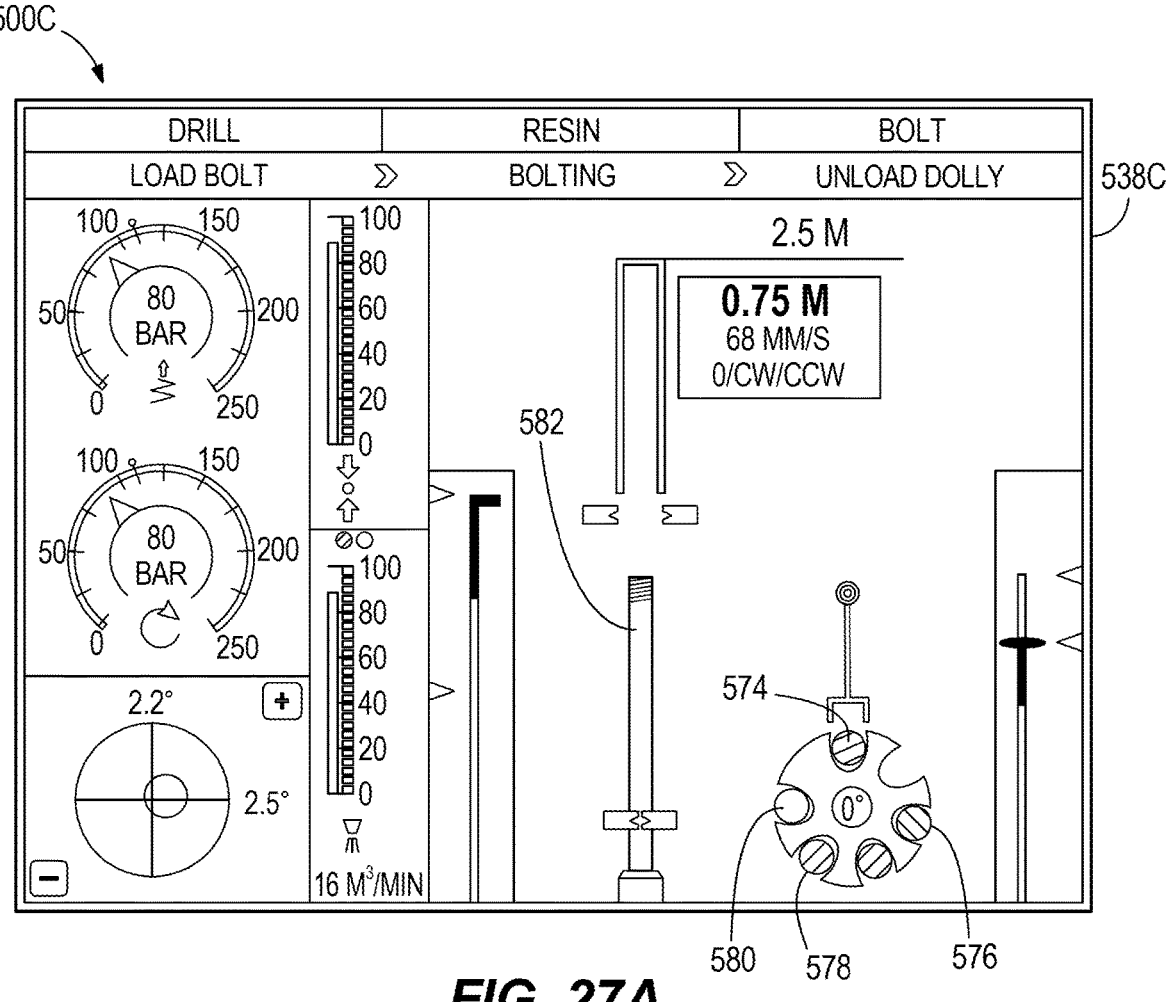
FIGS. 27A and 27B illustrate an example user interface during a bolt operation of the drill rig of FIG. 1.
Figure 27B:
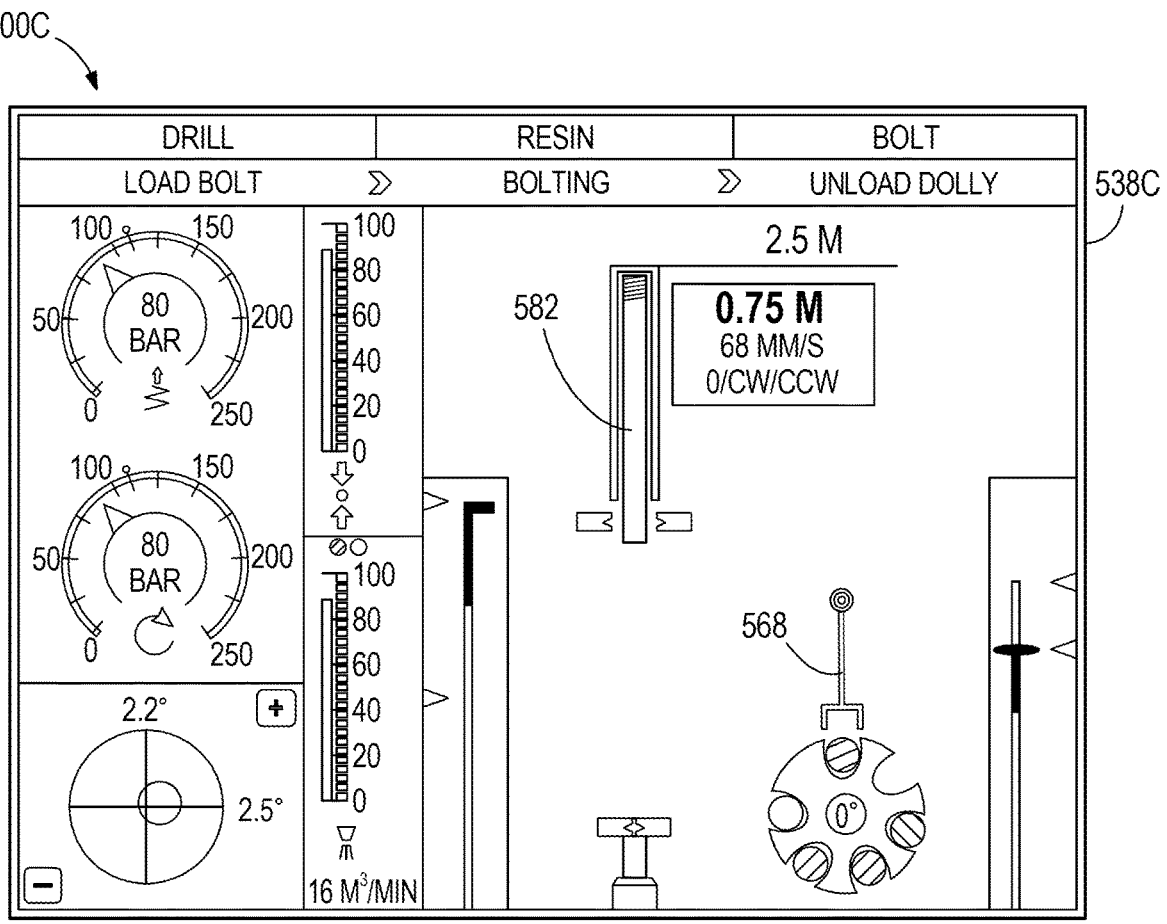

FIG. 27A illustrates a bolting function interface 500C at a first time during an automated bolting function. The bolting function interface 500C includes similar tabs and panels as the drill function interface 500A. The bolting function interface 500C also includes a status panel 538C. The status panel 538C displays information relating to the automated resin function, such as a drill steel pot indicator 574, a resin pot indicator 576, a bolt pot indicator 578, a dolly pot indicator 580, and a bolt indicator 582. FIG. 27B illustrates the bolting function interface 500C at a second time later than the first time during the automated bolting function. The bolting function interface 500C remains mostly unchanged, with the exception of the bolt indicator 564 and loader arm indicator 568 being shown in different positions on the status panel 538C. This indicates that the automated bolting operation was successful.

Figure 28:
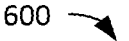
FIG. 28 is a flowchart of a method for operating the drill rig of FIG. 1 in an automatic mode.
Figure 28:
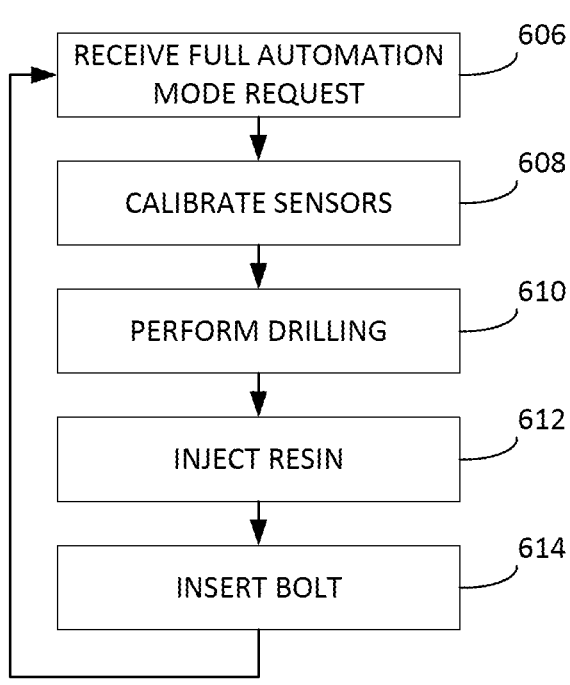

FIG. 28 is a flowchart illustrating an example method 600 for fully automated operation of the drill rig 10. In the example illustrated, the method 600 includes receiving, at the controller 40, a full automation mode request (at block 606). For example, a user or operator of the drill rig 10 may press the full/semi auto button from the button bank 456F. In some embodiments, the request may be received from the central controller 312. The method 600 includes automatically performing a calibration operation of calibrating one or more sensors of the drill rig 10 (at block 608). For example, the sensors may be the sensors 324 of FIG. 19. The calibration operation may include calibrating feed pressure of the actuators used for actuating various features of the drill rig 10. The calibration operation may also include rotation pressure calibration. In some embodiments, the calibration operation may not be performed for every instance of the method 600. The calibration operation may be performed at regular intervals, for example, after every tenth operation of the drill rig 10. The method 600 also includes automatically performing a drilling operation (at block 610) in response to receiving the full automation request. The drilling operation may include controlling the drill rig 10 to drill a hole into a surface of a working area 294. The drilling operation is described further with respect to FIG. 29. The method 600 further includes automatically performing a resin injection operation (at block 612) subsequent to the drilling operation. For example, the resin injection operation may include injecting resin into the hole drilled into a surface of the working area 294. The resin injection operation is described further with respect to FIG. 30. The method 600 also includes automatically performing a bolting operation (at block 614) subsequent to the resin injection operation. For example, the bolting operation may include inserting a bolt into the hole drilled into a surface of the working area 294. The bolting operation is described further with respect to FIG. 31. Following the bolting operation, the drill rig 10 may enter a stand-by mode until the drill rig 10 is moved to the next bolting location. While performing any of the blocks 608-614, if the drill rig 10 encounters an error, the drill rig 10 may exit full automation mode and instruct a user to manually perform the next step. This process is detailed further in FIG. 32.

FIG. 29 is a flowchart illustrating an example method 800 for automatically performing a drilling operation. The blocks described in method 800 may be performed in a different order than described herein. The method 800 begins when the drill rig 10 receives a control signal to begin an automatic drilling operation (e.g., at block 610 of FIG. 28). In the example illustrated, the method 800 includes rotating, using the actuator 46, the carousel 22 to a drill loading position (at block 802). The drill loading position is a position in which the drill bit 18A is aligned with the loading arm 30 (for example, as shown in FIG. 16B). The controller 40 controls the actuator 46 to rotate the carousel 22 such that the drill bit 18A is in the loading position based on the rotary position signals received from the encoder 50. Specifically, the controller 40 continues to rotate the carousel 22 using the actuator 46 until the encoder 50 indicates that the carousel is in the drill loading position. The method 800 also includes securing the drill bit 18A from the carousel 22 to the loading arm 30 for loading the drill bit 18A to the drill head 34 (at block 804). The controller 40 controls the clamp actuators to close the clamps 222 around the drill bit 18A as shown in FIG. 16D. The controller 40 determines that the drill bit 18A is aligned with the loading arm 30 such that the clamps 222 can grasp the drill bit 18A based on the signals received from the sensor 230.

The method 800 also includes loading, using the washer loader assembly 110, the washer 114 on the drill bit 18A (at block 806). The controller 40 controls the washer loader assembly 110 as discussed with respect to FIGS. 9-12 to load the washer 114 on the drill bit 18A. The controller 40 controls the actuator 138 to place the carrier arm 130 on the stack of washers 122 as shown in FIGS. 16B and 16C. The magnet 182 under the carrier arm 130 secures a single washer 114. Once the washer 114 is secured to the carrier arm 130, the controller 40 controls the actuator 138 to raise the carrier arm 130 with the washer 114. The controller 40 aligns the loading arm 30 with the carrier arm 130 such that when the loading arm 30 is raised the drill bit 18A passes through an opening of the washer 114 and the carrier arm 130 as shown in FIGS. 16D and 16E. The controller 40 controls the first actuator 206 to raise the loading arm 30 such that the drill bit 18A passes through the opening of the washer 114.

The method 800 includes loading, using the loading arm 30, the drill bit 18A in the drill head 34 (at block 808). The controller 40 controls the second actuator 210 to rotate the loading arm such that drill bit 18A is above the drill head 34. The controller 40 then controls the first actuator 206 to lower the drill bit 18A into the drill head 34. In some embodiments, rather than lowering the loading arm 30, the drill head 34 may be raised to receive the drill bit 18A. That drill head 34 may include a chuck that is controlled by the controller 40 to secure the drill bit 18A to the drill head 34. Once the drill bit 18A is loaded into the drill head 34, the controller 40 rotates the loading arm away from the drill head 34 using the second actuator 206. At the same time as being loaded into the drill head 34, the drill bit 18A is also loaded into the top plate 198. The top plate 198 is axially aligned with the drill head 34 such that the drill bit 18A is received in the drill head 34 and the top plate 198 at the same time. When the loading arm 30 is moved away from the drill head 34, the washer 114 slides down the drill bit 18A and settles on the top plate 198.

The method 800 includes drilling, using the drill head 34, the drill bit 18A into the working surface 294 to create a drill hole (at block 810). The controller 40 translates the drill head 34 and the top plate such that the top plate 198 and the washer 114 are in contact with the working surface 294 as shown in FIG. 16I. The controller 40 operates the drill head 34 to drill a hole in the working surface 294 using the drill bit 18A as shown in FIG. 16J.

The method 800 also includes securing the drill bit 18A from the drill head 34 to the loading arm 30 for unloading the drill bit 18A (at block 812). The controller 40 retracts the drill head 34 to a home position after drilling. The controller 40 controls the second actuator 210 to move the loading arm 30 to the drill head 34 and controls the clamp actuator 225 to close the clamps 222 around the drill bit 18A. The drill head 34 is disconnected from the drill bit 18A, for example, by rotating a chuck of the drill head 34. The method 800 further includes unloading, using the loading arm 30, the drill bit 18A to the carousel 22 (at block 814). The controller 40 controls the second actuator to move the loading arm 30 from the drill head 34 to the carousel 22. The controller 40 controls the clamp actuator 225 to open the clamps 222 such that drill bit 18A is placed back in the carousel 22 as shown in FIG. 16O. The drill rig 10 may wait for a control signal to proceed to the next automatic operation (for example, the automatic resin injection operation or the automatic bolting operation). While performing any of BLOCKS 802-814, if the drill rig 10 encounters an error, the drill rig 10 may exit full automation mode and instruct a user to manually perform the next step. This process is detailed further in FIG. 32.

FIG. 30 is a flowchart illustrating an example method 900 for performing an automatic resin injection operation. The blocks described in method 900 may be performed in a different order than described herein. The method 900 begins when the drill rig 10 receives a control signal to begin an automatic resin injection operation (e.g., at block 612 of FIG. 28). In the example illustrated, the method 900 includes rotating, using the actuator 46, the carousel 22 to the resin cartridge loading position (at block 902). The resin cartridge loading position is a position in which the resin cartridge 18B is aligned with the loading arm 30 (for example, as shown in FIG. 17A). The controller 40 controls the actuator 46 to rotate the carousel 22 such that the resin cartridge 18B is in the loading position based on the rotary position signals received from the encoder 50. Specifically, the controller 40 continues to rotate the carousel 22 using the actuator 46 until the encoder 50 indicates that the carousel is in the resin cartridge loading position. The method 900 also includes securing the resin cartridge 18B from the carousel 22 to the loading arm 30 for loading the resin cartridge 18B to the drill head 34 (at block 904). The controller 40 controls the clamp actuators to close the clamps 222 around the resin cartridge 18B. The controller 40 determines that the resin cartridge 18B is aligned with the loading arm 30 such that the clamps 222 can grasp the resin cartridge 18B based on the signals received from the sensor 230.

The method 900 includes loading, using the loading arm 30, the resin cartridge 18B in the drill head 34 (at block 906). The controller 40 controls the second actuator 210 to rotate the loading arm such that resin cartridge 18B is above the drill head 34. The controller 40 then controls the first actuator 206 to lower the resin cartridge 18B into the drill head 34. In some embodiments, rather than lowering the loading arm 30, the drill head 34 may be raised to receive the resin cartridge 18B. Once the resin cartridge 18B is loaded into the drill head 34, the controller 40 rotates the loading arm 30 away from the drill head 34 using the second actuator 206.

The method 900 includes injecting, using the resin cartridge 18B, resin into the hole drilled in the working surface 294 (at block 908). The controller 40 translates the drill head 34 such that a resin opening of the resin cartridge 18B is inserted into the top plate 198 as shown in FIG. 17E. The controller 40 operates the drill head 34 to activate the resin cartridge 18B and to inject the resin in the hole drilled in the working surface 294.

The method 900 also includes securing the resin cartridge 18B from the drill head to the loading arm 30 for unloading the resin cartridge 18B (at block 910). The controller 40 retracts the drill head 34 to a home position after resin injection. The controller 40 controls the second actuator 210 to move the loading arm 30 to the drill head 34 and controls the clamp actuator 225 to close the clamps 222 around the spent resin cartridge 18B. The method 900 further includes unloading, using the loading arm 30, the spent resin cartridge 18B to the carousel 22 (at block 912). The controller 40 controls the second actuator 210 to move the loading arm 30 from the drill head 34 to the carousel 22. The controller 40 controls the clamp actuator 225 to open the clamps 222 such that resin cartridge 18B is placed back in the carousel 22 as shown in FIG. 17H. In some embodiments, the loading arm 30 may unload the spent resin cartridge 18B to a different location. The resin injection operation then ends. The drill rig 10 may wait for a control signal to proceed to the next automatic operation (for example, the automatic bolting operation). While performing any of BLOCKS 902-912, if the drill rig 10 encounters an error, the drill rig 10 may exit full automation mode and instruct a user to manually perform the next step. This process is detailed further in FIG. 32.

FIG. 31 is a flowchart illustrating an example method 1000 for performing an automatic bolting operation. The blocks described in method 100 may be performed in a different order than described herein. The method 1000 includes rotating, using the actuator 46, the carousel 22 to a bolt loading position (at block 1002). The bolt loading position is a position in which the bolt 18C is aligned with the loading arm 30 (for example, as shown in FIG. 18A). The controller 40 controls the actuator 46 to rotate the carousel 22 such that the bolt 18C is in the loading position based on the rotary position signals received from the encoder 50. Specifically, the controller 40 continues to rotate the carousel 22 using the actuator 46 until the encoder 50 indicates that the carousel 22 is in the bolt loading position. The method 1000 also includes securing the bolt 18C from the carousel 22 to the loading arm 30 for loading the bolt 18C to the drill head 34 (at block 1004). The controller 40 controls the clamp actuators to close the clamps 222 around the bolt 18C. The controller 40 determines that the bolt 18C is aligned with the loading arm 30 such that the clamps 222 can grasp the bolt 18C based on the signals received from the sensor 230.

The method 1000 includes loading, using the loading arm 30, the bolt 18C in the drill head 34 (at block 1006). The controller 40 controls the second actuator 210 to rotate the loading arm such that bolt 18C is above the drill head 34. The controller 40 then controls the first actuator 206 to lower the bolt 18C into the drill head 34. In some embodiments, rather than lowering the loading arm 30, the drill head 34 may be raised to receive the bolt 18C. Once the bolt 18C is loaded into the drill head 34, the controller 40 rotates the loading arm 30 away from the drill head 34 using the second actuator 206.

The method 1000 includes aligning, using the drill head 34, the bolt 18C with the drill hole in the working surface 294 (at block 1008). The controller 40 raises the drill head 34 such that the bolt 18C is received in the top plate 198 and aligned with the drill hole in the working surface 294. The top plate 198 secures the bolt 18C such that the bolt 18C can be dismounted from the drill head 34. Once the bolt 18C is secured by the top plate, the controller 40 lowers the drill head 34 away from the bolt 18C to the home position. The method 100 includes rotating, using the actuator 46, the carousel 22 to an adapter loading position (at block 1010). The adapter loading position is a position in which the adapter 18D is aligned with the loading arm 30 (for example, as shown in FIG. 18F). The controller 40 controls the actuator 46 to rotate the carousel 22 such that the adapter 18D is in the loading position based on the rotary position signals received from the encoder 50. Specifically, the controller 40 continues to rotate the carousel 22 using the actuator 46 until the encoder 50 indicates that the carousel is in the adapter loading position. The method 1000 also includes securing the adapter 18D from the carousel 22 to the loading arm 30 for loading the adapter 18D to the drill head 34 (at block 1012). The controller controls the clamp actuators to close the clamps 222 around the adapter 18D. The controller determines that the adapter 18D is aligned with the loading arm 30 such that the clamps 222 can grasp the adapter 18D based on the signals received from the sensor 230. In some embodiments, the blocks 1008-1012 may be performed simultaneously with blocks 1004 and 1006.

The method 1000 includes loading, using the loading arm 30, the adapter 18D in the drill head 34 (at block 1014). The controller 40 controls the second actuator 210 to rotate the loading arm such that adapter 18D is above the drill head 34.

The controller 40 then controls the first actuator 206 to lower the adapter 18D into the drill head 34. In some embodiments, rather than lowering the loading arm 30, the drill head 34 may be raised to receive the adapter 18D. Once the adapter 18D is loaded into the drill head 34, the controller 40 rotates the loading arm 30 away from the drill head 34 using the second actuator 206. The method 1000 further includes driving, using the drill head 34 and the adapter 18D, the bolt 18C into the working surface 294 (at block 1016). The controller 40 controls the drill head 34 to couple the adapter 18D to the bolt 18C. Once the adapter 18D is coupled to the bolt 18C, the controller 40 controls the drill head 34 to insert the bolt 18C into the drill hole in the working surface 294. The bolt 18C is held in place in the drill hole with the resin previously injected into the drill hole. The controller 40 lowers the drill head 34 to the home position.

The method 1000 also includes securing the adapter 18D from the drill head 34 to the loading arm 30 for unloading the adapter 18D (at block 1018). The controller 40 controls the second actuator 210 to move the loading arm 30 to the drill head 34 and controls the clamp actuator 225 to close the clamps 222 around the adapter 18D. The method 1000 further includes unloading, using the loading arm 30, the adapter 18D to the carousel 22 (at block 1020). The controller 40 controls the second actuator 210 to move the loading arm 30 from the drill head 34 to the carousel 22. The controller 40 controls the clamp actuator 225 to open the clamps 222 such that adapter 18D is placed back in the carousel 22 as shown in FIG. 18M. The automatic bolting operation then ends. The drill rig 10 may wait for a control signal to proceed to the next automatic operation (for example, restarting the full automation mode). While performing any of blocks 1004-1020, if the drill rig 10 encounters an error, the drill rig 10 may exit full automation mode and instruct a user to manually perform the next step. This process is detailed further in FIG. 32.

FIG. 32 is a flowchart illustrating an example method 1100 of performing an error-handling operation of the drill rig 10. While performing any automatic operation (i.e., any of the blocks 608-614 of FIG. 28, blocks 802-814 of FIG. 29, blocks 902-912 of FIG. 30, and blocks 1002-1020 of FIG. 31), the drill rig 10 may encounter an error. The drill rig 10 may enter a failsafe operation mode to perform an error-handling operation in response to the error. The method 1100 includes performing any automatic operation of the drill rig 10 while in full automation mode (at block 1102). The automatic operation may be any of the blocks 608-614 of FIG. 28, blocks 802-814 of FIG. 29, blocks 902-912 of FIG. 30, and blocks 1002-1020 of FIG. 31. The automatic operation may also be another operation not listed above. The method also includes determining, using the controller 40, whether an error has occurred (at block 1104) during one of the automatic operations (e.g., the automatic drilling operation, the automatic resin injection operation, and the automatic bolting operation). The error may be detected by the sensors 324 of the drill rig 10, a length of time since the last step was performed, or by some other means. When no error is detected, the method 1100 returns to block 1102 (e.g., the drill rig proceeds to the next automatic operation). In response to detecting the error, the method 1100 includes directing a user to manually perform an operation (at block 1106). For example, the controller 40 displays an alert on the display 424 indicating that an error has occurred during operation. In some embodiments, the controller 40 may display the error status using the multi-color LEDs 448 and 452. On the display 424, the controller 40 may provide an instruction for a user to manually complete the remaining operation, for example, using one of the display screens as shown in FIGS. 25-27B.

The method 1100 include receiving, via the control panel 420, user input corresponding to the operation (at block 1108). As discussed above with respect to FIGS. 23-24, the user may control the drill rig 10 using one or more buttons provided on the control panel 420. Specifically, the user presses the one or more buttons to continue the present operation of the drill rig 10. The method 100 also includes performing, using the controller 40, the operation based on user input (at block 1110). As discussed above, the controller 40 receives the user input from the control panel 420. The controller 40 then controls the corresponding component based on the user input.

The method 1100 includes determining, using the controller 40, whether the error is resolved (at block 1112). The controller 40 may determine whether the error is resolved based on the sensors 324. When the error is not resolved, the method 1100 returns to block 1108 to continue manual operation. When the error is resolved, the method 1100 includes generating, using the controller 40, an alert indicating that the drill is ready for automated operation (at block 1114). For example, the controller 40 displays an alert on the display 424 indicating that the error has been resolved. In some embodiments, the controller 40 may display the error status using the multi-color LEDs 448 and 452.

The method 110 includes receiving, via the control panel 420, an input to resume automated operation (at block 1116). For example, the user may press the full automation button on the control panel 420A. The method 1100 further includes resuming, using the controller 40, automated operation of the drill rig (at block 1118). The automated operation may include one of the drilling operation, the resin injection operation, and the bolting operation. The controller may resume operation from a point where manual operation was stopped after detecting the error.

Therefore, embodiments described herein provide systems and methods for performing fully automatic operations of a drill rig, such as a bolter. Although aspects have been described in detail with reference to certain preferred embodiments, variations and modifications exist within the scope and spirit of one or more independent aspects as described.

What is claimed is:

1. A drilling and bolting rig comprising:
a drill head for driving a consumable into a work surface;
a feed supporting the drill head for movement relative to the work surface; and
a hydraulic circuit including,
at least one auxiliary flow control valve for selectively controlling flow of pressurized fluid to one of a first hydraulic component and a second hydraulic component, and
a main flow control valve for controlling flow of pressurized fluid to the at least one auxiliary flow control valve, the at least one auxiliary flow control valve and the main flow control valve being movable between a first configuration and a second configuration, pressurized fluid being provided to operate the first hydraulic component while the at least one auxiliary flow control valve and the main flow control valve are in the first configuration, pressurized fluid being provided to operate the second hydraulic component while the at least one auxiliary flow control valve and the main flow control valve are in the second configuration.

2. The drilling and bolting rig of claim 1, wherein the first hydraulic component is operable to perform one of the following functions:
index tilt the feed in a left/right direction;
index tilt the feed in a fore/aft direction;
rotate a consumable store;
raise/lower a loading arm for loading the consumable;
rotate the loading arm;
open/close jaws for gripping the consumable; and
operate a washer loading arm for loading a washer.

3. The drilling and bolting rig of claim 2, wherein the second hydraulic component is operable to perform another one of the following functions:
index tilt the feed in a left/right direction;
index tilt the feed in a fore/aft direction;
rotate a consumable store;
raise/lower a loading arm for loading the consumable;
rotate the loading arm;
open/close jaws for gripping the consumable; and
operate a washer loading arm for loading a washer.

4. The drilling and bolting rig of claim 1, wherein the first hydraulic component is operable to actuate a portion of the feed, and the second hydraulic component is operable to actuate a portion of a magazine.

5. The drilling and bolting rig of claim 1, wherein the first hydraulic component is operable to actuate a portion of the feed, and the second hydraulic component is operable to actuate a portion of a loading arm for transferring the consumable from a magazine to the drill head.

6. The drilling and bolting rig of claim 1, further comprising a loader configured to retrieve the consumable from a magazine and load the consumable into the drill head, the loader including an arm operable to engage the consumable, the arm being supported for both rotational and translational movement.

7. The drilling and bolting rig of claim 1, wherein the hydraulic circuit further comprises a function select line, the function select line selectively providing pressurized fluid to move the at least one auxiliary flow control valve between the first configuration and the second configuration.

8. The drilling and bolting rig of claim 7, wherein the function select line may be toggled between a first pressure condition in which the at least one auxiliary flow control valve is in a first position and a second pressure condition in which the at least one auxiliary flow control valve is in a second position.

9. The drilling and bolting rig of claim 1, wherein the at least one auxiliary flow control valve includes a first auxiliary flow control valve associated with the first hydraulic component and a second auxiliary flow control valve associated with the second hydraulic component, each of the first auxiliary flow control valve and the second auxiliary flow control valve movable between a first position and a second position.

10. The drilling and bolting rig of claim 9, wherein the first auxiliary flow control valve and the second auxiliary flow control valve are neutrally biased toward the first position in which pressurized fluid is directed to operate the first hydraulic component, and movement of the first auxiliary flow control valve and the second auxiliary flow control valve to the second position causes pressurized fluid to be directed to operate the second hydraulic component.

11. The drilling and bolting rig of claim 1, wherein the first hydraulic component is part of a first sub-circuit and the second hydraulic component is part of a second sub-circuit that is arranged in parallel with the first sub-circuit.

12. The drilling and bolting rig of claim 1, wherein the main flow control valve is a three-position, solenoid-actu-ated, electronically-controlled valve, and the at least one auxiliary flow control valve is a two-position, hydraulic valve.

13. The drilling and bolting rig of claim 1, wherein the at least one auxiliary flow control valve is biased toward a neutral position in which pressurized fluid is directed to operate the first hydraulic component.

* * * * *